(12) United States Patent
Saltveit

(10) Patent No.: US 10,787,772 B2
(45) Date of Patent: Sep. 29, 2020

(54) MODULAR TURF SPORTS FIELD AND APPURTENANT ASSEMBLIES, EQUIPMENT AND METHODS

(71) Applicant: Nutcracker Solutions AS, Jar (NO)

(72) Inventor: Yngve Saltveit, Sandvika (NO)

(73) Assignee: Nutcracker Solutions AS, Jar (NO)

( * ) Notice: Subject to any disclaimer, the term of this patent is extended or adjusted under 35 U.S.C. 154(b) by 0 days.

(21) Appl. No.: 16/313,288

(22) PCT Filed: Jun. 26, 2017

(86) PCT No.: PCT/EP2017/065698
§ 371 (c)(1),
(2) Date: Dec. 26, 2018

(87) PCT Pub. No.: WO2018/001955
PCT Pub. Date: Jan. 4, 2018

(65) Prior Publication Data
US 2019/0234027 A1    Aug. 1, 2019

(30) Foreign Application Priority Data

Jun. 28, 2016   (NO) .................................. 20161071

(51) Int. Cl.
*E01C 13/08*      (2006.01)
*A01G 20/10*      (2018.01)
*E01C 13/00*      (2006.01)

(52) U.S. Cl.
CPC ............ *E01C 13/083* (2013.01); *A01G 20/10* (2018.02); *E01C 13/08* (2013.01); *E01C 2013/006* (2013.01); *E01C 2013/086* (2013.01)

(58) Field of Classification Search
CPC .. E01C 13/083; E01C 13/08; E01C 2013/006; E01C 2013/086; A01G 20/10; A01G 9/28
(Continued)

(56) References Cited

U.S. PATENT DOCUMENTS 4,058,930 A * 11/1977 Miles ....................... A01G 9/02
                                                                47/58.1 R
5,309,846 A *  5/1994 Peterson ............... E01C 13/083
                                                                108/53.3
(Continued)

FOREIGN PATENT DOCUMENTS

ES    2092959 A1   12/1996
FR    2633844 A1    1/1990
(Continued)

OTHER PUBLICATIONS

Kerouach, May, "International Search Report," prepared for PCT/EP2017/065698, dated Jan. 16, 2018, five pages.

*Primary Examiner* — Michael D Dennis
(74) *Attorney, Agent, or Firm* — Shackelford, Bowen, McKinley & Norton, LLP

(57) ABSTRACT

A turf sports field with a plurality of turf modules (100) having an upper turf surface and peripheral turf edges (5). The turf modules are deployed by means of a remotely operated or autonomously operated lifting and transport vehicle (103), which is provided with a lifting arrangement. When installed, the turf modules (100) are positioned adjacent previously installed turf modules, with a tolerance gap (105) between adjacently positioned turf edges (5) of different turf modules.

5 Claims, 42 Drawing Sheets

(58) Field of Classification Search
USPC .......................................................... 472/92
See application file for complete search history.

(56) References Cited

U.S. PATENT DOCUMENTS

| 5,927,022 | A | * | 7/1999 | Hirakawa | ............. | E01C 13/083 |
| | | | | | | 472/92 |
| 2002/0129561 | A1 | * | 9/2002 | Silberman | ............. | E01C 13/083 |
| | | | | | | 52/6 |

FOREIGN PATENT DOCUMENTS

| FR | 2698281 A1 * | 5/1994 | ............. A63C 19/04 |
| FR | 2901287 A1 | 11/2007 | |
| GB | 2462187 A | 2/2010 | |
| RS | 49903 B | 8/2008 | |
| WO | WO-9826847 A1 | 6/1998 | |
| WO | WO-2013002649 A1 | 1/2013 | |
| WO | WO-2015024985 A2 | 2/2015 | |

\* cited by examiner

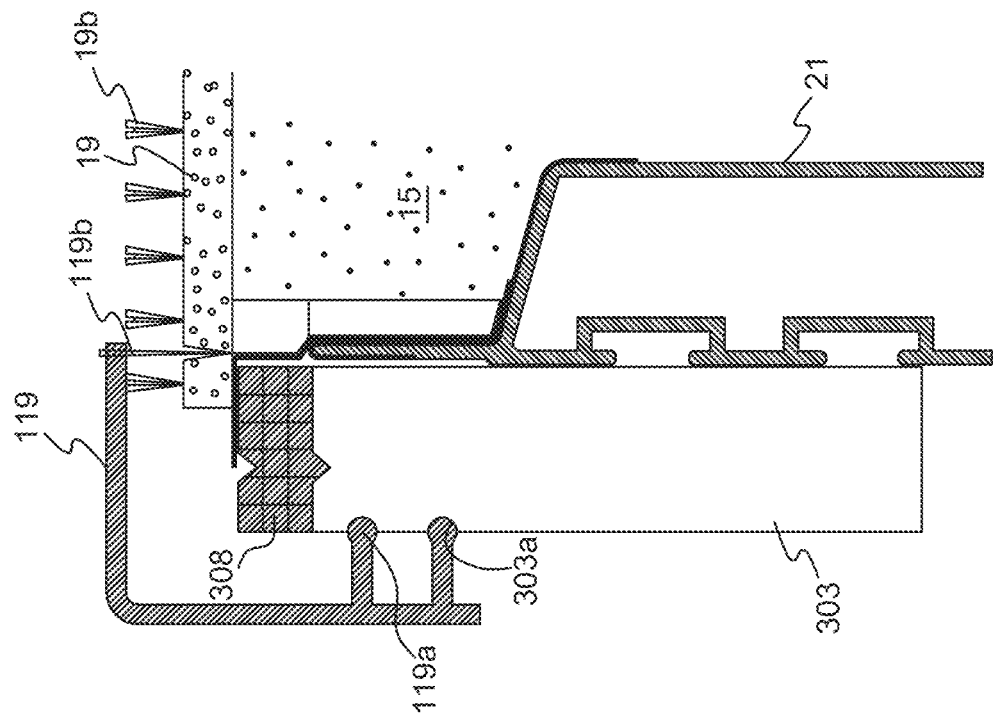
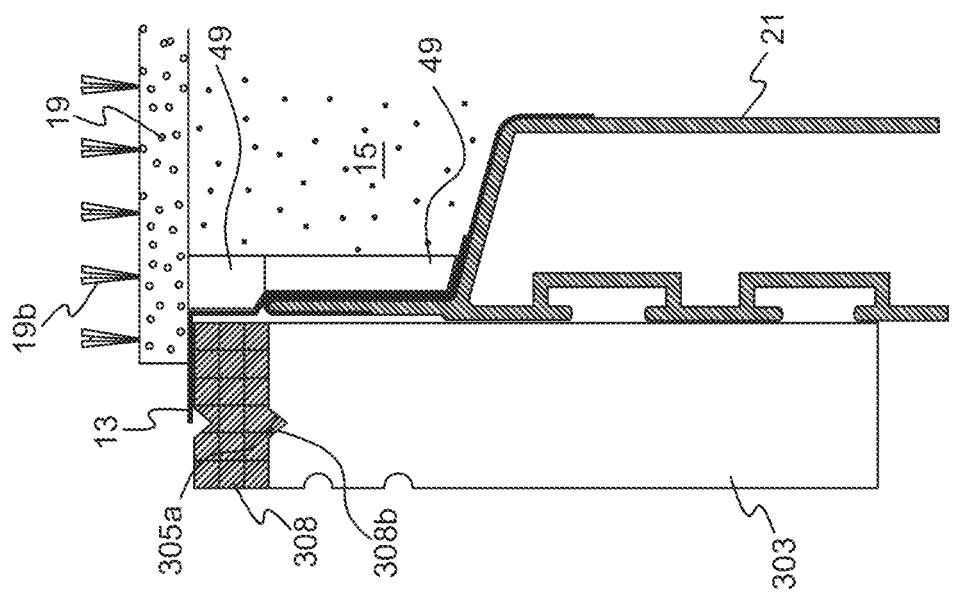

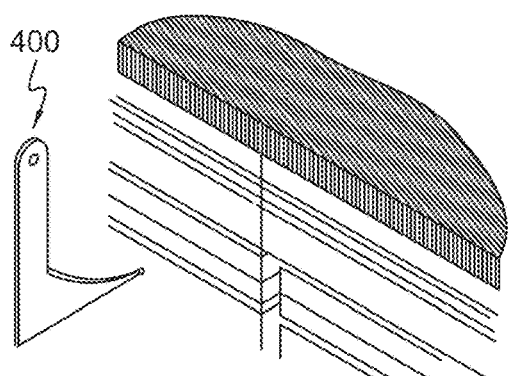
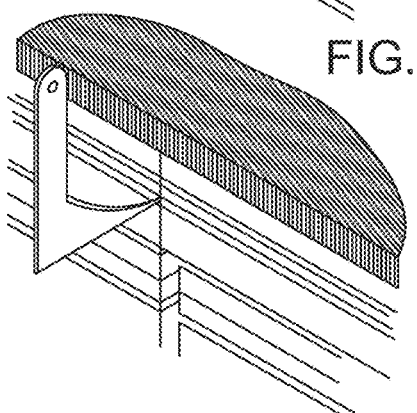
FIG. 58
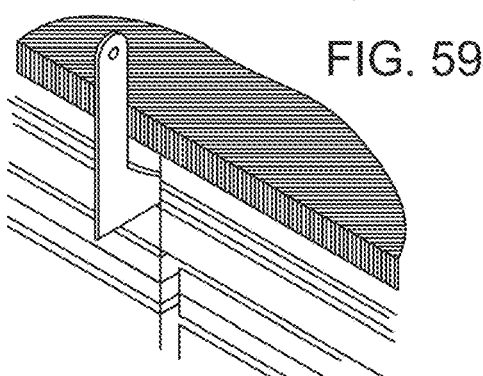
FIG. 59
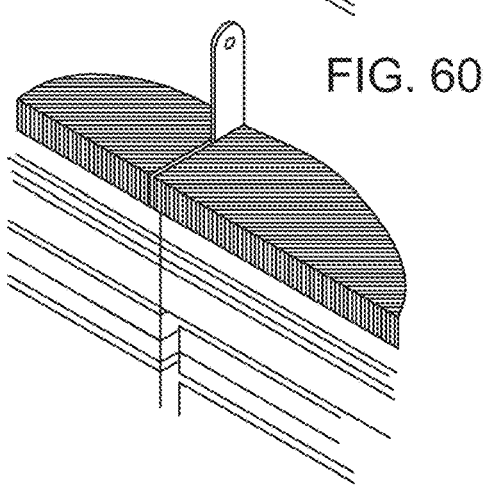
FIG. 60
FIG. 61
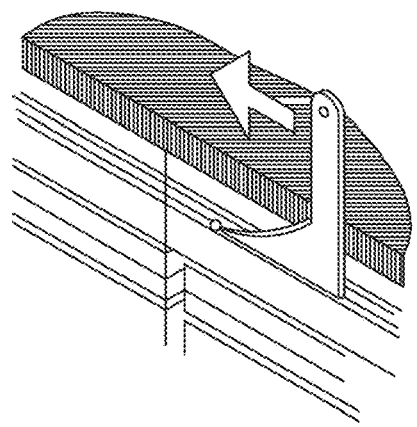
FIG. 62
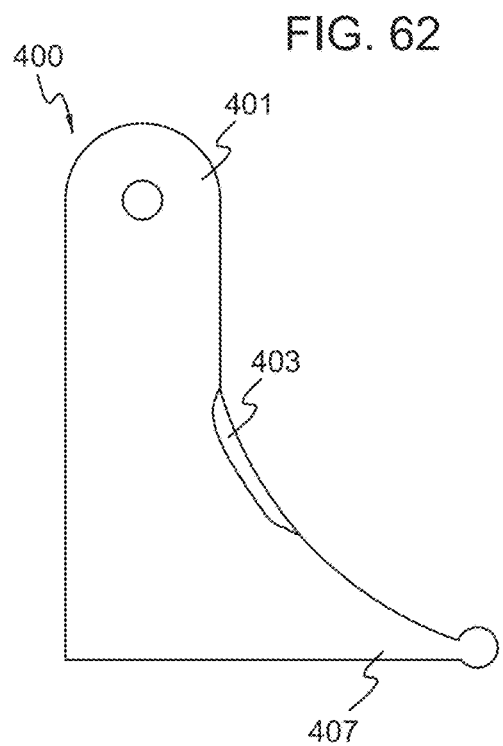
FIG. 63

MODULAR TURF SPORTS FIELD AND APPURTENANT ASSEMBLIES, EQUIPMENT AND METHODS

BACKGROUND

Field of the Invention

The present inventions relates to various aspects of a modular turf sports field, and appurtenant assemblies, devices, equipment and methods.

SUMMARY

A method of providing a turf sports field includes, via a remotely operated or autonomously operated lifting and transport vehicle, which is provided with a lifting arrangement, moving turf modules from a non-installed position towards an installed position, via a positioning system, which is configured to detect and deliver turf module position information, detecting the position of the turf module that is being moved, and installing turf modules adjacent to previously installed turf modules, with a tolerance gap between adjacently positioned turf edges of different turf modules, wherein the positions, into which the turf modules are installed, are based on turf module position information from the positioning system.

A turf sports field system includes a turf sports field constituted at least in part of a plurality of turf modules with peripheral turf edges, one or more remotely operated or autonomously operated lifting and transport vehicles that are configured to lift and move the turf modules, wherein when the turf modules are in installed positions, the positions of the turf edges of respective turf modules are adjacent turf edges of adjacent turf modules, and wherein there is a tolerance gap between the adjacent turf edges.

A turf edge resetting assembly includes a turf edge resetting means, and wherein the turf edge resetting means comprises a turf edge resetting profile.

A method of resetting one or more turf edges of a turf module includes moving a turf module into a module receiving area of a turf edge resetting assembly, forcing a turf edge resetting profile against a turf edge, and removing the turf module from the module receiving area.

A turf module assembling system includes a plurality of movable support bases with rigid wall portions and configured to carry a soil layer in a position horizontally between the rigid wall portions, and a turf module assembling station comprising a turf module receiving area and a plurality of turf edge template walls peripherally arranged around the turf module receiving area, wherein the turf edge template walls extend vertically up beyond the rigid wall portions when a movable support base is positioned in the turf module receiving area.

A movable turf module having a turf edge of a turf layer, wherein the turf layer has a turf reinforcement layer arranged on top of a lower soil layer, wherein the turf reinforcement layer comprises a mat up from which a plurality of synthetic fibers extend, wherein an upper soil layer is positioned above the mat, and wherein an exposed root zone of the turf edge is confined to the upper soil layer, as natural turf is arranged in the upper soil layer.

A removable turf edge support arrangement includes a main body, a plurality of support fingers, a plurality of anchoring pins, and wherein the plurality of support fingers are arranged with a distance from the plurality of anchoring pins, and wherein the main body has an upper portion with apertures that are configured to let light pass through.

A flexible root barrier sheet includes an external face and an internal face, wherein the external face has a more smooth surface than the internal face, and wherein the internal face has a more porous surface than the external face, and wherein the internal face is configured to receive turf roots into a surface thereof.

A flexible root barrier sheet arranged along the turf edge of a movable turf module includes fringed upper portion with upwardly extending flaps.

A composite elongated turf edge element includes an elongated root barrier sheet joined to an elongated water absorbing layer, wherein the root barrier sheet and the water absorbing layer are fixed together via an attachment means, such as an adhesive or a weld.

BRIEF DESCRIPTION OF THE DRAWINGS

FIG. 35 illustrates a turf reinforcement layer 19 arranged onto compacted soil 15;

FIG. 36 illustrates a schematically illustrated reinforcement cutter 119;

FIG. 58 to FIG. 63 show an alternative embodiment of a root cutting device 400;

DETAILED DESCRIPTION

Figure 1:
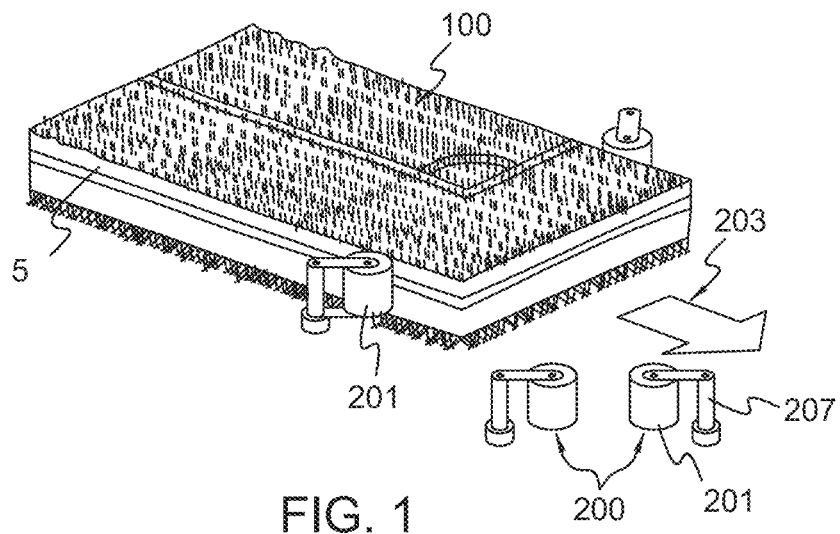
FIGS. 1 and 2 depict a turf module 100, which is moved through a turf edge resetting assembly 200.

The modular turf sports field described herein relates to a turf field, which is removable from a fixed support base. The fixed support base can typically be arranged centrally in a sports stadium, with spectator stands surrounding the fixed support base. The modular turf field comprises two or more turf modules. I.e. in some embodiments, the entire turf field is composed of two modules, which can be separated along adjacent turf edges. In other embodiments, the turf field has more modules, for instance more than hundred. Common for all embodiments of the modular turf fields described herein, and to which the present inventions relates, is that they have turf edges that abut an adjacent turf edge when in an installed state. When assembled together, i.e. adjacently, the plurality of turf modules provide a smooth and substantially flat, turfed surface, suitable for sports such as football or cricket.

In the following description, various inventions are described succeedingly. It shall be noted that although some features are described in combination with or with reference to one invention, the various features can be combined with any other feature that is described herein, although being described with reference to another invention. The division of the various aspects and concepts is made to retain a good order in the presentation, and is not meant to indicate that the aspects and concepts must be construed independently. Hence, the skilled reader will appreciate that the various features are possible to combine, even if presented in different parts of this description.

Part A—Turf Edge Resetting Assembly

Described is a turf edge resetting assembly, which is configured for resetting the shape of a turf edge of a turf module, when the turf module is in a non-installed state. A non-installed state is the state of the module when it is not forming part of an assembled turf sports field (i.e. not in use).

During use, such as during a football game, the turf edges of the turf modules may become harmed. For instance, their configuration may become altered for instance due to a heavy trample on the interface between two adjacent turf edges and/or creeping. This may in particular occur if the turf modules are arranged with a tolerance gap between them, which is not filled with a supporting intermediate medium. Moreover, since the turf modules may be installed with a tolerance gap between their adjacent turf edges, the turf edges will creep towards each other, thereby altering the perimeter of the turf module. The installation of turf modules with tolerance gaps between their turf edges will be discussed in detail further below.

To reset such turf edges, there is proposed:

A turf edge resetting assembly, comprising a turf edge resetting means, wherein the turf edge resetting means comprises a turf edge resetting profile.

The turf edge resetting means may be in the form of turf edge resetting plates which are configured to be moved with an actuation device, into and out from engagement with the turf edge.

The turf edge resetting assembly may comprise turf edge resetting plates on four opposite sides of a turf module receiving area. In that way, four turf edges of one turf module may be reset simultaneously. The actuation device may advantageously be configured to exert a predetermined force onto the turf edges, with the turf edge resetting means.

In some embodiments of the turf edge resetting assembly, the turf edge resetting means may be in the form of a turf edge resetting roll, which is configured to roll along the direction of the turf edge, while exerting a force onto the turf edge. The turf edge resetting profile will then be present in the outer face of the turf edge resetting roll.

Preferably, in embodiments where the turf edge resetting means is in the form of a turf edge resetting roll, the assembly comprises at least one turf edge resetting roll on opposite sides of a turf module receiving area.

Preferably, in embodiments where the turf edge resetting means is in the form of a turf edge resetting roll, the turf edge resetting roll or rolls can be fixed, however able to rotate, while a turf module movement means is arranged for moving the turf module along the turf edge resetting roll. Such turf module movement means may for instance be a remotely operated or autonomously operated lifting and transport vehicle.

In some embodiments, the axis of rotation of the turf edge resetting roll or rolls may be inclined with respect to the vertical direction.

Moreover, in some embodiments, where a plurality of turf edge resetting rolls are arranged along one line, i.e. for resetting one turf edge of a turf module, succeeding rolls may have axis of rotation with different angle. Preferably, a first resetting roll may have the most inclined angle, while the last roll may have the least inclined angle, for instance a vertical (non-inclined) axis.

Also proposed is a method of resetting the turf edge or turf edges of a turf module. The method comprises i) moving a turf module into the module receiving area (203) of a turf edge resetting assembly (200);

ii) forcing a turf edge resetting profile (205) against a turf edge (5);

iii) removing the turf module (100) from the module receiving area (203).

The method may include moving a turf module through a turf edge resetting assembly provided with turf edge resetting rolls, so that a turf edge of a turf module passes and engages a turf edge resetting roll.

Moreover, in such an embodiment, several passes can be performed. In such a method, one can alter the inclination of the turf edge resetting roll for each pass. Alternatively or in addition, one can also change the vertical position of the turf edge resetting roll for each pass. In that way, one can perform a total resetting procedure with a plurality of lesser resetting steps. I.e. instead of resetting the turf edge in one pass or in one movement, it can be performed with a plurality of increments/steps.

Figure 2:
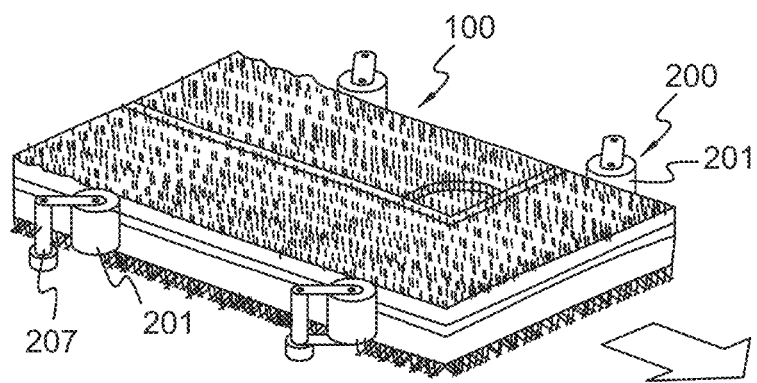
Figure 3:
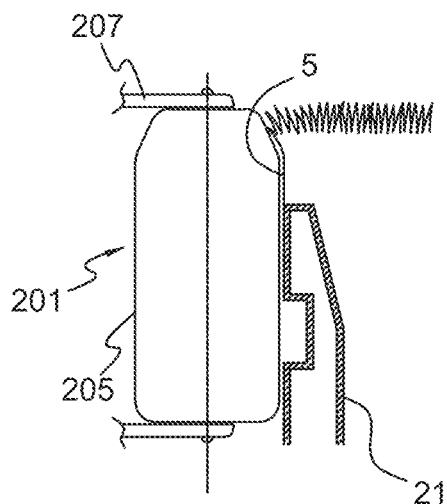
FIGS. 3 and 4 show two possible turf edge resetting profiles 205 of the turf edge resetting rolls 201.
Figure 4:
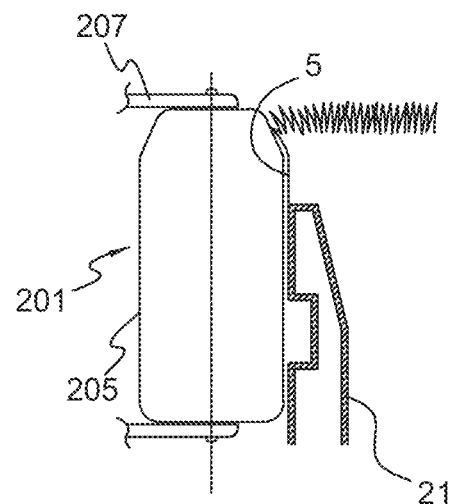

In the following is a description of various embodiments of a turf edge resetting assembly according to the invention. FIG. 1 and FIG. 2 depict a turf module 100, which is moved through a turf edge resetting assembly 200 according to the invention. Four turf edge resetting rolls 201 are arranged on opposite sides of a turf module receiving area 203. FIG. 3 and FIG. 4 show two possible turf edge resetting profiles 205 of the turf edge resetting rolls 201. As will be appreciated by the skilled person, various turf edge resetting profiles 205 will result in various configurations of the reset turf edge. In the shown embodiment, a profile 21 made of metal, constitutes a wall portion which is part of the turf module 100.

The turf edge resetting rolls 201 in the shown embodiment are supported on roll support devices 207 which are configured to exert a force towards the turf edge 5. That is, a force will be exerted from the rolls 201 onto the turf edges 5. Due to this force, a harmed turf edge 5, will be aligned and reset to a desired template shape. When mounting the turf module 100 back into the mounted state, one will then achieve preferred turf edge interfaces.

Figure 5:
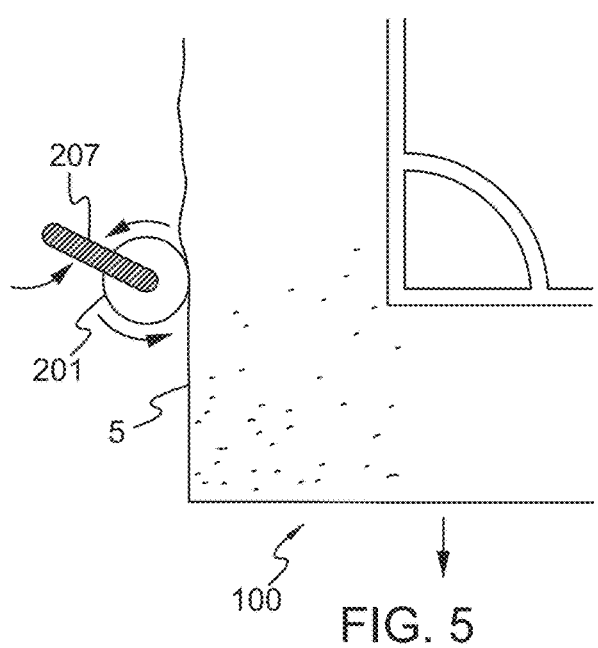
FIG. 5 is a top view showing a portion of a turf module 100 and a portion of a turf edge.

FIG. 5 shows is a top view showing a portion of a turf module 100 and a portion of a turf edge. Here, a portion of the turf edge 5 has been reset with the turf edge resetting roll 201, while another portion have yet not been reset.

Figure 8:
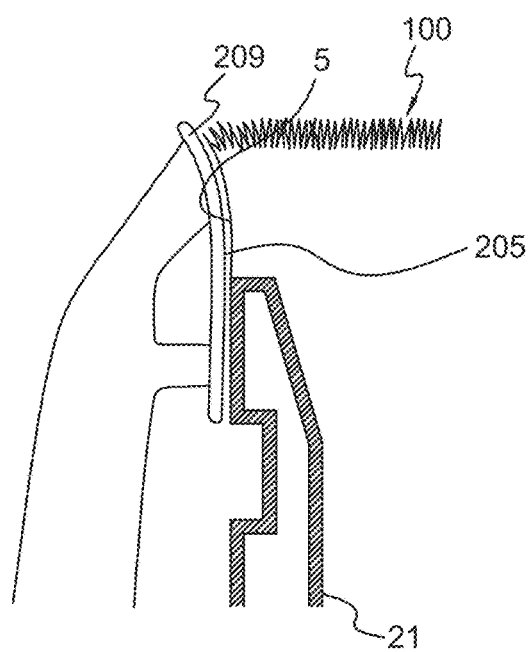
FIG. 8 is an enlarged cross section view showing a turf edge resetting plate being forced onto a turf edge 5.
Figure 6:
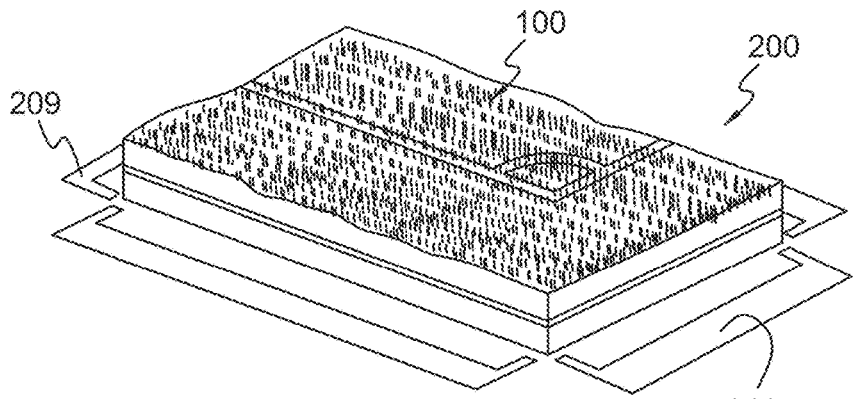
FIGS. 6 and 7 depict another embodiment of the turf edge resetting assembly 200.
Figure 7:
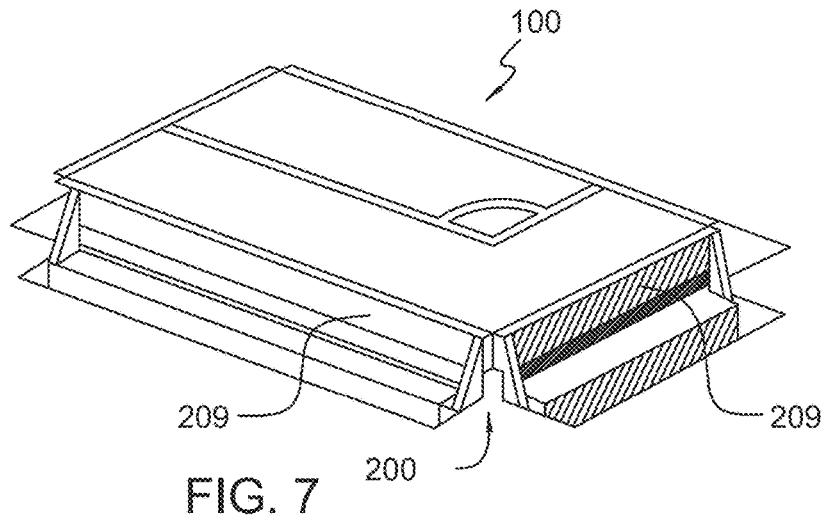

FIGS. 6 and 7 depict another embodiment of the turf edge resetting assembly 200. Here, the turf edge resetting means is in the form of turf edge resetting plates 209. An actuation device is configured to pivot the turf edge resetting plates 209 onto the turf edges 5 with a resetting force, so that the turf edges 5 are reset to a desired shape. FIG. 8 is an enlarged cross section view showing a turf edge resetting plate being forced onto a turf edge 5.

Reverting to FIGS. 6 and 7, in the shown embodiment, the turf edge resetting plates 209 may be embedded within the floor when not in use. In this manner, turf modules 100 may be moved freely across the turf edge resetting assembly. Also, after being reset, the turf edge resetting plates 209 will not be in the way for the turf module 100 when moving out from the turf edge resetting assembly 200. In FIG. 6, the turf edge resetting plates 209 are shown flush with the floor.

Various solutions can be used for moving the turf modules 100 into and out from the turf edge resetting assemblies 200. In some embodiments, the turf edge resetting assembly 200 may comprise a conveyor belt that supports the turf module 100. In other embodiments, the turf module 100 may be equipped with wheels. In further embodiments, a lifting vehicle may be used to move the turf modules, for instance a forklift. Such lifting vehicles can also be of another kind, such as a remotely operated or an autonomous vehicle, which will be described further below.

The actuation device (not shown) can typically comprise a hydraulic piston, so that the force can be provided with hydraulic pressure. Other solutions may comprise an electric motor. In some embodiments, one may even use manually operated actuation device. However, a motorized (electrical, hydraulic) actuation device will be possible to automate, and furthermore have larger capacity with respect to force.

Figure 9:
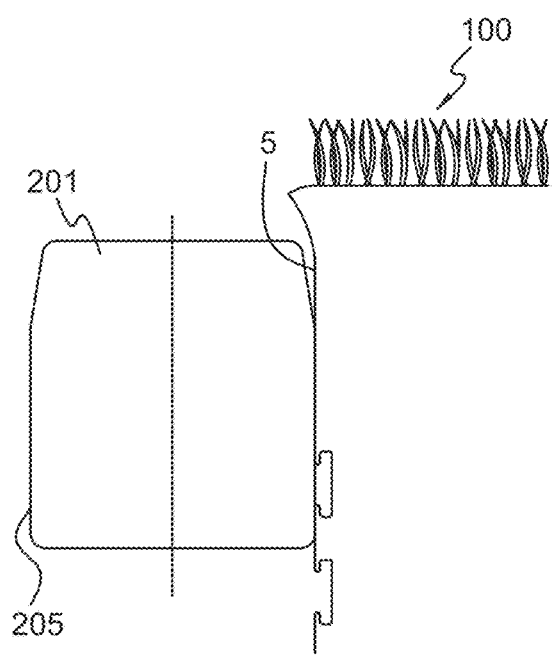
FIGS. 9 and 10 illustrate an embodiment of the turf edge resetting assembly 200 and a method, wherein a turf edge resetting roll 201 is configured to be elevated after each of succeeding runs along the turf edge 5.
Figure 10:
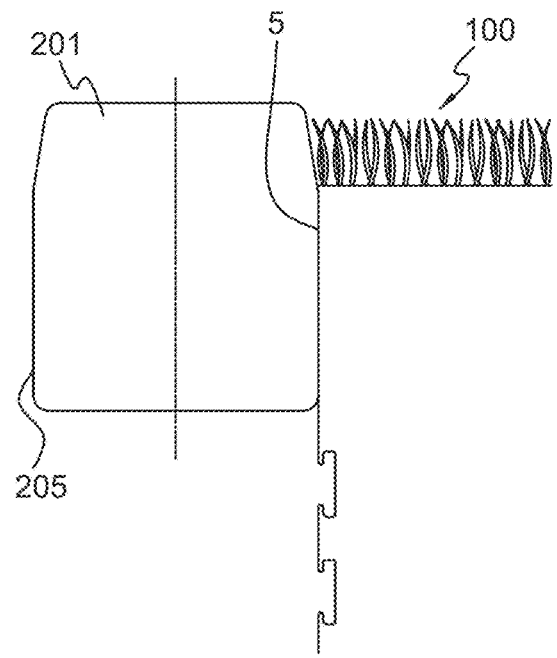

FIG. 9 and FIG. 10 illustrate an embodiment of the turf edge resetting assembly 200 and a method, wherein a turf edge resetting roll 201 is configured to be elevated after each of succeeding runs along the turf edge 5. Hence, the turf module 100 can for instance be run five times with engagement with the roll 201, and between each run, the turf resetting roll 201 can be lifted a distance upwards, as illustrated in FIG. 10 which illustrates the last run, wherein the turf edge 5 is fully reset.

Figure 11:
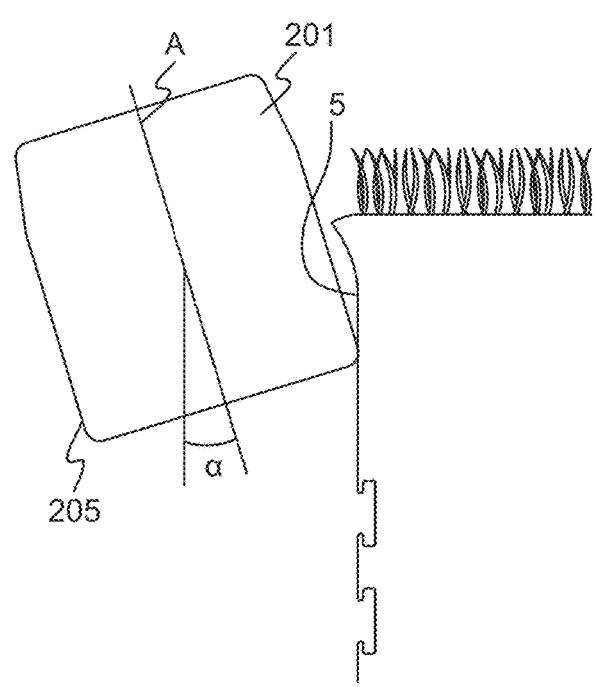
FIGS. 11 and 12 illustrate another embodiment of the turf edge resetting Assembly 200 and a method.
Figure 12:
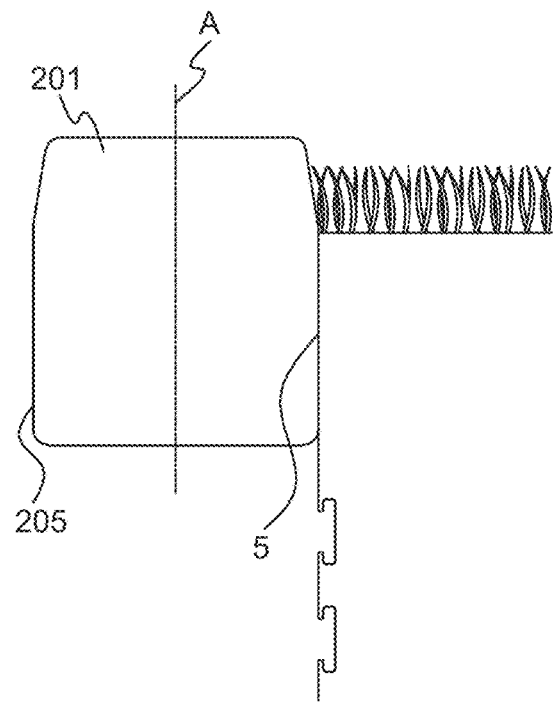

FIG. 11 and FIG. 12 illustrate another embodiment of the turf edge resetting assembly 200 and a method. Here, the turf edge resetting roll or rolls 201 is/are provided with an inclined axis of rotation. The angle of this rotational axis may either be adjusted, and/or the assembly 200 may comprise a plurality of rolls 201 having differently angled rotational axis. A resetting method may for instance comprise running a turf edge 5 several times along a roll 201, wherein the angle of the roll 201 is incremented for each run. And/or the resetting assembly 200 can comprise a plurality of succeeding turf edge resetting rolls 201, each having a different rotational axis. These axes should succeedingly be incremented towards a final angle which results in the desired, final turf edge.

In embodiments where a plurality of turf edge resetting rolls 201 are arranged along a line, for resetting one turf edge 5, a continuous resetting belt (not shown) may be arranged so that all these rolls 201 are arranged within the belt.

In some embodiments if the turf edge resetting assembly comprising turf edge resetting rolls, the assembly can be configured for being stationary, wherein the turf modules are moved with respect to the stationary turf edge resetting assembly. In other embodiments though, the turf edge resetting assembly can be a movable assembly, configured to run one or more rolls along a stationary turf module. In such embodiments, one can place the turf module into an operation area, while the turf edge resetting assembly is provided with moving roll supports.

Figure 13:
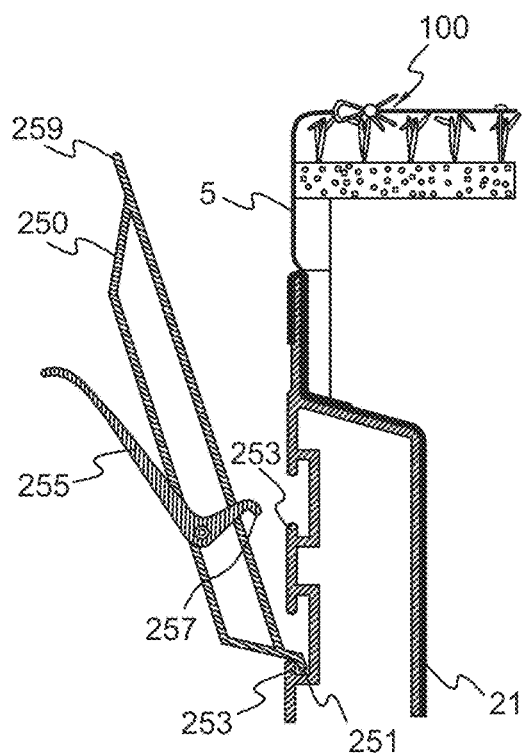
FIGS. 13 and 14 depict a removable resetting and storage wall 250.
Figure 14:
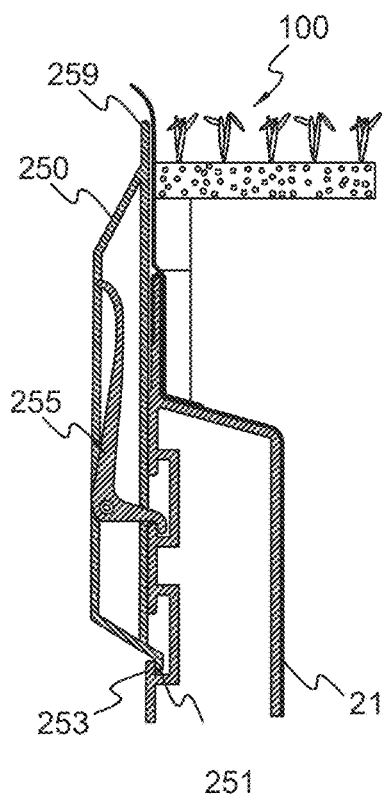

Reference is given to FIG. 13 and FIG. 14, which depict a removable resetting and storage wall 250. The resetting and storage wall 250 is configured to be releasably attached to a rigid side portion of the turf module 100, such as to a metal profile. When attaching the wall 250, a lower wall edge 251 is inserted into an upwardly protruding profile edge 253. About this engagement, the wall 250 is pivoted towards the turf edge 5, and is forced towards the turf edge 5 by means of a manually operated lever 255. The lever 255 is rotationally fixed to the wall 250 and has a gripping finger 257 engaging another upwardly protruding profile edge 253. With the lever 255, the operator is able to force the resetting and storage wall 250 into engagement with the turf edge 5 with a large force, if needed. In this manner, the operator can use the wall 250 for turf edge resetting. Also, if storing the turf module 100 for a long period in a disassembled mode (separated from adjacent modules), the wall 250 can be used for maintaining a good turf edge 5.

Notably, the upper edge 259 of the resetting and storage wall 250 is at the same vertical level as the top of the upper face of the turf module 100. Thus, the wall 250 can be used as a template when repairing a turf edge 5, by building the upper surface of the turf module 100 to an elevation corresponding to the upper edge 259 of the wall 250.

Figure 16:
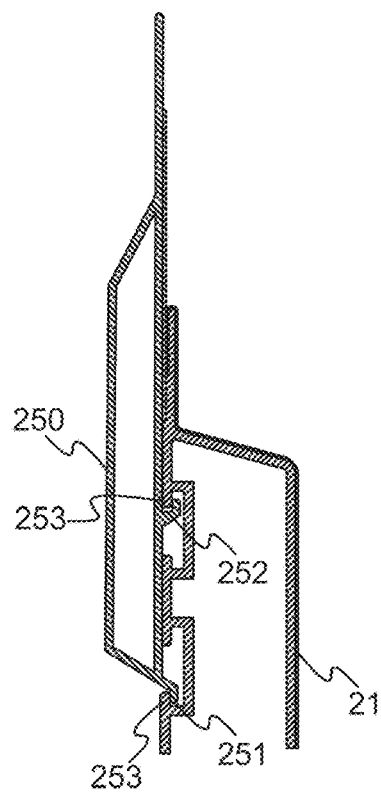

FIGS. A15 and A16 depict an alternative embodiment of a resetting and storage wall 250. In this embodiment, the lower wall edge 251 is inserted behind the profile edge 253 as in the embodiment shown in FIGS. 13 and 14. However, instead of fixing the wall 250 with the lever 155, the wall is provided with an upwardly protruding, upper wall edge 252. The upper wall edge 252 protrudes upwards, and will be inserted behind a downwardly protruding profile edge 253 of the profile 21. FIG. 16 depicts a situation wherein the lower wall edge 251 and the upper wall edge 252 are both arranged behind a profile edge 253 of the profile 21, thereby retaining the wall 250 in a fixed position.

Figure 17:
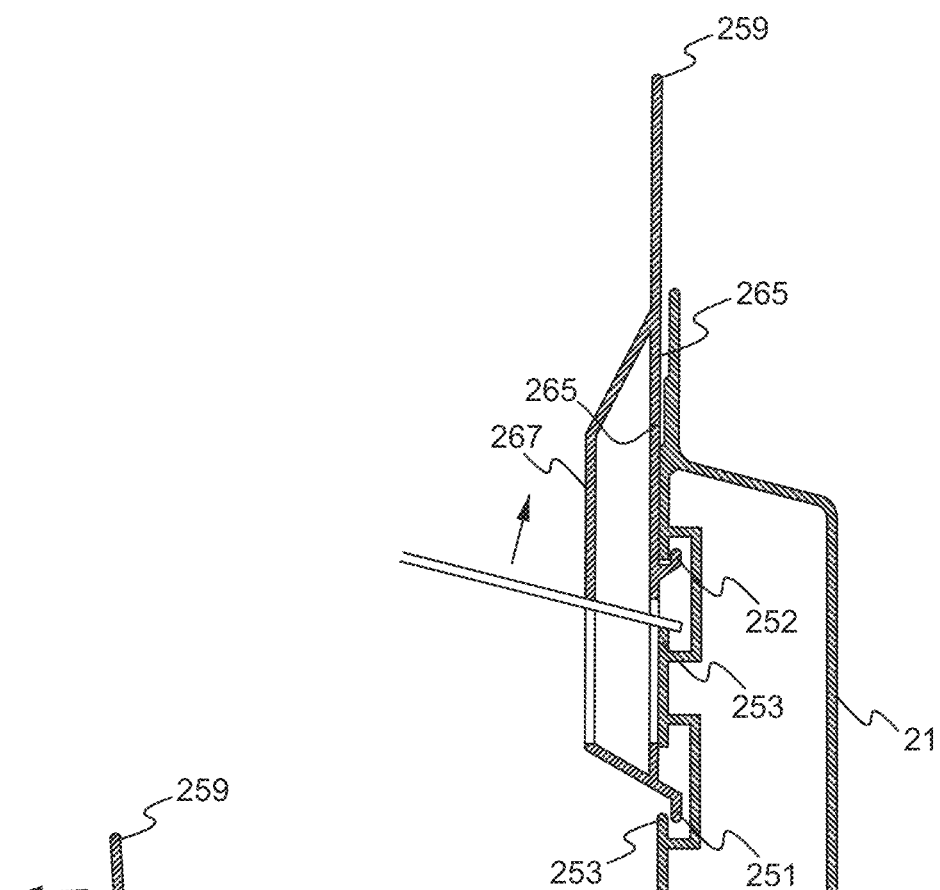
FIGS. 17 and 18 illustrate a similar type of wall 250.
Figure 18:
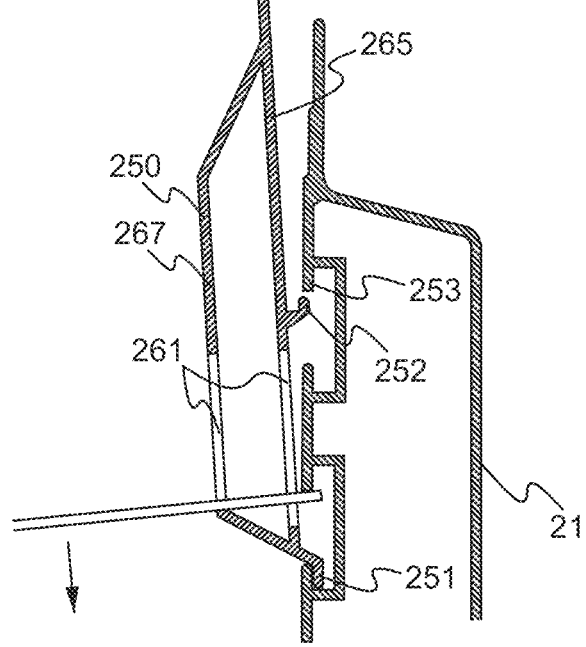

FIG. 17 and FIG. 18 illustrate a similar type of wall 250. This wall 250, however, is provided with lever cutouts 261, through which the operator can extend a mounting lever 263. As seen in FIG. 17, the operator can force the wall 250 upwards with respect to the rigid profile 21 by appropriate placement of the mounting lever 263. Oppositely, the operator can dismantle the wall 250 with the mounting leer 263, by forcing the wall 250 down, as shown in FIG. 18.

Notably, the wall 250 shown, has an inner plate portion 265 and an outer plate portion 267 at the elevation of the profile 21, when attached to the profile 21.

There is a horizontal distance between the inner and outer plate portions 265, 267. Moreover, the lever cutouts 261 are provided in both the inner and outer plate portions 265, 267.

Figure 19:
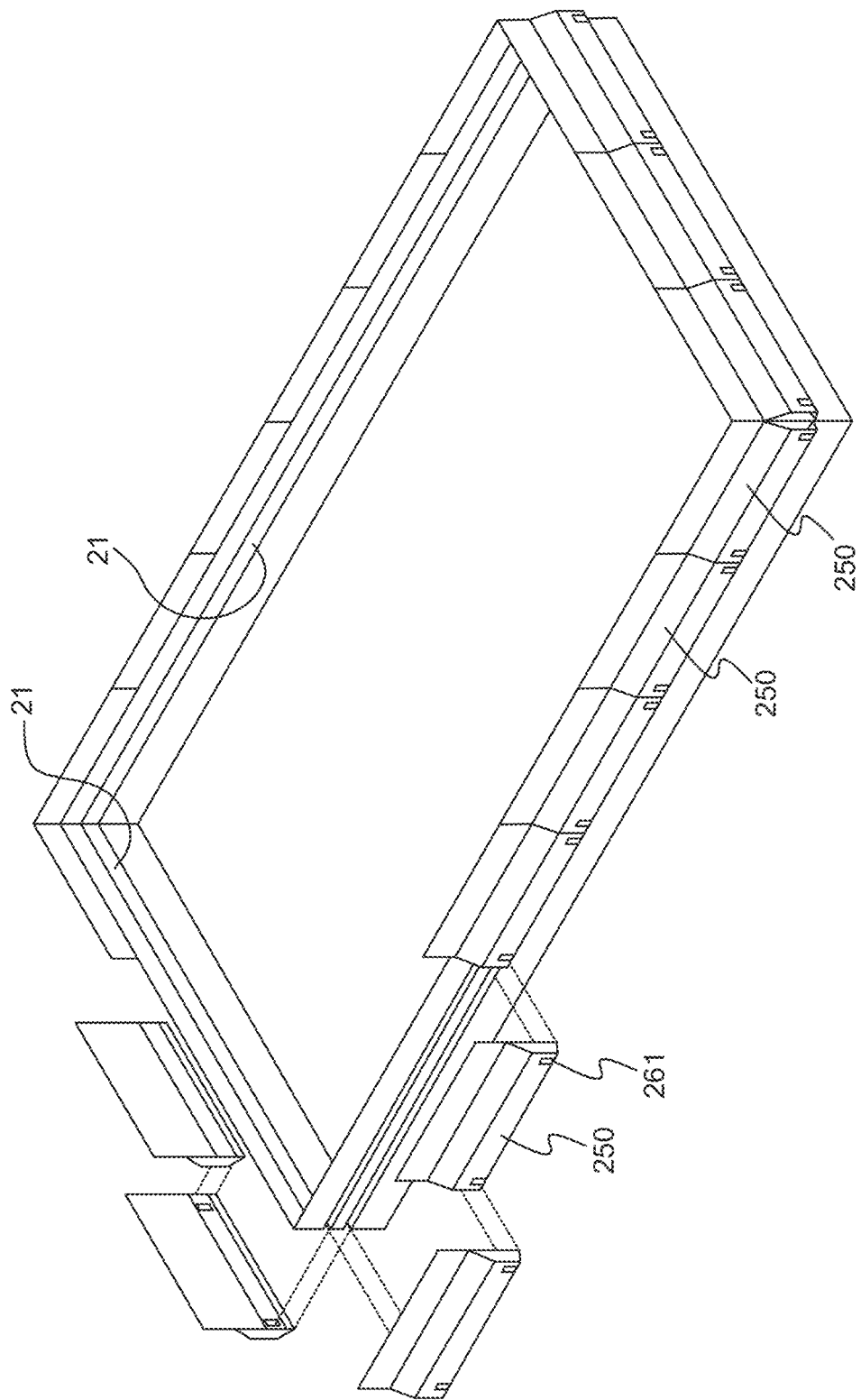
FIG. 19 shows profiles 21 of a turf module 100 onto which there is attached a plurality of resetting and storage walls 250.

The perspective view of FIG. 19 shows the profiles 21 of a turf module 100 (however with no turf yet), onto which there is attached a plurality of resetting and storage walls 250.

Part B—Turf Module Assembling System and Assembling Station

In order to obtain similarity between the plurality of turf modules, in particular similarity between adjacent turf edges, a turf module assembling station is provided. The turf module assembling station functions as a template for the construction of the turf modules 100. When constructing the turf modules, movable support bases 3 (cf. FIG. 21) are moved into position in the assembling station. In this position the movable support base 3 is filled with soil so that natural turf is able to grow on the upper surface of the module. By means of the turf module assembling station, one is able to provide a plurality of modules with substantially identical upper surfaces.

According to the invention, there is provided a turf module assembling system with a plurality of movable support bases with rigid wall portions, which are configured to carry a soil layer in a position horizontally between the rigid wall portions. The system further has a turf module assembling station comprising a turf module receiving area and a plurality of turf edge template walls peripherally arranged around the turf module receiving area. The turf edge template walls extend vertically up beyond the rigid wall portions when a movable support base is positioned in the turf module receiving area. In this manner, one is able to arrange a soil layer that extend vertically up beyond the rigid wall portions. Furthermore, each produced turf module may be substantially identical.

In particular, the turf edge template wall will govern the turf edge profile of an exposed portion of the turf edge. It shall be understood, that the turf edge may either be an existing turf edge, such as when using pre-grown slabs of turfs to build the turf layer of the turf module, or it may be a future turf edge, such as when a turf is grown after having built the structure of the turf edge.

The turf module assembling station can comprise a plurality of turf edge template walls. This will particularly be the case when a turf module shall comprise four turf edges, in a rectangular configuration.

The turf module assembling station can comprise an upwardly facing turf layer template edge (305) that corresponds to the uppermost level of a soil layer, when the soil layer has been arranged.

In some embodiments, the turf edge template wall can have a recessed portion (307). The recessed portion is recessed with respect to a lower portion of the turf edge template wall. In this manner, when constructing the turf edge with soil material, the turf edge will have a protruding portion (306) at the area of the recessed portion.

Figure 33:
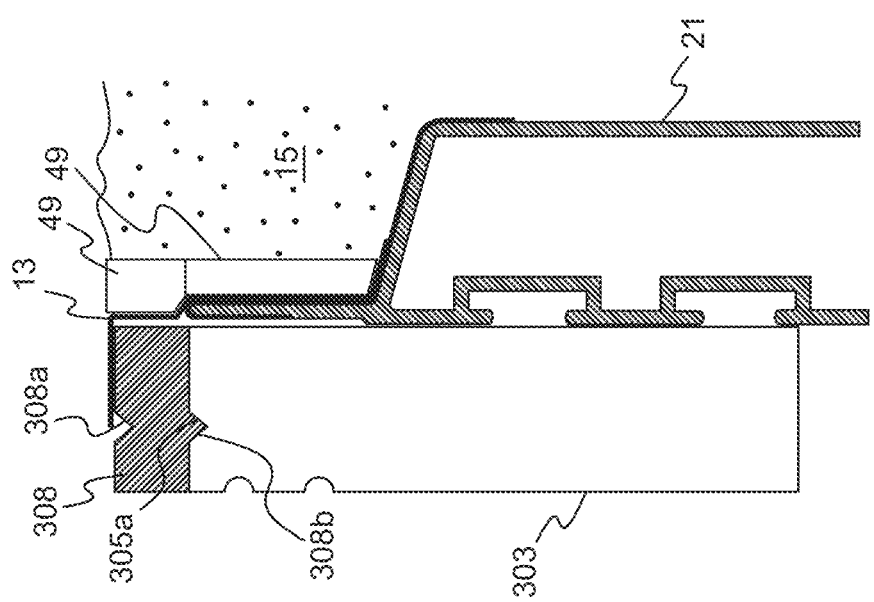
FIG. 33 illustrates a second elongated piece of water absorbing layer 49 arranged on top of a first piece.
Figure 41:
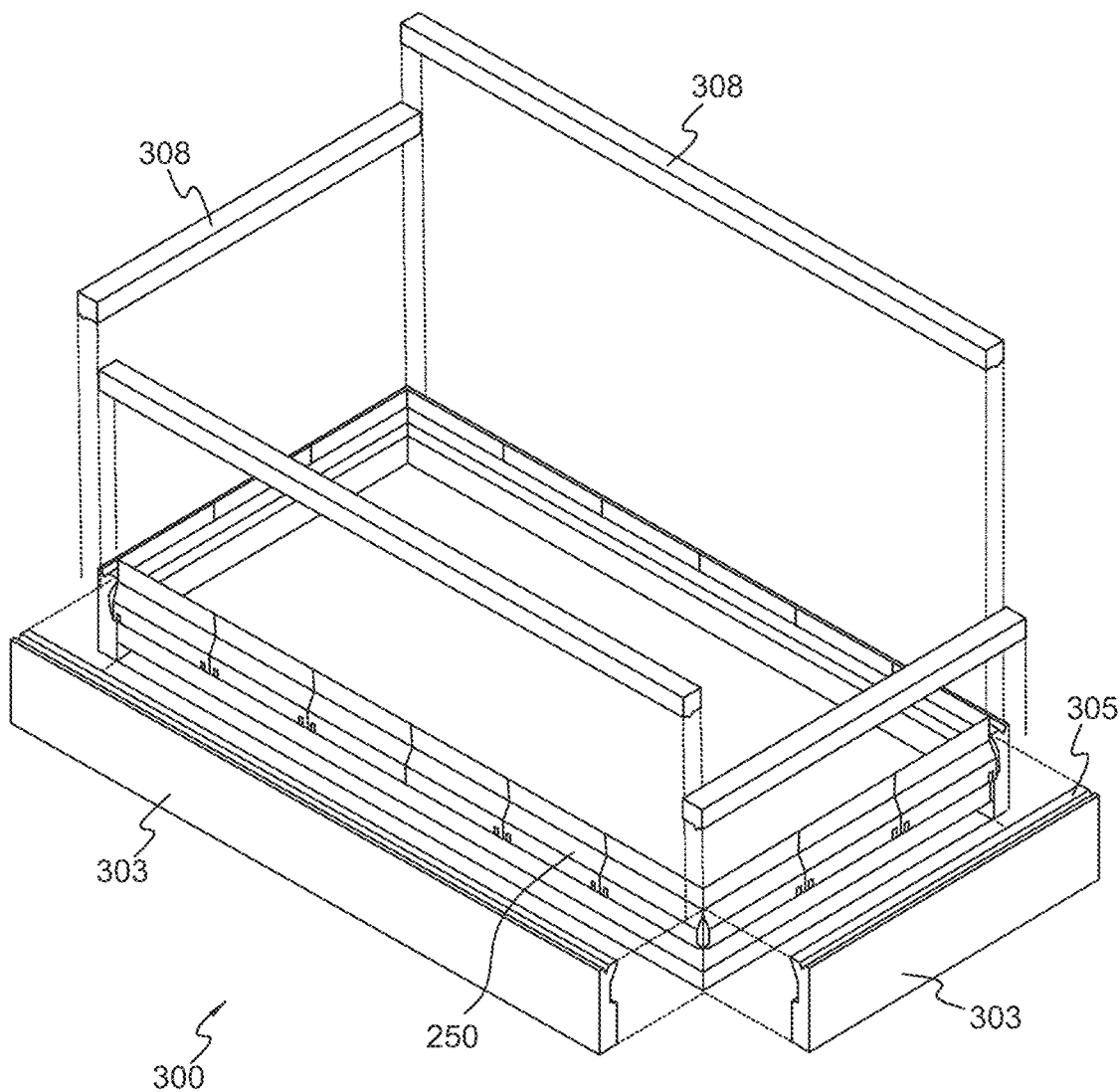
FIG. 41 shows an overview of various components used in association with a turf module assembling station 300.

The turf module assembling station may comprise a removable level beam configured to elevate the effective height of the turf edge template wall. Such an embodiment is depicted in FIG. 33 and FIG. 41.

A method is also provided, for building a turf module (100), comprising i) positioning a movable support base (3) adjacent a turf edge template wall (303);

ii) filling soil (15) material onto the movable support base (3), and arranging the soil (15) material to have a flat and even upper soil layer surface (315), wherein the upper soil layer surface (315) is at the same vertical level as a turf layer template edge (305).

B7) In a preferred embodiment of the method described above, the movable support base (3) is first arranged adjacent a first turf edge template wall (303), and then it is surrounded by four turf edge template walls (303).

Figure 20:
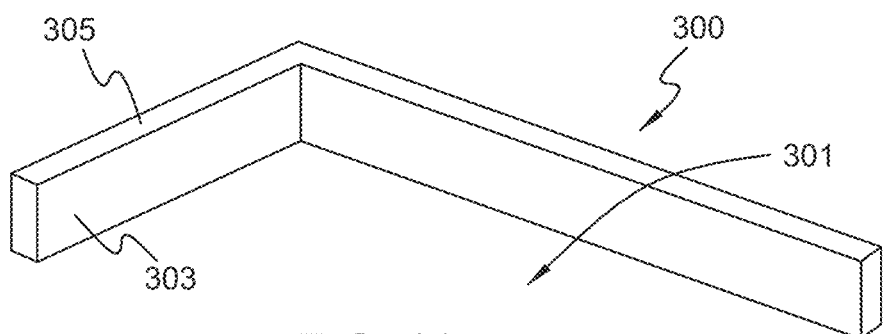
FIGS. 20 to FIG. 23 show perspective views of a turf module assembling station 300.
Figure 21:
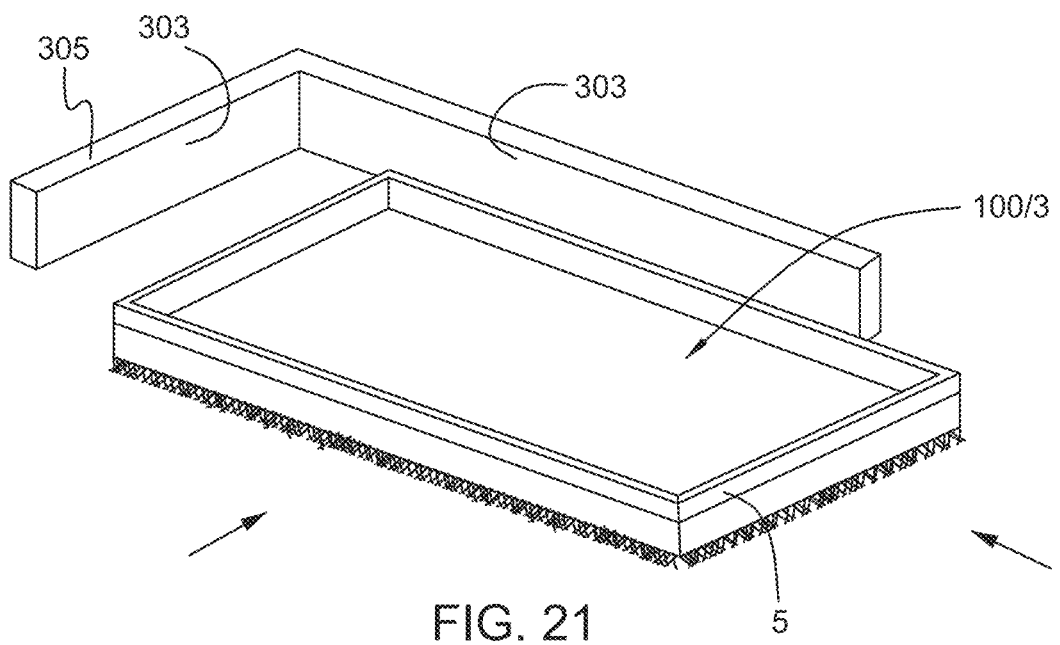
Figure 22:
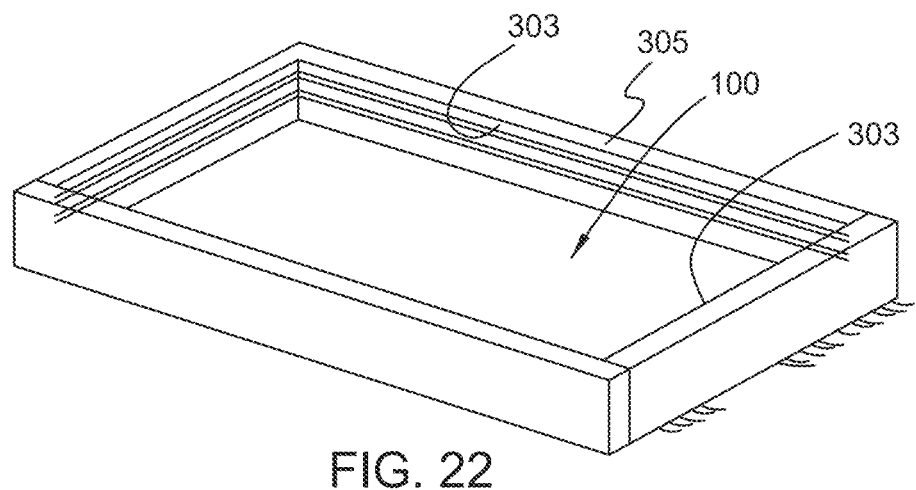
Figure 23:
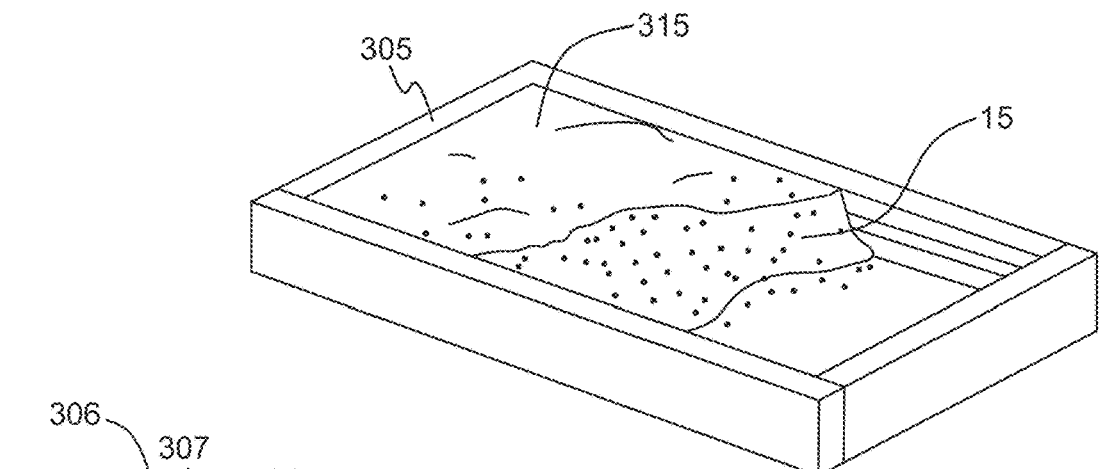

FIG. 20 to FIG. 23 show perspective views of a turf module assembling station 300. In FIG. 20, two turf edge template walls 303 are arranged. FIG. 22 shows a movable support base 3 being moved into abutment with the turf edge template walls 303. Then, cf. FIG. 22, a third and fourth turf edge template wall 303 are arranged adjacent the movable support base 3, so that four turf edge template walls entirely surrounds the movable support base 3. FIG. 23 depicts soil material 15 being filled onto the movable support base 3. An upwardly facing soil layer 315 is arranged, which will be flush with the turf layer template edges 305 when the soil filling process is finished. Preferably, the soil will be somewhat compressed with a suitable means.

Grass seeds may be sown onto the soil layer surface 315. Alternatively, pre-grown turf may be arranged. A mix of natural and artificial turf may also be arranged.

Once the soil filling process is performed, the resulting turf module 100 can be moved out from the turf module assembling station 300.

Figure 24:
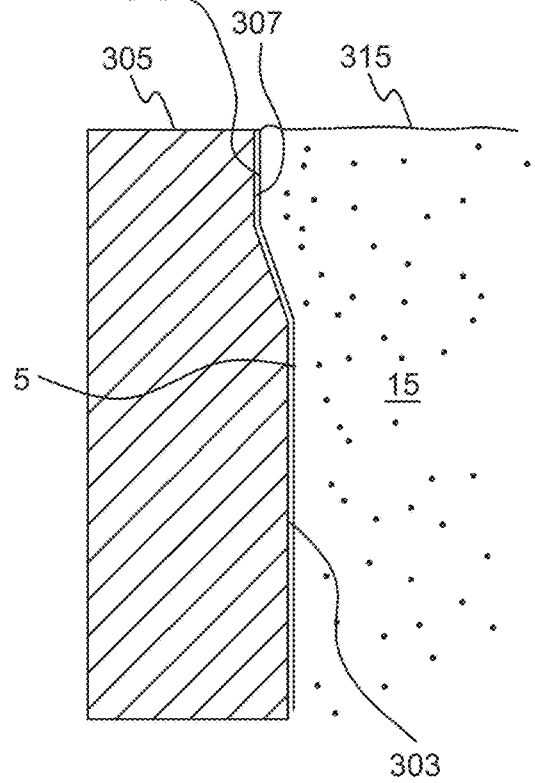
FIG. 24 illustrates a turf edge template wall 303 provided with a recessed portion 307.

FIG. 24 is an enlarged cross section view through a turf edge template wall 303 and a portion of the soil 15. In the embodiment shown in FIGS. 20 to 23, the turf edge template walls 303 have a strictly vertical extension, thus producing a vertical turf edge 5. However, in the embodiment shown in FIG. 24, the turf edge template wall 303 is provided with a recessed portion 307. As appears from FIG. 24, this recessed portion 307 produces a protruding portion 306 in the turf edge 5.

Figure 25:
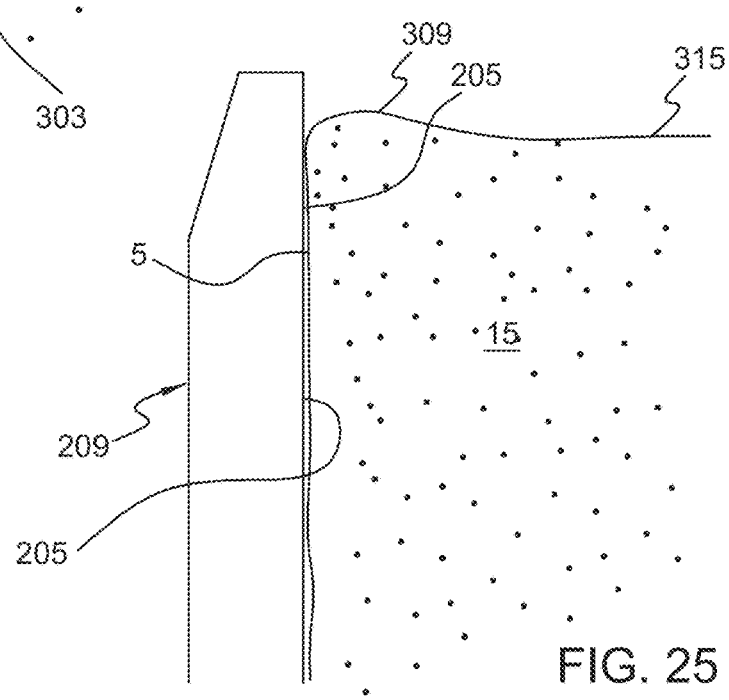
FIG. 25 depicts the same turf edge 5 as produced as shown in Fig. 24, after being reset with a turf edge resetting means.

FIG. 25 depicts the same turf edge 5 as produced as shown in FIG. 24, after being reset with a turf edge resetting means, here in the form of a turf edge resetting plate 209. In this embodiment, the turf edge resetting plate 209 has a strictly vertical turf edge resetting profile 205. The turf edge resetting means 209 forces back the protruding portion 306 (FIG. 24) of the turf edge 5. This produces an edge ridge 309 which protrudes upwards.

Figure 26:
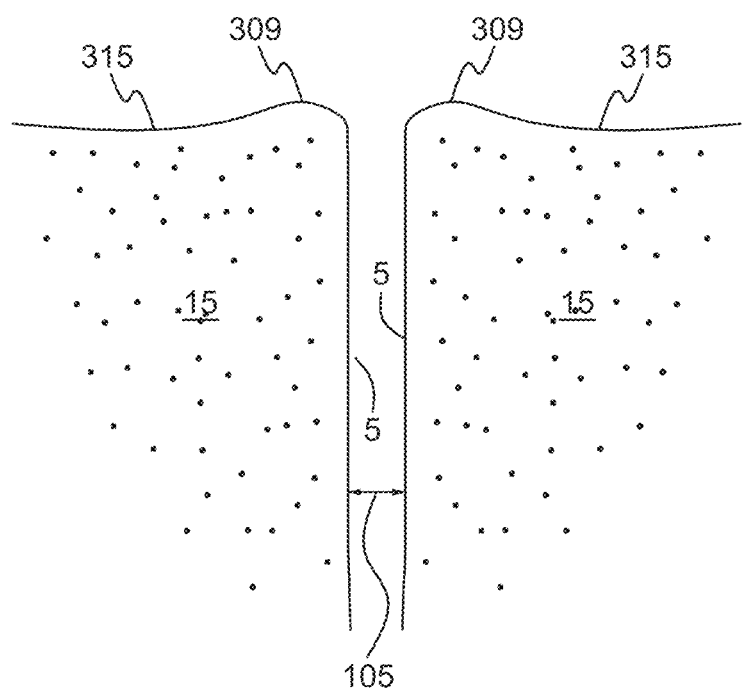
FIG. 26 illustrates two adjacent turf edges 5 being placed close to each other with a mutual distance.
Figure 27:
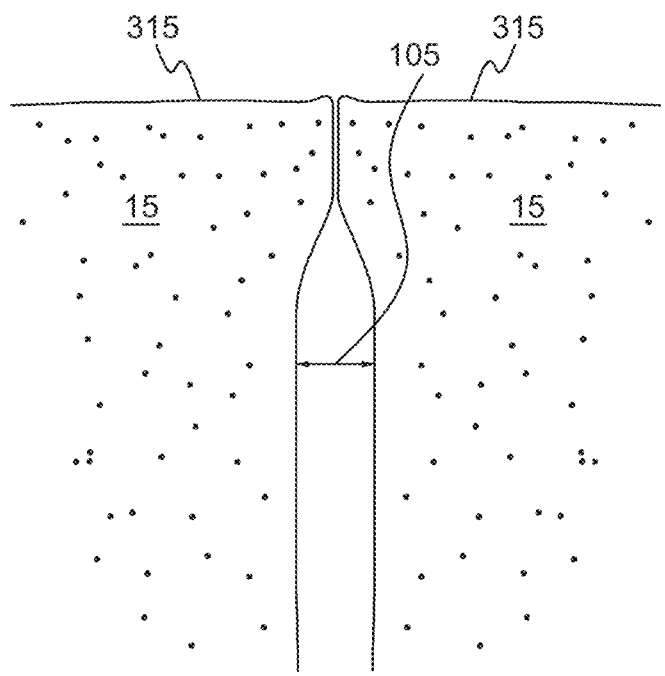
FIG. 27 illustrates a tolerance gap 105 between two adjacent turf edges 5.

Reference is made to FIG. 26, illustrating two adjacent turf edges 5 being placed close to each other, however with a mutual distance. Now, by compressing the edge ridges 309 downwards, to the same vertical level as the rest of the soil layer surface 315, one can close the gap between the two turf edges 5 at their upper section. This result is shown in FIG. 27. Such compression can take place for instance with a heavy lawn roller/drum.

In FIG. 26 and Fig. 27 there is indicated a tolerance gap 105 between the two adjacent turf edges 5.

Figure 28:
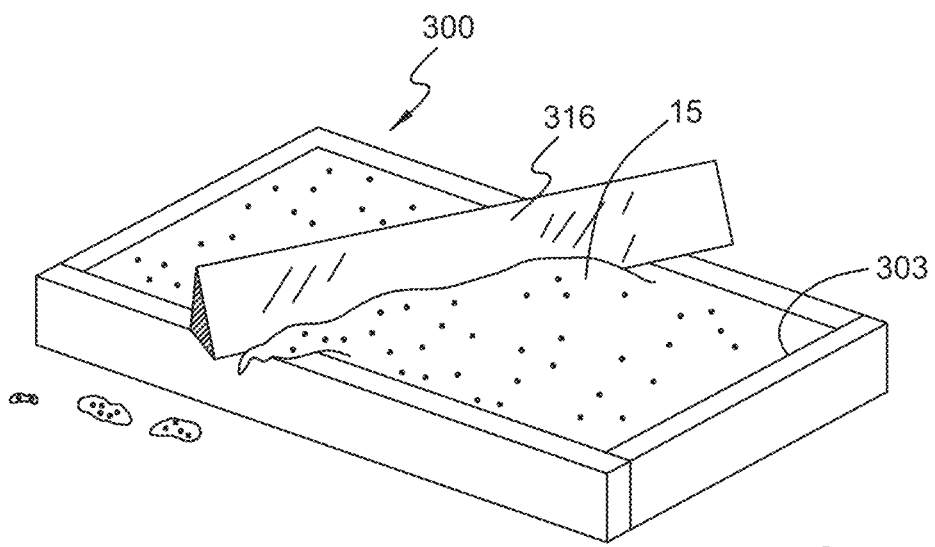
FIG. 28 shows surplus soil being wiped away with a straight beam member 316.

FIG. 28 shows surplus soil being wiped away with a straight beam member 316.

Figure 29:
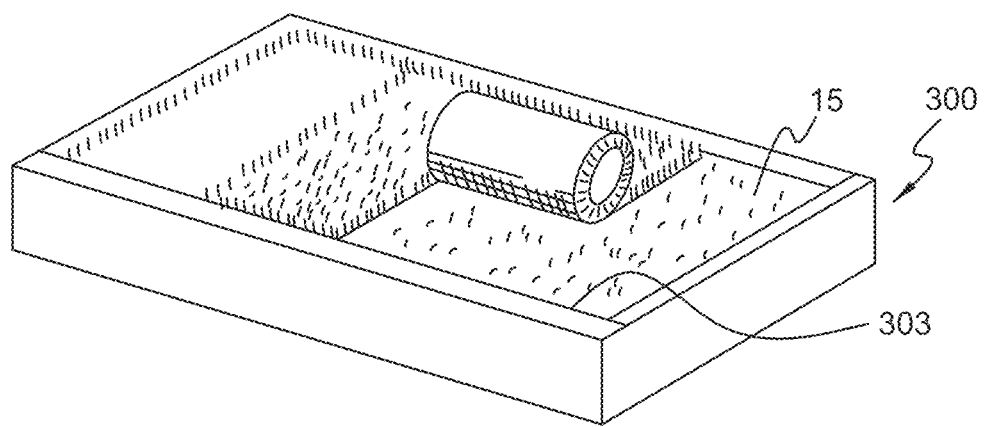
FIG. 29 shows slabs of pre-grown turf being rolled onto the upper surface of the soil.

FIG. 29 shows slabs of pre-grown turf being rolled onto the upper surface of the soil.

Figure 30:
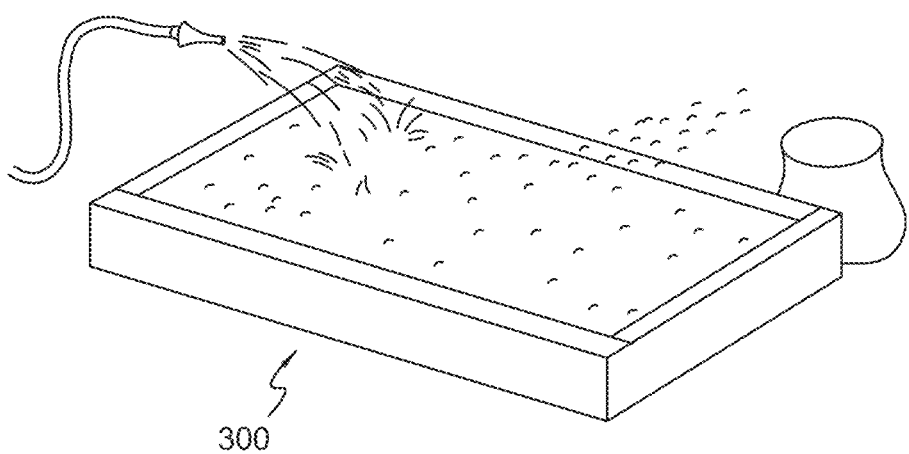
FIG. 30 shows a process of sawing turf seeds on the top surface of the soil.

FIG. 30 shows the process of sawing turf seeds on the top surface of the soil.

Figure 31:
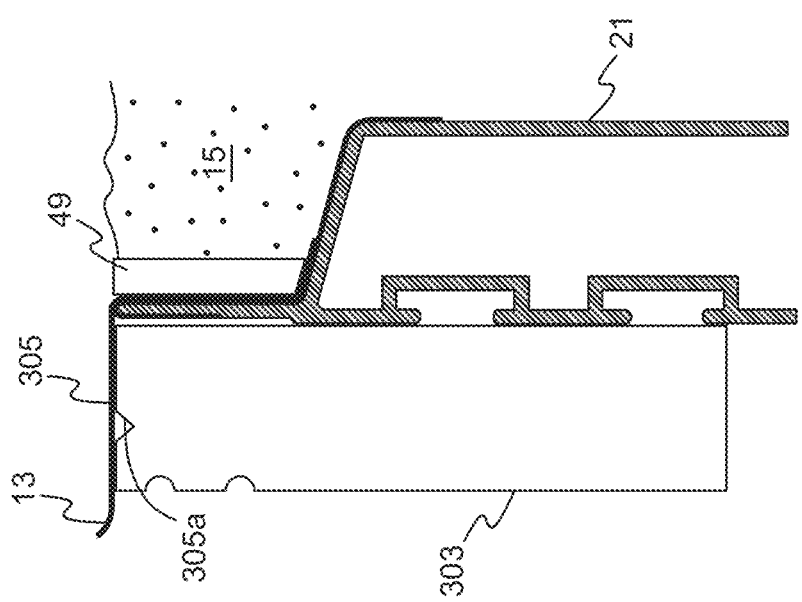
FIG. 31 illustrates a rigid side portion or a wall profile 21 of the turf module 100, arranged against a turf edge template wall 303.

FIG. 31 illustrates a rigid side portion or a wall profile 21 of the turf module 100, arranged against a turf edge template wall 303 (cf. FIG. 21). A flexible root barrier sheet 13 is installed between the inwardly facing face of an upper portion of the profile 21, and the soil 15. The root barrier sheet 13 can for instance be made of PVC (polyvinyl chloride). Between a part of the root barrier sheet 13 and the soil 15, there is arranged a water absorbing layer 49. Notably, the turf layer template edge 305 is at the same vertical level as the upper portion of the profile 21, the water absorbing layer 49, and the soil 15. Moreover, as illustrated in FIG. 31, the soil 15 has not been compacted.

Figure 32:
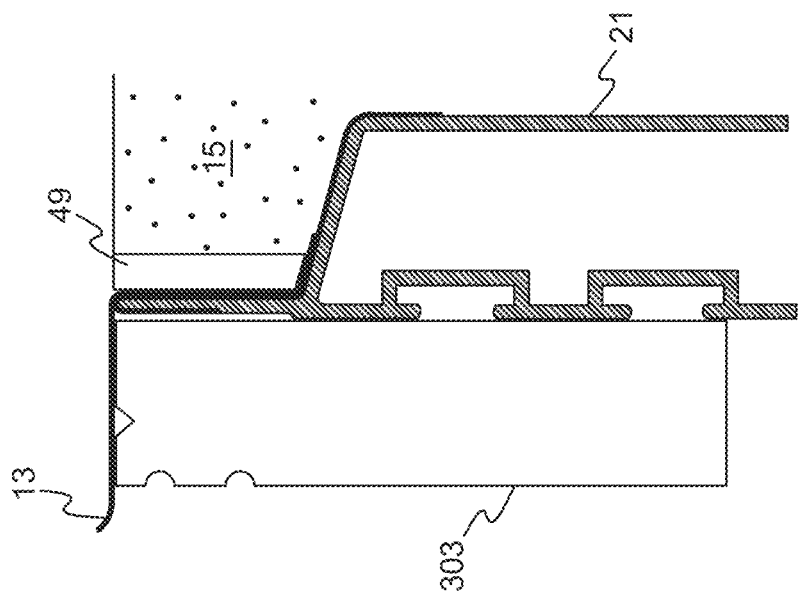
FIG. 32 illustrates soil 15 that has become compacted, its upper surface being even and at the level of the turf layer template edge 305.

In FIG. 32, the soil 15 has become compacted, and its upper surface is even and at the level of the turf layer template edge 305. In the embodiment discussed here, one wants to arrange the upper portion of the profile 21, which typically may be a rigid and hence possibly harmful structure to players, a significant distance below the final upper face of the turf module 100. A second elongated piece of water absorbing layer 49 is arranged on top of the first piece, as shown in FIG. 33. Moreover, a level beam 308 is arranged on top of the turf layer template edge 305 of the turf edge template wall 303. The level beam 308 supports the second piece of water absorbing layer 49. Additional soil 15 is provided onto the existing, compacted soil 15, to the upper level of the second piece of water absorbing layer 49.

Notably, the turf layer template edge 305 is provided with a support recess 305a which is configured to receive a support protrusion 308b of the level beam 308.

Thus, there is provided a turf module assembling station (300) comprising a turf edge template wall (303), and a removable level beam (308). Advantageously, the upper face of the turf edge template wall (303) comprises a support profile (305) configured to engage an opposite level beam support profile (308) of the removable level beam (308).

In some embodiments, natural turf seeds may now be sown on top of the soil to grow a natural turf on the turf module 100.

In other embodiments, as will be discussed in the following, an artificial turf can be provided onto the compacted soil 15. Moreover, such embodiments may include merely an artificial turf or a hybrid turf, i.e. a combination of artificial turf and natural turf. In the following example, a hybrid solution is discussed.

Reference is made to FIG. 35. A turf reinforcement layer 19 is arranged onto the compacted soil 15. In this embodiment, the turf reinforcement layer 19 is provided with upwardly extending artificial turf or synthetic fibers 19b. In other embodiments, the turf reinforcement layer could be without artificial turf, but merely be a reinforcement layer embedded in the upper portion of the soil 15.

In this embodiment, the turf reinforcement layer 19 extends horizontally beyond the edge of the turf module 100 (i.e. beyond what will become the final turf edge 5). Thus, a reinforcement cutter 119 is used to cut the turf reinforcement layer 19. The schematically illustrated reinforcement cutter 119 is shown in FIG. 36. It has a cutting portion 119b and a cutter guide 119a. The cutter guide 119a is configured to engage a guiding profile 303a in the turf edge template wall 303.

Figure 37:
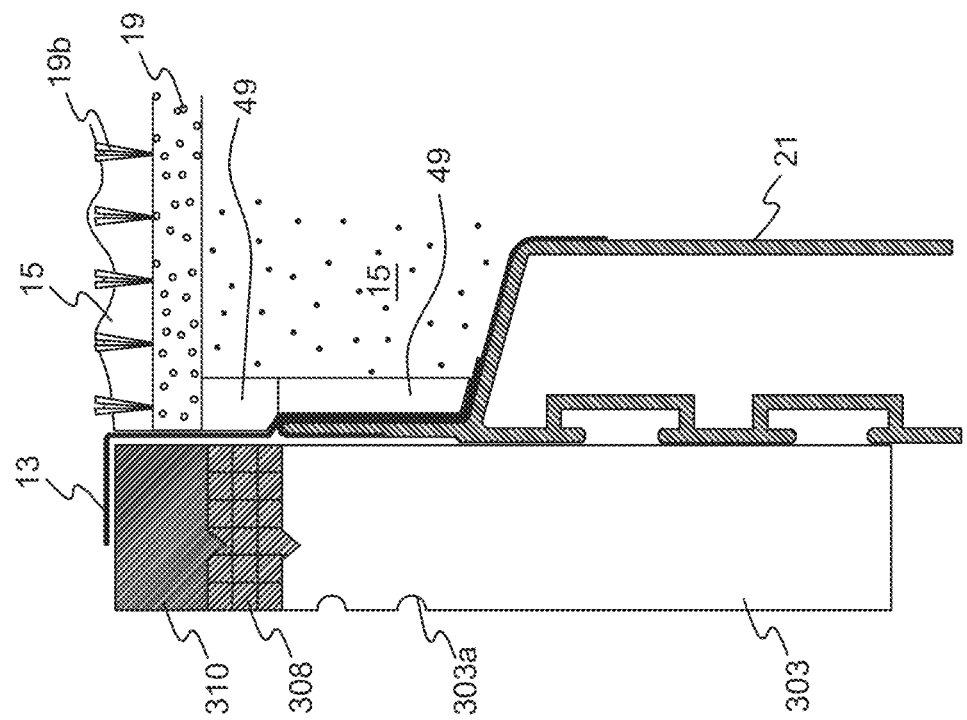
FIG. 37 illustrates cut-away of an excess portion of the turf reinforcement layer 19.

In the situation shown in FIG. 37, the excess portion of the turf reinforcement layer 19 has been cut away. Moreover, a second level beam 310 has been placed on top of the first level beam 308. Additional soil 15 has been provided on top of (and into) the turf reinforcement layer 19. The upper face of the second level beam 310 can advantageously correspond to the upper level of the additional soil 15. Natural turf may now be sown on the additional soil 15, to obtain a hybrid turf, i.e. a combination of artificial turf 19b and natural turf.

When the turf module 100, comprising the hybrid turf as discussed above has been built, the turf module 100 can be removed from the turf module assembling station 300. Resetting and storage walls 250 may then be attached onto the rigid side portion (profile 21) of the turf module 100, thereby retaining a correct turf edge while the natural turf 17 is grown. Alternatively though, one can also assemble a plurality of turf modules 100 into a pitch formation or at least adjacent each other, thereby retaining the turf edges in good condition.

Figure 38:
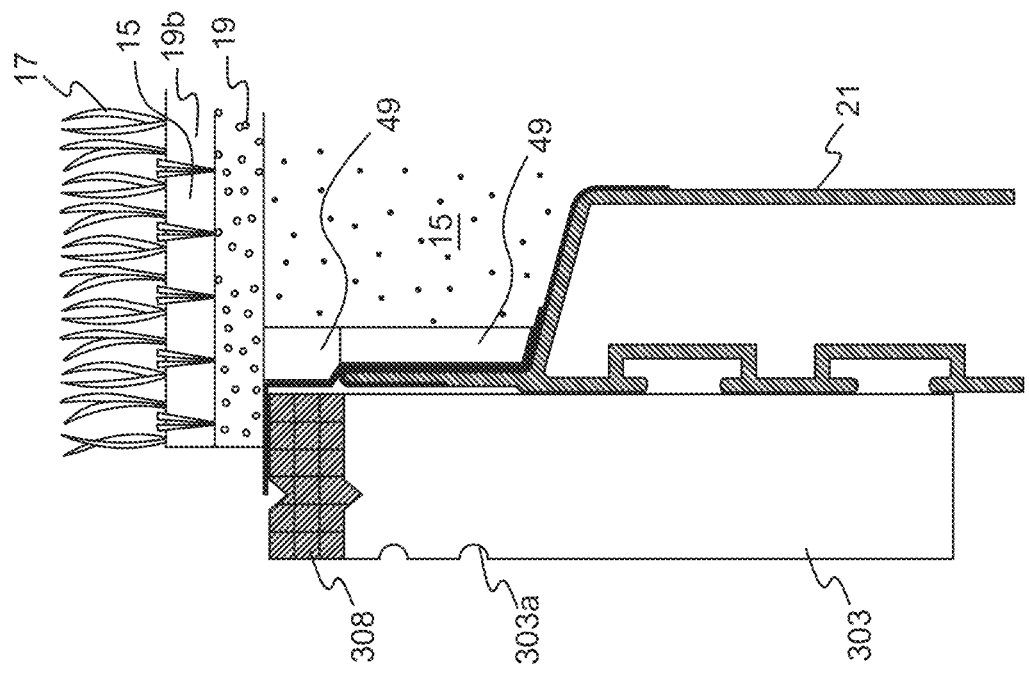
FIG. 38 depicts an alternative method of obtaining a turf surface and a turf edge.

FIG. 38 depicts an alternative method of obtaining a turf surface and a turf edge. In this embodiment, a pre-grown hybrid turf has been provided (grown), and is then arranged on top of the soil 15. Possible excessive turf which extends horizontally beyond the edge may be cut off with the reinforcement cutter 119 or a similar cutter. It should be clear, however, that pre-grown slabs of hybrid turf (combination of a turf reinforcement layer 19 and natural grown turf 17) may be provided, which more exactly correspond to the dimensions of the turf modules 100. For instance, for a turf module 100 having an area of 9.0×4.5 meters, pre-grown slabs of for instance 4.5×1.5 meters may be grown. One will then not need the step of cutting the pre-grown hybrid turf.

Level beams, such as the first and second level beams 308, 310, have been discussed above for use when building the turf and turf edge of a turf module. A level beam may also be used as a template when cutting off an upper layer of a turf module 100. After some use, the upper vertical level of the turf will raise. Hence, one may want to cut off the turf in order to re-turf the module. A cutting knife may then be inserted horizontally into the turf edge, while sliding on a template level beam, in order to cut at a desired height/level.

Figure 34:
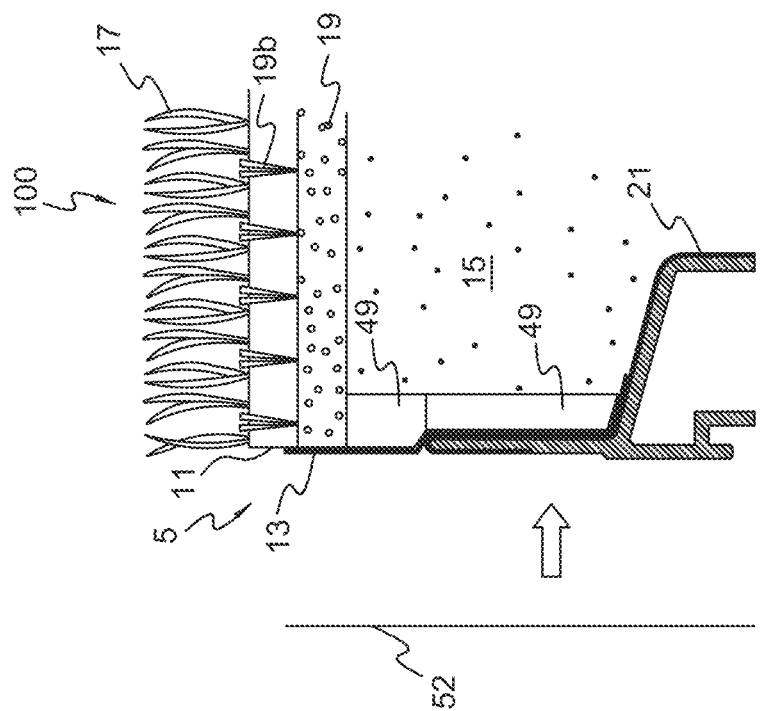
FIG. 34 shows a turf edge 5 of a turf module 100.

FIG. 34 shows a turf edge 5 of a turf module 100, which has been built according to one of the methods discussed above. Notably, the exposed root zone 11, through which turf roots may grow and bridge over to an adjacent turf edge 5, is confined to the soil portion 15 above the turf reinforcement layer 19, if the vertical extension of the artificial turf 19b is disregarded. Hence, in a preferred embodiment, the exposed root zone 11 is less than 3 cm, advantageously less than 1 cm, and can in some embodiments be less than 1 cm. It is recalled that the uppermost rigid—and thus harmful structure to players—is the upper portion of the profile 21.

Figure 40:
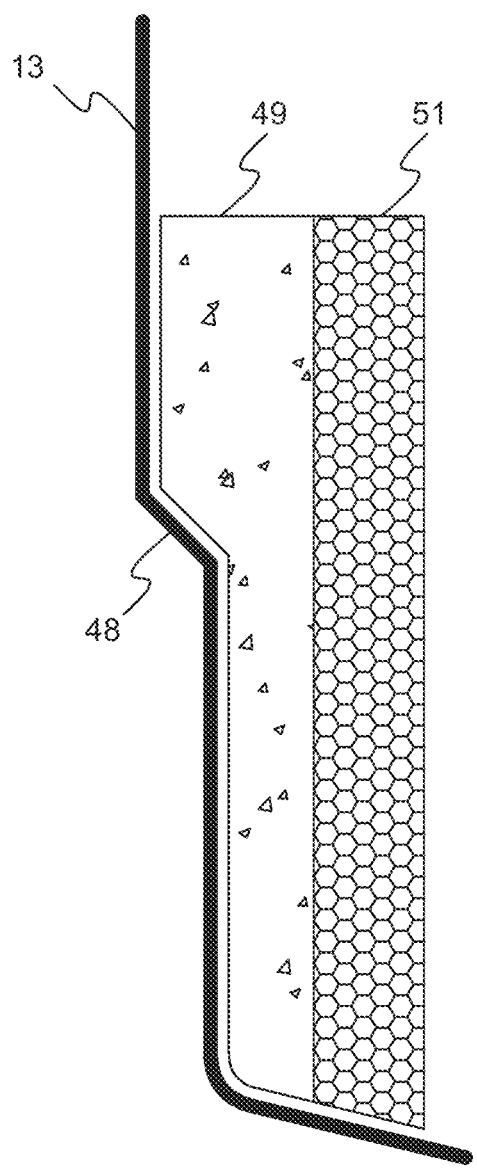
FIG. 40 depicts an embodiment of a sandwich structure of a root barrier 13 and a water absorbing layer 49 made in one single structure.

In some embodiments, the root barrier 13 can be a fixed part of a sandwich structure comprising both the root barrier 13 and the water absorbing layer 49. Such a sandwich structure could also in some embodiments include more components, for instance a mesh 51. FIG. 40 depicts an embodiment of a sandwich structure of a root barrier 13 and a water absorbing layer 49 made in one single structure. Also, in this embodiment, a mesh 51 is arranged as a part of the structure. Notably, the structure has a shoulder 48 configured to abut an upper edge of the profile 21, which is a rigid side wall portion of the turf module 100.

Thus, there is provided an elongated structure comprising a root barrier sheet (13) and fixed thereto a water absorbing layer (49), wherein a portion of the root barrier sheet (13) extend beyond an edge of the water absorbing layer (49).

In embodiments where the root barrier 13 is not part of such a combined structure, it may be fixed to the turf edge for instance by means of an adhesive, nails, or stitching. For instance, a nail, such as of a synthetic material/plastic, may be inserted through the root barrier sheet 13 and a distance into the soil 15 and/or into the turf reinforcement layer 19.

Still referring to FIG. 34, in some embodiments, a low friction sheet 52 is attached onto the root barrier 13 and profile 21, to provide low friction when adjacent turf modules 100 are slid against each other. The low friction sheet 52 can be made of nylon. The low friction sheet 52 will also prevent matter (e.g. dirt) from entering the slot between the root barrier sheet 13 and the upper portion of the profile 21.

Figure 15:
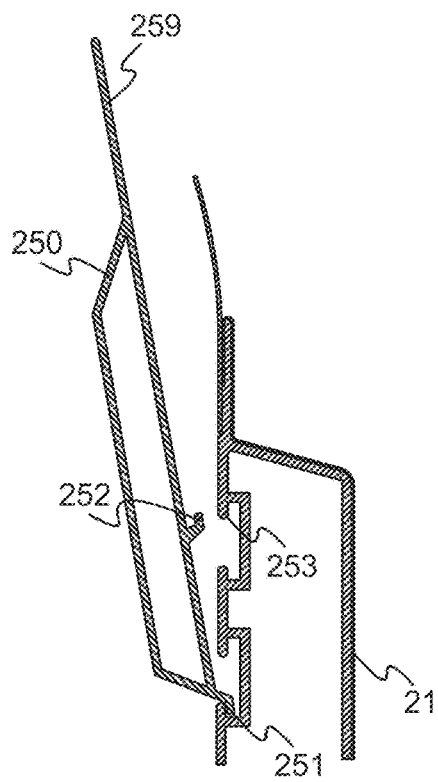
FIGS. 15 and 16 depict an alternative embodiment of a resetting and storage wall 250.
Figure 39:
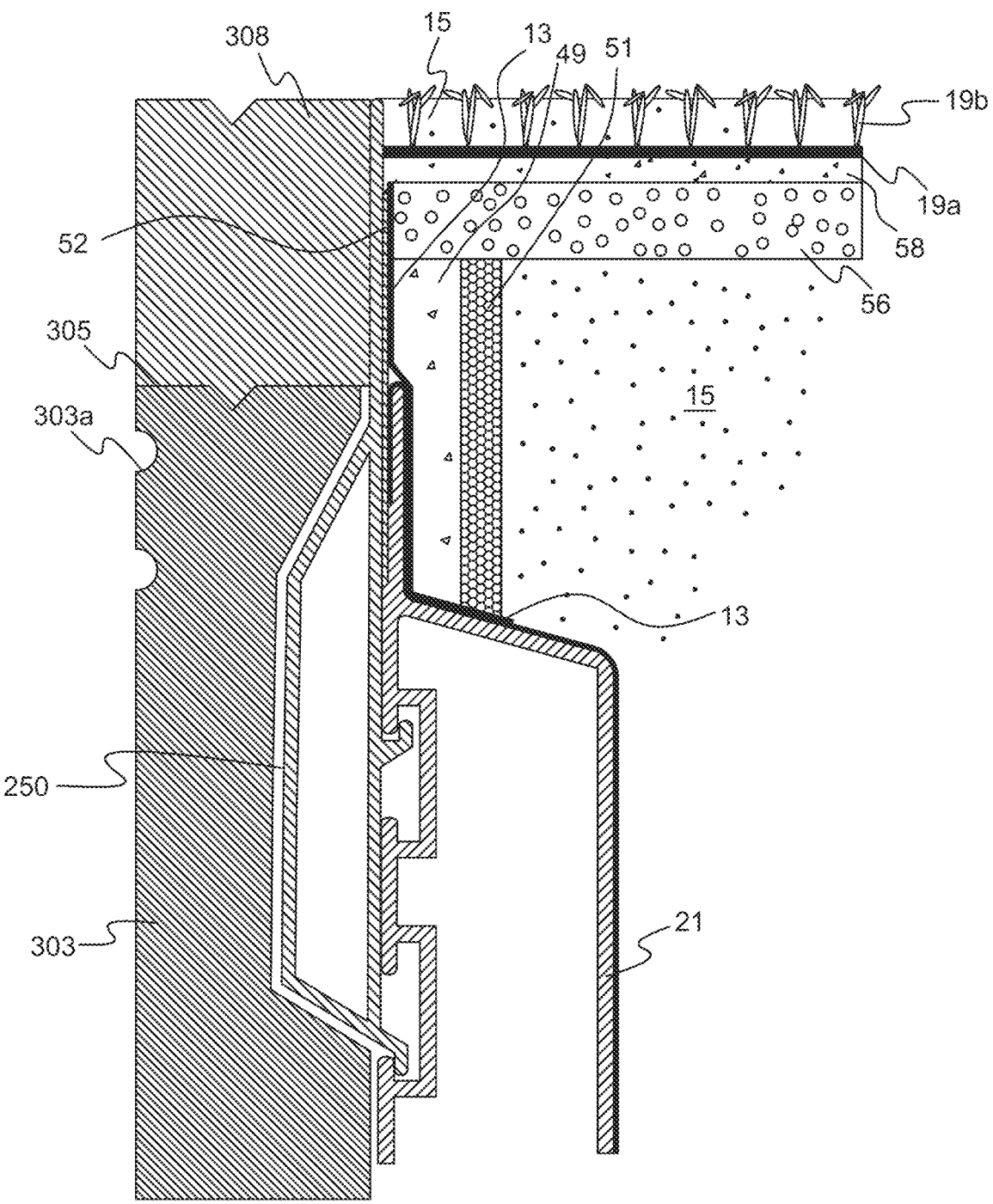
FIG. 39 shows a removable resetting and storage wall 250 attached to the turf module 100 while the turf module 100 is arranged in a turf module assembling station 300.

FIG. 39 shows an embodiment wherein a removable resetting and storage wall 250 (cf. for instance FIG. 15) is attached to the turf module 100 while the turf module 100 is arranged in a turf module assembling station 300 (having turf edge template walls 303 (cf. FIG. 20). Notably, the turf edge template wall 300 is provided with a recess, which receives a structure of the resetting and storage wall 250. In this way, one does not need to attach the resetting and storage wall 250 after having built the turf module.

In the embodiment shown in FIG. 39, the water absorbing layer 49 is made in one single piece, contrary to the embodiment discussed above. Moreover, a mesh 51 is arranged adjacent the water absorbing layer 49. The mesh 51 will increase soil stability close to the turf edge 5.

In the shown embodiment (FIG. 39) there is a shock pad 56 arranged on top of the main soil 15, i.e. between the mail soil 15 and the turf itself. Moreover, on top of the shock pad 56, there is arranged a filter membrane 58. The filter membrane 58 prevents material from the upper layer of soil 15 (typically sand) from entering down and into the shock pad 56. The shock pad 56 and the filter membrane 58 are advantageously designed such that the turf roots will grow through them, down into the lower, main layer of soil 15.

The shock pad 56 can for instance be made of injected PVC. Advantageously, it ca be designed as a plurality of PVC threads which are tangled together into the shape of a mat.

In the drawing shown in FIG. 39, the turf reinforcement layer 19 is shown as a mat 19a, up from which artificial turf 19b extends. Moreover, turf seeds have been sown onto the upper layer of soil 15.

In the shown position (FIG. 39), the upper wall edge 252 of the resetting and storage wall 250 protrudes upwards, and will be inserted behind the downwardly protruding profile edge 253 of the profile 21. Notably, both the upper wall edge and the profile edge 253 are provided with a small bulb or protrusion. When the resetting and storage wall 250 is elevated into its attached position, the two bulbs move past each other, and retains the wall 250 in the attached position.

In the prior art, turf modules are arranged adjacent each other on a flat surface when filling the movable support base of the turf modules with soil. This is a convenient method for obtaining turf modules which may form a flat turf surface when being installed adjacent each other. Contrary to this, a method is disclosed herein, of building a plurality of turf modules which are configured to form a turf field when assembled adjacent each other, wherein the turf modules are built independent of each other. That is, they are filled with soil and provided with turf without using adjacent turf modules as a template or support for obtaining a correct vertical level of the turf surface. Instead, the method involves using a turf module assembling station (300).

FIG. 41 shows an overview of various components used in association with a turf module assembling station 300, with an exploded view. In particular, turf edge template walls 303 and level beams 308 are shown. Also shown are resetting and storage walls 250, which are mounted peripherally about the turf module, such as shown in FIG. 39.

Part C—Deployment of Turf Modules with Tolerance Gap

Previously, when deploying a plurality of turf modules together to form a sports field, practice has been to arrange the turf edges in contact with each other. That is, when arranging one turf edge adjacent an already installed turf edge, the turf edges are forced against each other, so that no gap exists between the two adjacent turf edges, or so that a possible gap exists due to an unintentional inclined orientation of the module.

Publication FR2901287 A1 describes inter alia a solution where the turf edge is compressible/flexible, so that when the modules are moved into contact, the flexibility of the turf edge provides a smooth edge interface. Such flexibility takes account for manufacture tolerances, erroneous positioning, and expansion of the module tray. FR2901287 A1 also suggests a solution where modules can be arranged with significant gaps between them of about 3 to 8 cm, which are filled with elongated elements of synthetic material for drainage and for sealing the gaps. Both these solutions take account of the position of a previously deployed turf module, when positioning the succeeding module.

Contrary to this, however, there is disclosed a method of providing a turf sports field by deploying a plurality of turf modules having an upper turf surface and peripheral turf edges, wherein the method comprises the following steps:
  a) by means of a remotely operated or autonomously operated lifting and transport vehicle, which is provided with a lifting arrangement, moving turf modules from a non-installed position towards an installed position;
  b) by means of a positioning system, which is configured to detect and deliver turf module position information, detecting the position of the turf module that is being moved; and
  c) installing turf modules adjacent to previously installed turf modules, with a tolerance gap between adjacently positioned turf edges of different turf modules, wherein the positions, into which the turf modules are installed, are based on turf module position information from the positioning system.

In some embodiments, step c) may comprise at least one of the following:
  i) based on information from the positioning system, installing turf modules in a predetermined target position; or
  ii) based on information from the positioning system, installing turf modules in a position governed by the position of previously installed turf modules.

Hence, in one embodiment, the turf modules are positioned in predetermined positions, which are not dependent on the position of previously installed modules. In such embodiments, the positioning system will deliver turf position information relating to the absolute position of the turf in question. In the other embodiment, the turf modules are placed in positions that are at least in part based on the position of previously installed modules. In such embodiments, the positioning system will deliver turf position information that comprises information of the turf module position with respect to a previously installed turf module. In that way, one may obtain a better control of the tolerance gaps, since an erroneous position of a previous module will be accounted for when placing the next module adjacent to it.

The term "predetermined target position" means that the turf modules are arranged in a position which is not governed by the position of other deployed turf modules. Rather, it is a predetermined position on a fixed support base, into which the turf module shall be placed. Of course, the respective predetermined target positions of respective adjacent turf modules are laid out with a pattern, thus not being arbitrary. However, according to the presented method above, the actual position of a previously deployed turf module does not alter the predetermined target position of another, not yet deployed target position. In other words, the position of the predetermined target position was determined before the deployment of a preceding turf module, and is thus not affected by the deployment of such a preceding turf module.

By installing the modules with tolerance gaps between their turf edges, the method of deploying the turf modules is suited for module deployment without friction between adjacent and facing turf edges. In this way, less damage to the turf edges of the turf modules is inflicted during deployment of the turf modules.

When arranging the modules in positions that are governed by the position of previously installed turf modules, the positioning system will deliver information on such previously installed modules. Such position information may be measured, or may be recorded during the installment of the previous modules, or both.

Advantageously, during step c), the tolerance gap is void when a turf module is installed adjacent a previously installed turf module.

In further advantageous embodiments, a turf edge resetting assembly is used to reset the shape of the turf edges before installing the turf modules, i.e. before step a) above. This step contributes in avoiding contact between the turf edges during installation. Various types of a turf edge resetting assembly may be used, of which some are discussed herein.

When resetting the turf edges before installing the turf modules, one may reset the turf edges to the template shape, which corresponds the shape governed by the turf module assembling station. Alternatively, one may reset the turf edges inwardly beyond this template shape, in order to even further reduce the risk of contact between the turf edges during installation of the modules.

As discussed herein, after installation, the turf edges will creep towards each other to fill the tolerance gap, thereby providing a smooth, closed interface between adjacent turf edges.

Figure 42:
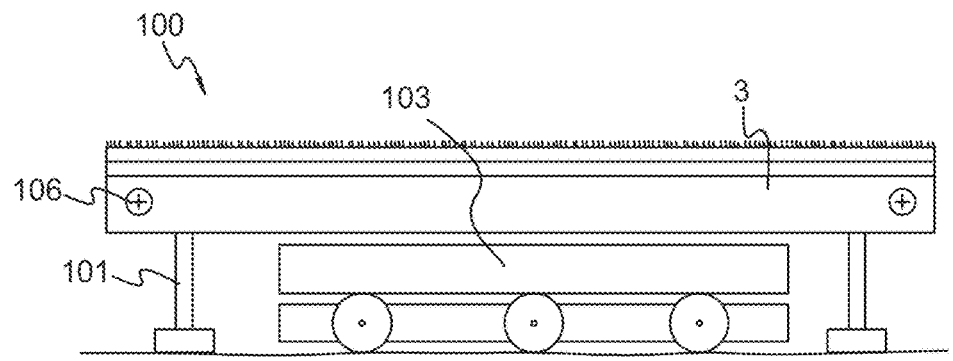
FIGS. 42 and 43 schematically depict an operated or remotely operated lifting and transport vehicle 103.
Figure 43:
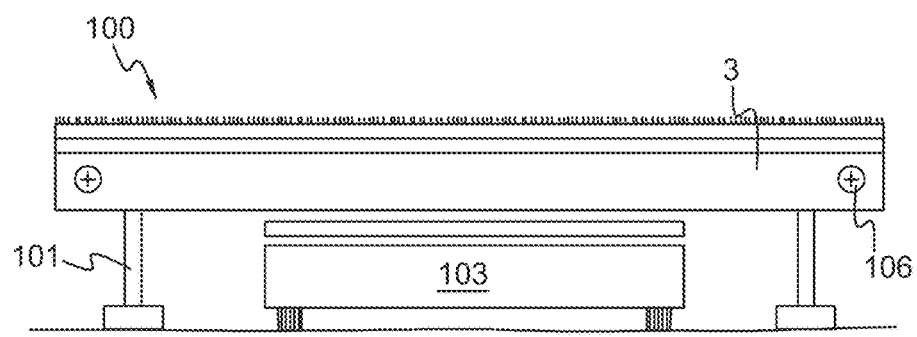

FIG. 42 and FIG. 43 schematically depict an operated or remotely operated lifting and transport vehicle 103, which is positioned below the movable support base 3 of a turf module 100. As shown in FIG. 43, the vehicle 103 is able to move into position between the support legs 101. The vehicle may be produced in various ways and may exhibit various functions. One possible and commercially available vehicle, which may be suitable for the method disclosed herein, is a vehicle known under the name "Kuka omniMove". The lifting arrangement of the operated or remotely operated lifting and transport vehicle will not be described herein. However, various lifting means may involve hydraulic pistons or electric actuators.

In some embodiments, the operated or remotely operated lifting and transport vehicle is positioned, when lifting the turf module, entirely within the area of the turf layer (i.e. not being visible from above). Thus, according to some embodiments, the lifting and transport vehicle 103 may have a footprint, which is less than the footprint of a turf module 100. In alternative words, the vertical projection of the turf module may cover the entire vertical projection of the vehicle. A result of this feature is that the vehicle 103 can move the turf module 100 towards an already installed, adjacent module along any suitable direction. Contrary to this, by using for instance a forklift, one cannot arrange the module edge that faces the forklift, against an already installed turf module. This feature may advantageously be used method above. This feature is illustrated with the schematic drawings of FIG. 42 and FIG. 43. The method may hence include arranging the lifting and transport vehicle entirely in between the turf edges.

FIG. C3 shows six turf modules 100, which are positioned to form a part of a sports field, such as a football field in a sports stadium. Indicated with the arrows are tolerance gaps 105. The size of the tolerance gaps 105 will depend on the control of the lifting and transport vehicle 103. That is, the tolerance gaps 105 will be adjusted to how accurate one is able to position the turf modules 100 with respect to the target positions. For instance, if the lifting and transport vehicle 103 is able to position the turf modules 100 within a tolerance of +/−2.0 millimeters, one should lay out the target positions in such way that the average tolerance gap will be 4.0 millimeters. In that way, one may expect that none of the turf edges 5 will slide against an adjacent turf edge 5, at least not with a significant force.

Figure 44:
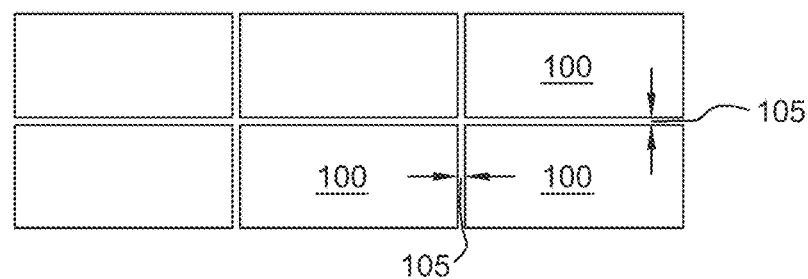
FIG. 44 shows six turf modules 100, which are positioned to form a part of a sports field.

In the embodiment shown in FIG. 44, the turf modules 100 are arranged in a linear configuration in both transverse, horizontal directions. That is, four turf modules 100 meet each other at one intersection with a respective turf edge corner. With this configuration, cross shaped interfaces will result. Contrary to this, the embodiment shown in FIG. 45 has a configuration where the turf modules exhibit a staggered layout. That is, each row of rectangular shaped turf modules 100 is somewhat staggered with respect to the adjacent row. In that manner, T-shaped intersections will result. With such a layout of the turf modules 100, the intersections between the turf modules 100 will tolerate more than the intersections with the layout shown in FIG. 44.

According to another aspect of the invention, there is provided a turf sports field system comprising a turf sports field constituted at least in part of a plurality of turf modules with peripheral turf edges, and further comprising one or more remotely operated or autonomously operated lifting and transport vehicles that are configured to lift and move the turf modules. When the turf modules are in installed positions, the positions of the turf edges of respective turf modules are adjacent turf edges of adjacent turf modules, and there is a tolerance gap between the adjacent turf edges.

With such a turf sports field system, harm to the turf edges during installation is avoided, since they are installed without contacting each other.

Gaps between facing turf edges can be configured to be closed by creeping of the turf edges towards each other. This will be discussed with reference to FIG. 24 to FIG. 27.

In preferred embodiments, the tolerance gap can be between 0.5 and 30 millimeters, and preferably between 0.5 and 20 millimeters.

Advantageously, the turf sports field system can further comprise a turf edge resetting assembly, which is configured to reset turf edges towards a template shape. By using such a turf edge resetting assembly before installation of the turf modules, one reduces the risk of contact between the turf edges during installation, and thus also the risk of harm to the turf edges.

Advantageously, the system can further comprise a positioning system configured to deliver turf module position information of a turf module being lifted and moved by the remotely operated or autonomously operated lifting and transport vehicle. Turf position information from such a positioning system can be supplied to a control unit, e.g. a computer that controls the movement of the vehicles.

Figure 49:
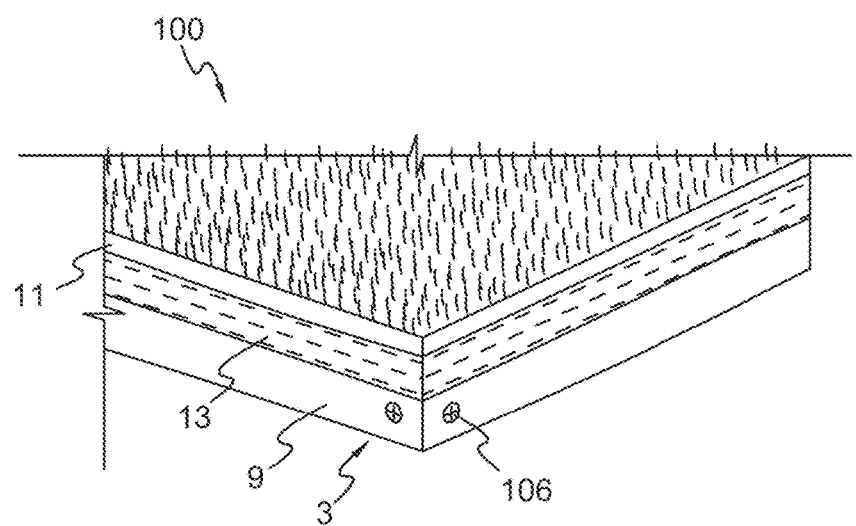
FIG. 49 is a perspective enlarged view of one turf module 100.

Furthermore, in such a system, position indication elements may be arranged on the turf modules. The position indication elements are preferably arranged on the vertical side walls of the turf modules, such as on an aluminum profile, and are configured to be readable by the positioning system. Examples of such position indication elements may be RFID tags or optically readable marks, or reflection units. Such position indication elements 106 are depicted in FIG. 42, FIG. 43 and FIG. 49.

The system may also comprise position indication elements in a fixed support base, onto which the turf modules are installed. The lifting and transport vehicles may then use such position indication elements to navigate. Moreover, such position indication elements may be installed to indicate predetermined target positions.

Advantageously, a turf sports field may comprise at least ten turf modules that together, when assembled, form a sports field or a part of a sports field.

Advantageously the turf modules have a rectangular shape and together form a grid pattern, wherein at least some turf modules are interposed between at least four adjacent turf modules. In such embodiments, one will need to install some turf modules next to at least two turf edges that are arranged orthogonally with respect to each other, i.e. arranging a turf module into a "corner" made up by the turf edges of previously installed modules. With the turf sports field system according to the invention, wherein the modules are installed in predetermined target positions, one may avoid sliding the adjacent turf edges against each other during installation, since there is some distance between the turf edges.

The gaps between facing turf edges can be configured to be closed by creeping or yielding of the turf edges towards each other. Alternatively or in addition, these gaps may comprise a flowable, solid state material, which is configured to fill the gaps by gravity based flow into the gaps. Alternatively, the gaps may be open, in a non-filled state. According to this embodiment of the inventive turf field, there is no additional shaped element that is introduced into these gaps, except in some embodiments the flowable solid state material. Such a flowable, solid state material may typically be sand and/or soil. As discussed also above, the solution provides for deployment of the turf modules without collision or friction between the turf edges of adjacent modules.

FIG. 26 and FIG. 27 depict such creeping of the turf edges 5 after installation. Here there is depicted a tolerance gap 105, which is closed after some time due to creeping of the turf edges 5.

A plurality of turf modules means that at least two turf modules are used to assemble the turf sports field. For instance, a football field may be divided into two separable turf modules, three modules, or more.

Advantageously, the turf modules discussed herein may have a movable support base 3 and at least four support legs 101, wherein the support legs 101 are configured to support the movable support base 3. Moreover, the support legs 101 should be arranged with a such a distance from the center of gravity of the turf module 100, that the lifting and transport vehicle 103 can be accommodated below the movable support base 3 and below the center of gravity, with respect to the horizontal directions.

Furthermore, the lifting and transport vehicle 103 should be able to move into the position under the center of gravity from at least two sides, preferably from four sides, of a rectangular shaped turf module.

Figure 45:
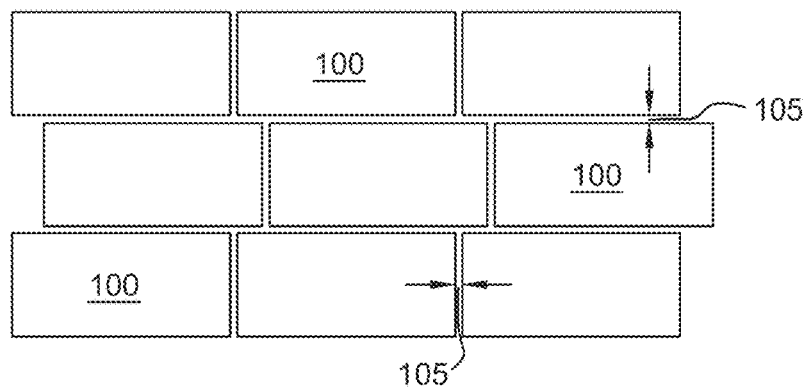
FIG. 45 shows a configuration where the turf modules exhibit a staggered layout.
Figure 46:
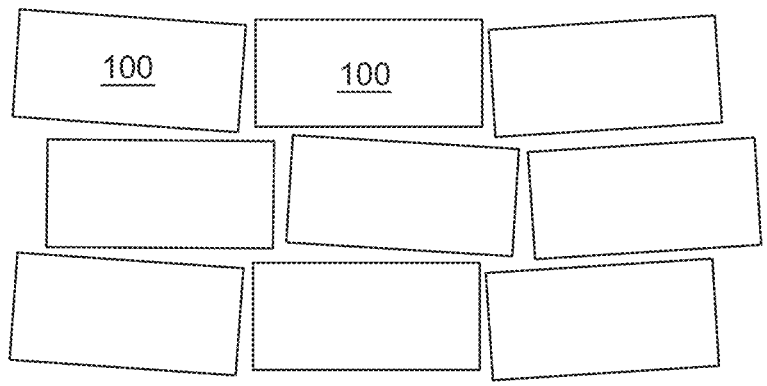
FIG. 46 depicts a plurality of turf modules 100 in a configuration similar to the one shown in Fig. 45.

FIG. 46 depicts a plurality of turf modules 100 in a configuration similar to the one shown in FIG. 45. However, FIG. 46 illustrates a more realistic scenario, wherein the turf modules are not placed perfectly at their target position. Rather, the placement of the turf modules 100 will deviate from the target positions, both with respect to position and with respect to orientation. The deviation shown in FIG. 46 has been exaggerated for illustrational purpose.

Figure 47:
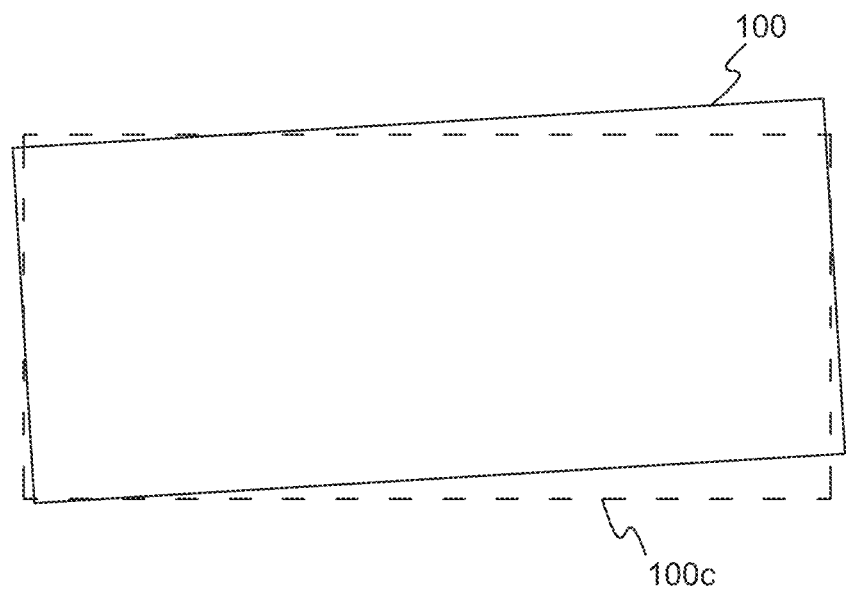
FIG. 47 schematically depicts one turf module 100 placed over a target position 100c.

FIG. 47 schematically depicts one turf module 100 placed over a target position 100c, which is shown with the dotted line. For a turf sports field, which is constituted by a number of turf modules 100, there will exist a corresponding number of separate target positions 100c. As discussed, such a number may be two or more (i.e. the number of turf modules may be two or more).

Part D—Root Cutter

When adjacent turf edges are positioned close to each other, for instance abutting each other, growing roots will bridge over to the oppositely arranged turf edge. That is, turf roots will grow from one turf module and into the soil of the adjacent turf module. This will in many cases be advantageous, since such root bridging will increase the strength and integrity of the turf edges. For instance, if a football player tramples with a high force and possibly with an inclined direction onto the interface between two turf edges, a plurality of bridging roots will reduce the possible damage to the turf edges.

However, when separating the turf modules, such as for removing the turf modules for maintenance or preparing for an event not using the turf field, turf roots that bridge over the turf edge interface, may harm the turf edges. Merely pulling the turf modules apart, may result in ripping away some of the turf edges. Hence, it is advantageous to cut the bridging turf roots before separating the turf modules.

It is known to use a circular saw blade, to cut out slabs of turf from a turf field grown directly on the ground. Such a solution may also be used when cutting the bridging turf roots between turf modules. However, in some embodiments, the turf edge on a turf module will be equipped with a root barrier. In such embodiments, one will seek to not cut into and harm the root barrier. The root barrier may prevent growth of bridging roots at the position of the root barrier. In some solutions, root barrier may be arranged below an upper, exposed portion of the turf edge, so that turf roots may bridge at the position of the exposed portion (exposed root zone). These features will be discussed in more detail later.

Figure 48:
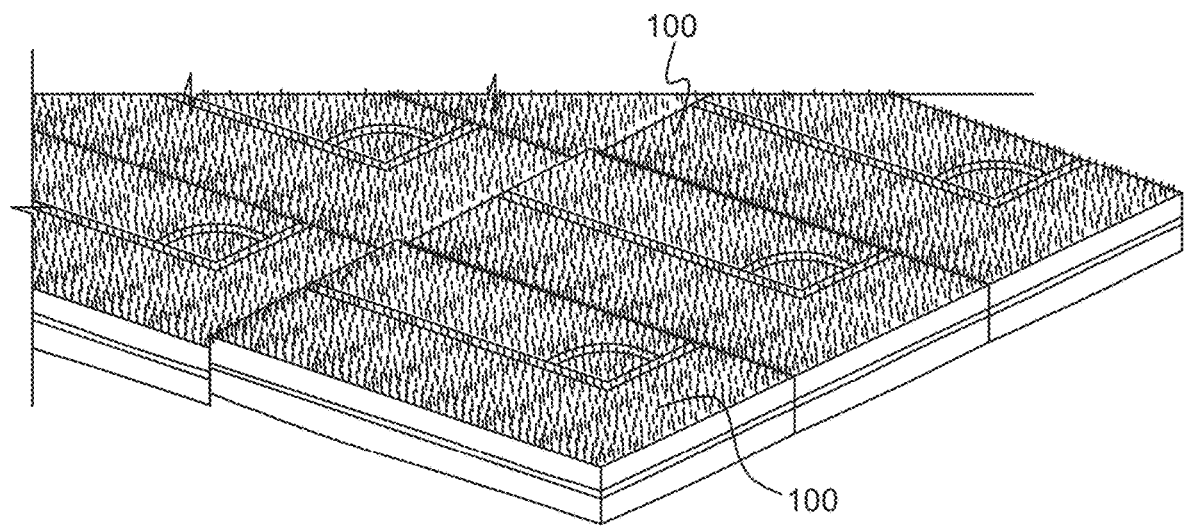
FIG. 48 shows a portion of a turf sports field, wherein one turf module 100 is about to be installed at a corner position of the turf sports field.

FIG. 48 shows a portion of a turf sports field, wherein one turf module 100 is about to be installed at a corner position of the turf sports field. FIG. 49 is a perspective enlarged view of one turf module 100. Here one can see a rigid wall portion 9, which is part of the movable support base 3. Above the rigid wall portion 9 is a root barrier sheet 13, which in some embodiments may be of a delicate material, i.e. of a material that could be harmed with a circular saw or other cutting means. Above the root barrier sheet 13 there is an exposed root zone 11. Turf root bridging will occur at the position of the exposed root zone 11. Indeed, for some types of turf, particularly warm season turf, root bridging will also occur at the surface of the turf layer, even if the root barrier sheet 11 should extend all the way up to the surface of the soil.

Figure 50:
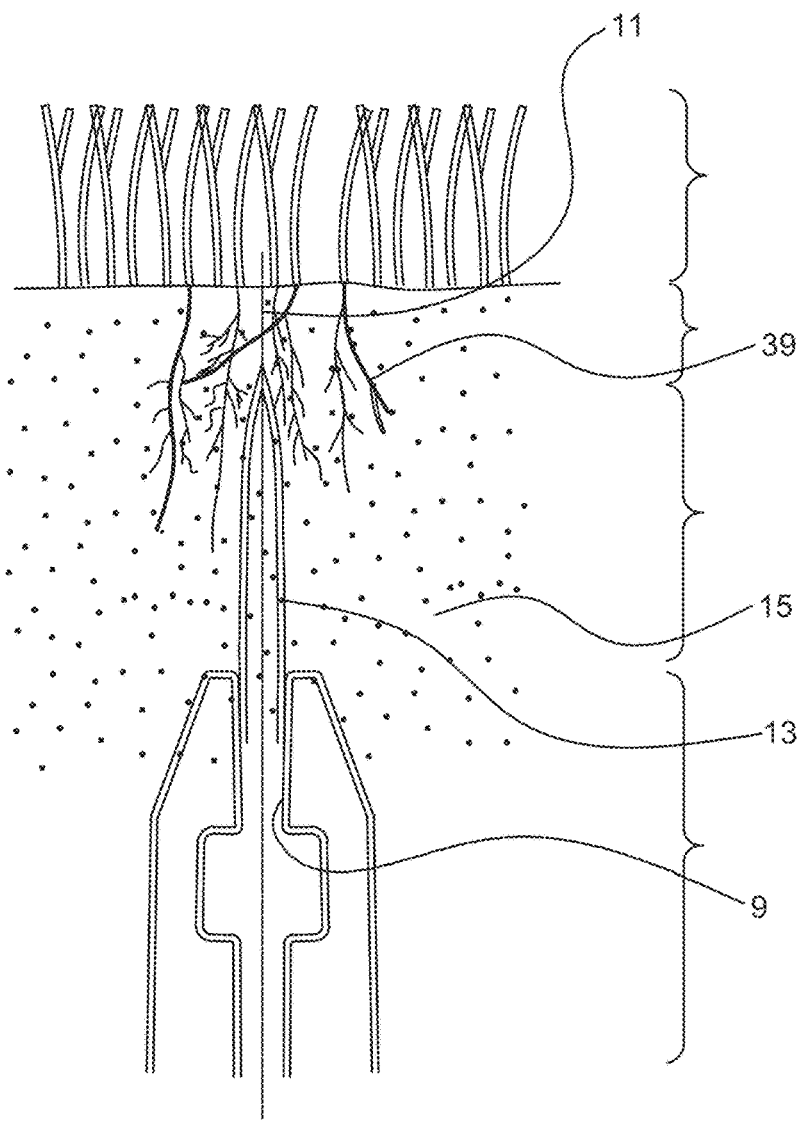
FIG. 50 is an enlarged cross section view through the interface between two adjacent turf edges.
Figure 51:
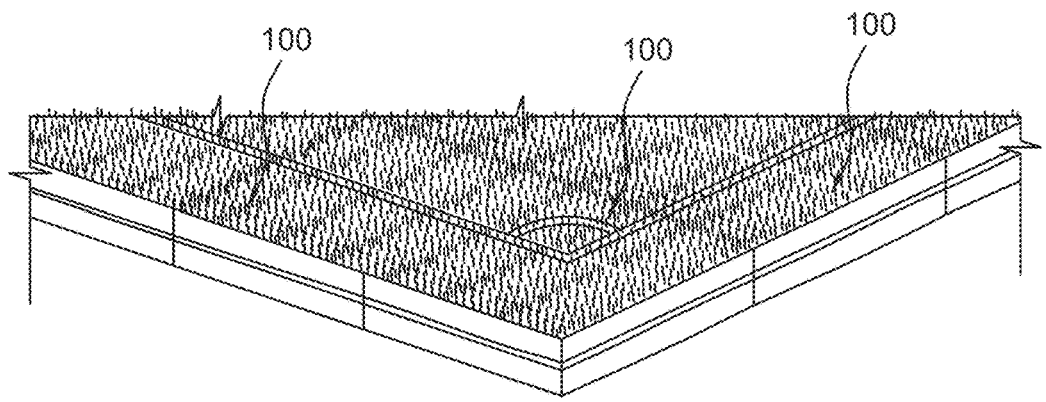
FIG. 51 illustrates the same portion of the turf sports field as in Fig. D1 after some root growth.

FIG. 50 is an enlarged cross section view through the interface between two adjacent turf edges. This drawing illustrates some turf roots 39 that bridge over to the opposite turf module 100. FIG. 51 illustrates the same portion of the turf sports field as in FIG. 48, however after some root growth. Notably, the root bridging will reduce the visible demarcation between the turf modules 100.

Figure 52:
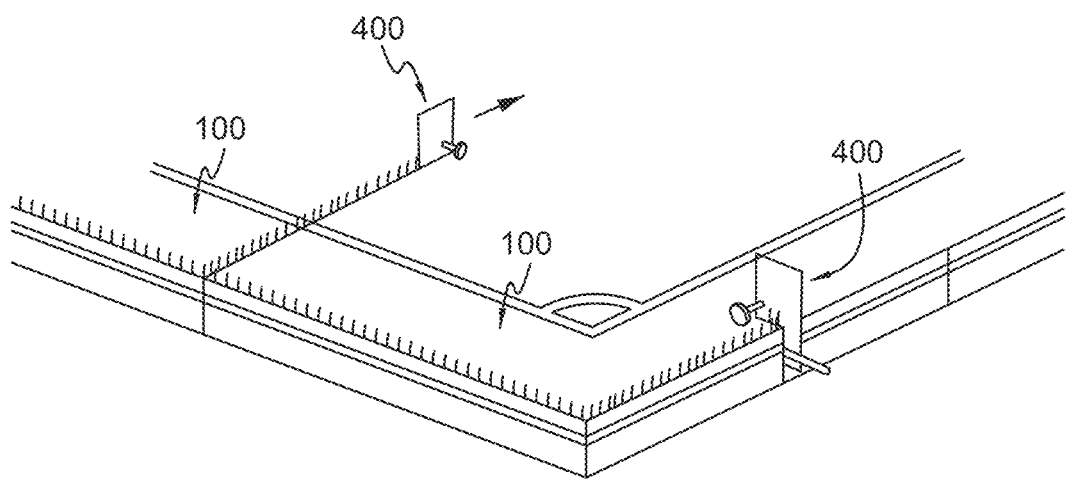
FIG. 52 depicts a portion of a turf sports field during a process of cutting bridging turf roots.
Figure 53:
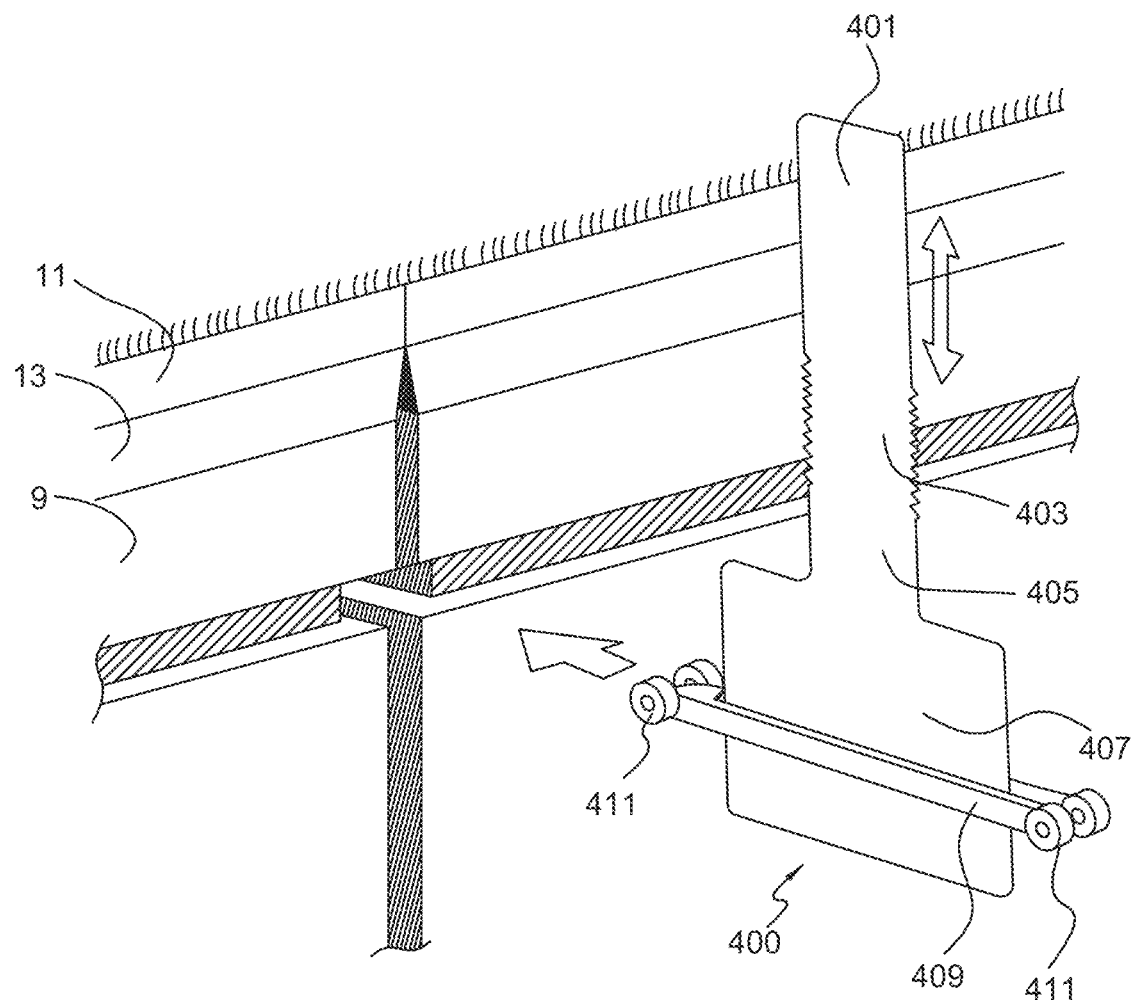
FIG. 53 illustrates an embodiment of a root cutting device 400.

FIG. 52 also depicts the same portion of a turf sports field, during the process of cutting the bridging turf roots. FIG. 53 illustrates an embodiment of a root cutting device 400. It has a handling portion 401 which is adapted for connection to a root cutting handling assembly. The root cutting handling assembly is used for moving the root cutting device 400. Further down it has a cutting portion 403. The cutting portion is advantageously sharp and is configured to cut through the bridging turf roots 39 (cf. FIG. 50). Below the cutting portion 403 it has a blunt portion 405. When in use, the blunt portion 405 will be at the elevation of the root barrier sheet 13. Since it is blunt, it will not harm the root barrier sheet 13. Below the cutting portion 403 is also a guiding portion 407. The guiding portion 407 is adapted to be arranged at the elevation of a rigid wall portion 9. For instance, it may slide along and in between two oppositely arranged rigid wall portions 9 of two adjacent turf modules 100. In the embodiment shown in FIG. 53, the guiding portion 407 has a significantly longer longitudinal extension than what the cutting portion 403 has. Such a long extension contributes in maintaining a correct orientation of the cutting portion 403.

Figure 54:
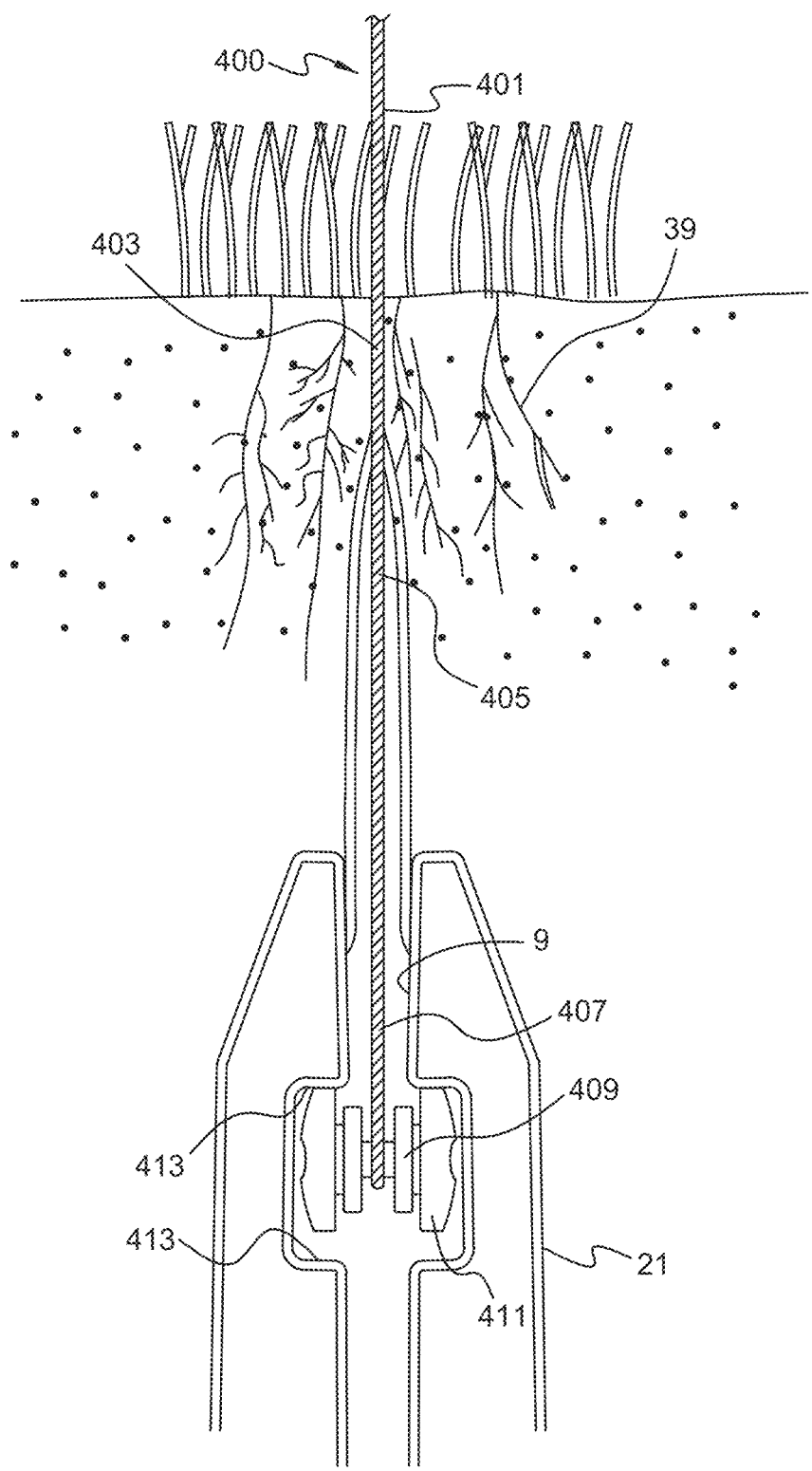
FIG. 54 illustrates a guiding portion 407 of the root cutting device 400 that can be inserted in between two adjacent rigid wall portions 9 of the movable support base 3.

In addition, the embodiment shown in FIG. 53 also has a particular guiding feature. To the guiding portion is connected a guide beam 409 which is arranged in parallel with the longitudinal extension of the guiding portion 407. In the front and back of the guide beam 409 are arranged guide wheels 411. As shown in FIG. 54, the guiding portion 407 of the root cutting device 400 can be inserted in between two adjacent rigid wall portions 9 of the movable support base 3. In this particular embodiment, the movable support base 3 is provided with guide slots 413 in the rigid wall portion 9. The guide slots 413 of the adjacent turf modules 100 will together form a guiding channel that accommodates the guide wheels 411.

Figure 55:
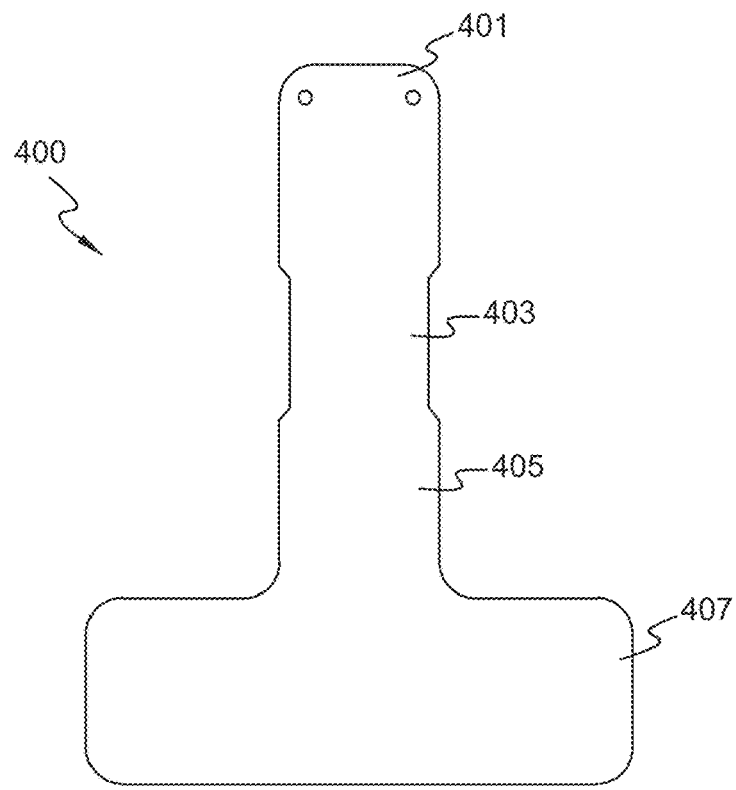
FIG. 55 shows a guide portion 407 arranged between the rigid wall portions 9.

It shall be understood however, that other embodiments may be without the guide wheels 411 and the guide beam 409. That is, having the guide portion 407 arranged between the rigid wall portions 9, can also suffice for guiding of the root cutting device 400. Such an embodiment is shown in FIG. 55.

The root cutting devices 400 shown in FIG. 52, FIG. 53, FIG. 54 and FIG. 55 can be made to reciprocate up and down in order to enhance the cutting ability. For instance, the reciprocating movement can be similar to the reciprocating movement or vibrating movement of a multi tool (e.g. as the product commercially marketed as "Fein Multimaster"). In other solutions, one may however also use a non-reciprocating, linear, horizontal movement, parallel to the surface of the sports field.

Consequently, for the object of cutting such bridging turf roots, without harming a root barrier or other equipment below the position of the bridging turf roots, it is provided D1) A root cutting device (400), which has a cutting portion (403) adapted to cut through turf roots extending from a first turf edge of a first turf layer to a second turf edge of a second turf layer, wherein the root cutting device has a blunt portion below the cutting portion, and a guiding portion below the cutting portion.

In some embodiments, the blunt portion overlaps with or is the same as the guiding portion.

D2) Advantageously, the guiding portion can be below the blunt portion, and be configured to engage with a solid portion of a movable support base (3).

Figure 56:
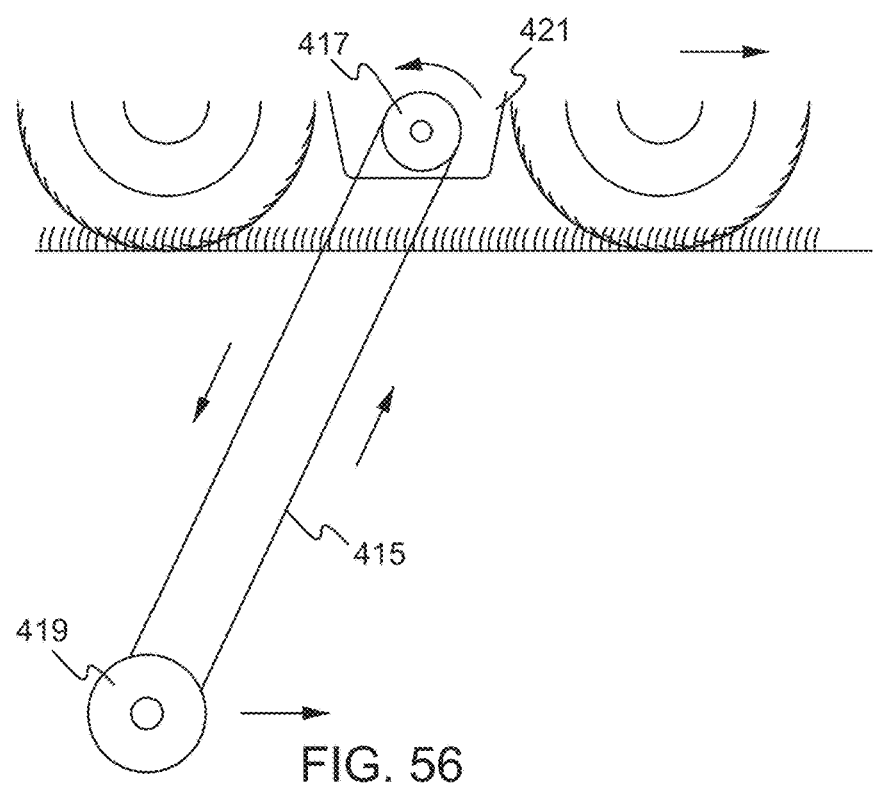
FIG. 56 shows another type of root cutting device 400.

FIG. 56 shows another type of root cutting device 400. Here, a cutting wire 415 is strapped between a drive wheel 417 and a pair of guide wheels 419. The drive wheel 417 is motorized and supported by a wheeled carriage 421. The guide wheel 419 can advantageously be arranged in guide slots 413, such as the ones shown in FIG. 54. Such a solution will however not exhibit the blunt portion for prevention of harm to the root barrier sheets 13.

Figure 57:
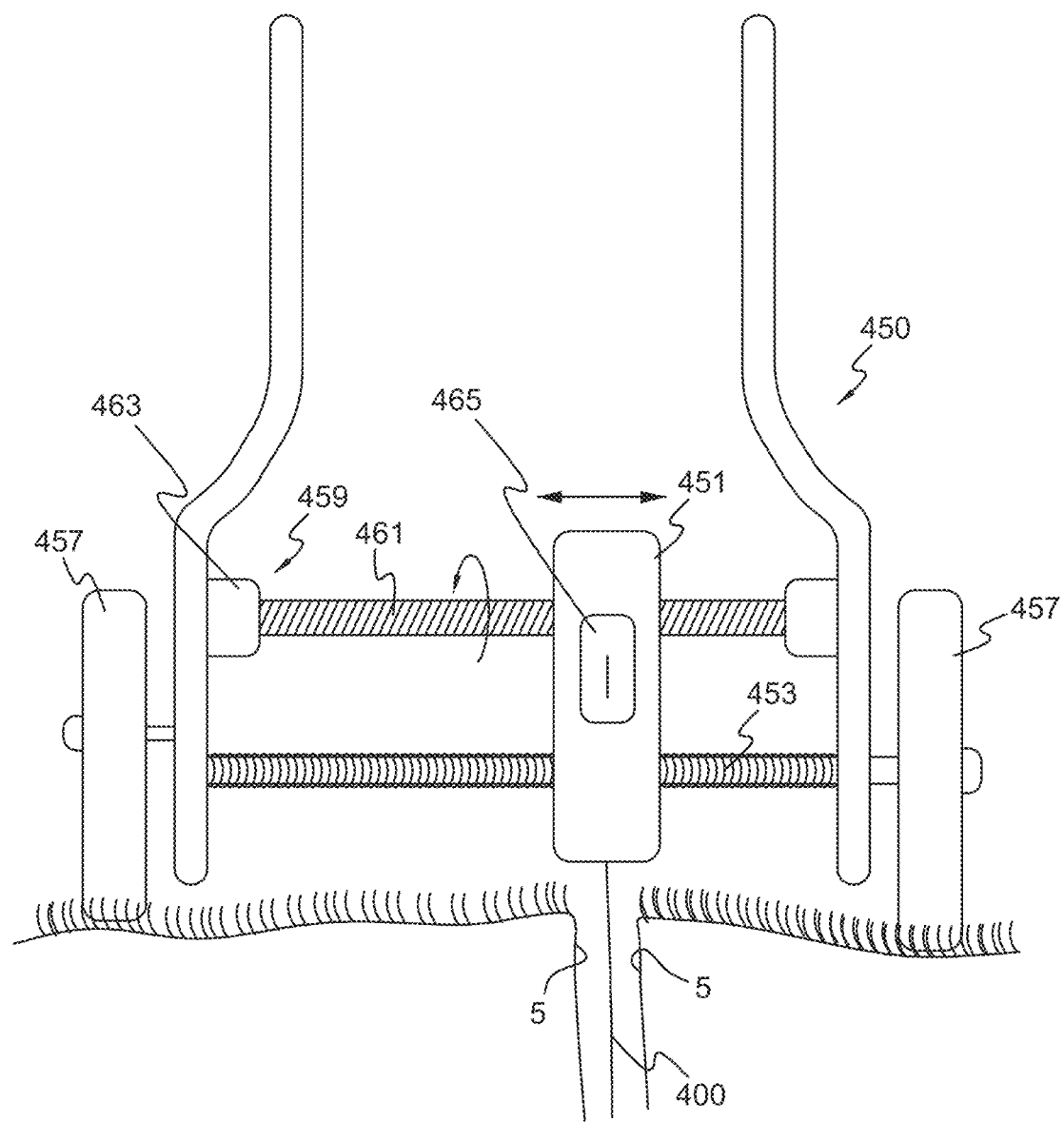
FIG. 57 depicts an embodiment where the root cutting device 400 is mounted to a root cutting handling assembly 450.

FIG. 57 depicts an embodiment where the root cutting device 400 is mounted to a root cutting handling assembly 450. The root cutting handling assembly 450 may be equipped with support wheels 457, which may be motorized or it can be moved manually. The root cutting device 400 is attached to the root cutting assembly 450 at its handling portion 401. The root cutting assembly 450 has a cutting unit 451, to which the root cutting device 400 is attached. The cutting unit 451 is supported in the root cutting assembly 450 with a flexible support means 453. A spring 455 may be arranged to bias the cutting unit 451 towards a default position.

Thus, when moving the root cutting handling assembly 450 along the interface between two adjacent turf edges 5, the root cutting device 400 will have the correct position even if the root cutting handling assembly 450 should be somewhat out of the default position. That is, if moving the root cutting handling assembly 450 not perfectly along the turf edges 5, the root cutting device 400 will move with respect to the root cutting handling assembly 450 in order to maintain its correct position.

Optionally, the root cutting handling assembly 450 can also include a cutting unit alignment means 459. The cutting movement alignment means 459 can include a rotating, threaded bar 461 which is rotated with a bar actuator 463. With a rotation to linear translation means in the cutting unit 451, the position of the cutting unit 451 will be governed by the rotational position of the threaded bar 461. The cutting unit 451 can also comprise an alignment sensor means 465 configured to sense the position of the cutting unit 451. With a (not shown) microprocessor or other suitable means, the cutting unit alignment means 459 can then be controlled on the basis of input from the alignment sensor means 465. The function of the alignment sensor means 465 can for instance be based on RFID signals or laser beams.

Hence, also provided is

D3) A root cutting device (400) which is arranged on a root cutting handling assembly (450) that comprises support wheels (457), and is flexibly supported thereon, in the direction transversal to the rolling direction of the carriage.

The root cutting handling assembly 450 can typically be in form of a carriage. The root cutting device 400 is able to move with respect to the carriage, in the direction crosswise to the moving direction of the carriage, when the carriage is moved on its wheels. In that way, although the carriage is moved precisely in parallel with a turf edge, the cutting device will adapt by means of the guiding portion, thereby remaining in the correct position between the first and second turf edges.

FIG. 58 to FIG. 63 show an alternative embodiment of a root cutting device 400. In this embodiment, the cutting portion 403 has an inclined cutting edge. That is, it is inclined with respect to the horizontal and vertical direction, when in use.

The guiding portion 407 has a ball-shaped end which fits into a guiding groove between the rigid wall portions 9 of two turf modules 100.

Figure 64:
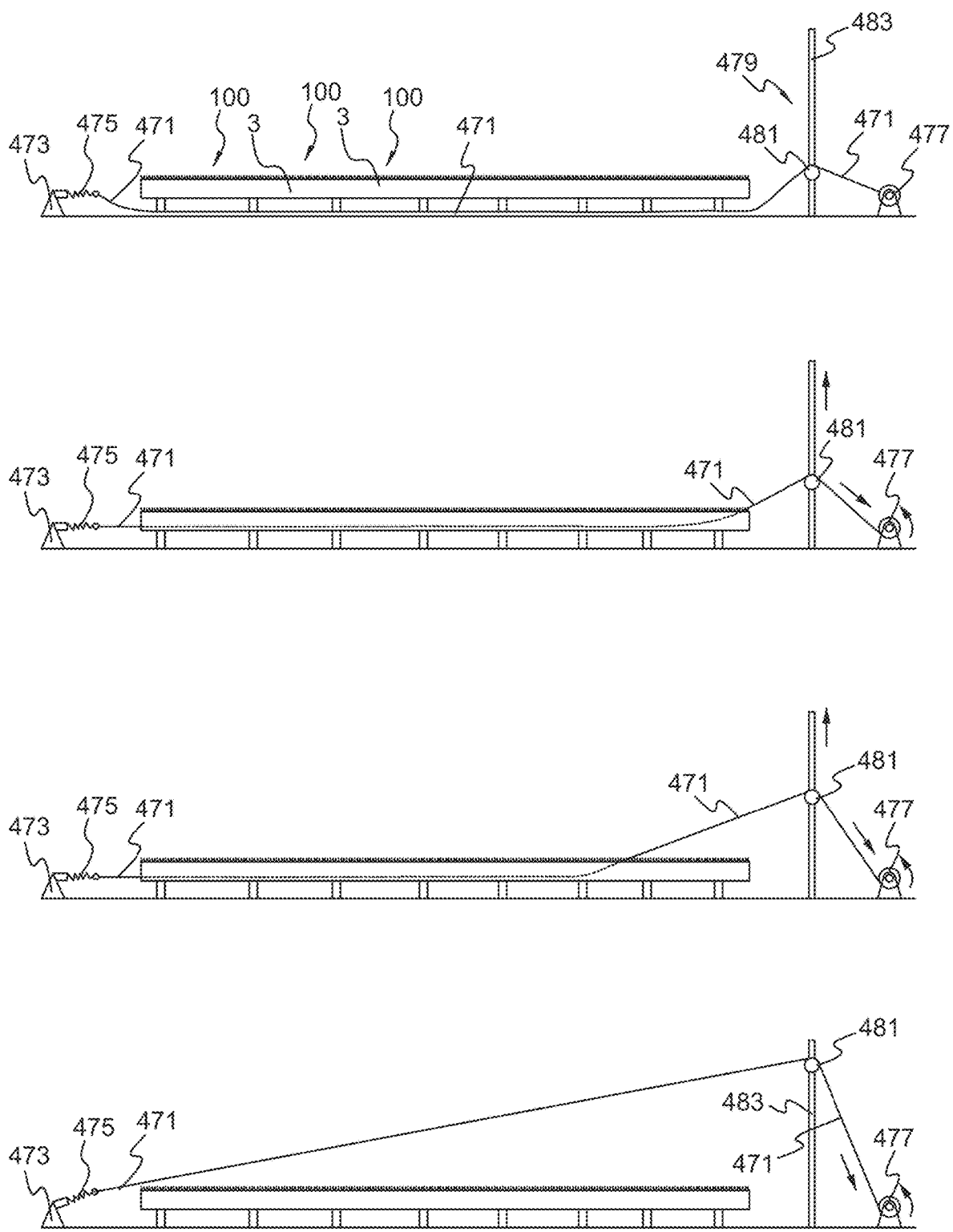
Fig. 64 depicts four drawings of an alternative root cutter assembly.

FIG. 64 depicts four drawings of an alternative root cutter assembly. Here, a cutting string 471 is extended across a row of adjacently arranged turf modules 100. As appears from the upper drawing of FIG. 64, the cutting string 471 is arranged below the movable support base 3, i.e. below the position of the turf itself. At one end, the cutting string 471 is attached to a string support 473 over a spring 475. At the opposite end, the cutting string 471 connects to a motorized string actuator 477, here in the form of a motorized drum. Moreover, the cutting string 471 is guided past a string elevation means 479. The string elevation means 479 has a string support device 481 which is upwardly biased or upwardly elevated along an elevation pole 483.

By reciprocating the cutting string 471 back and forth, by means of a reciprocating action with the string actuator 477, while the cutting string is arranged between two adjacent rows of turf modules 100, a cutting action will occur. That is, by moving the cutting string 471 back and forth, it will cut its way upwards through the bridging turf roots, until it has cut through, as shown in the lower drawing of FIG. 64. The spring 475 makes it possible to move the cutting string 471 back and forth.

In an alternative embodiment, the spring 475 could be replaced with a roll and the cutting string 471 could be run as a loop. In that way, one would not have to reciprocate the cutting string 471, but one could rather run the string in one continuous direction to achieve the cutting function.

Figure 65:
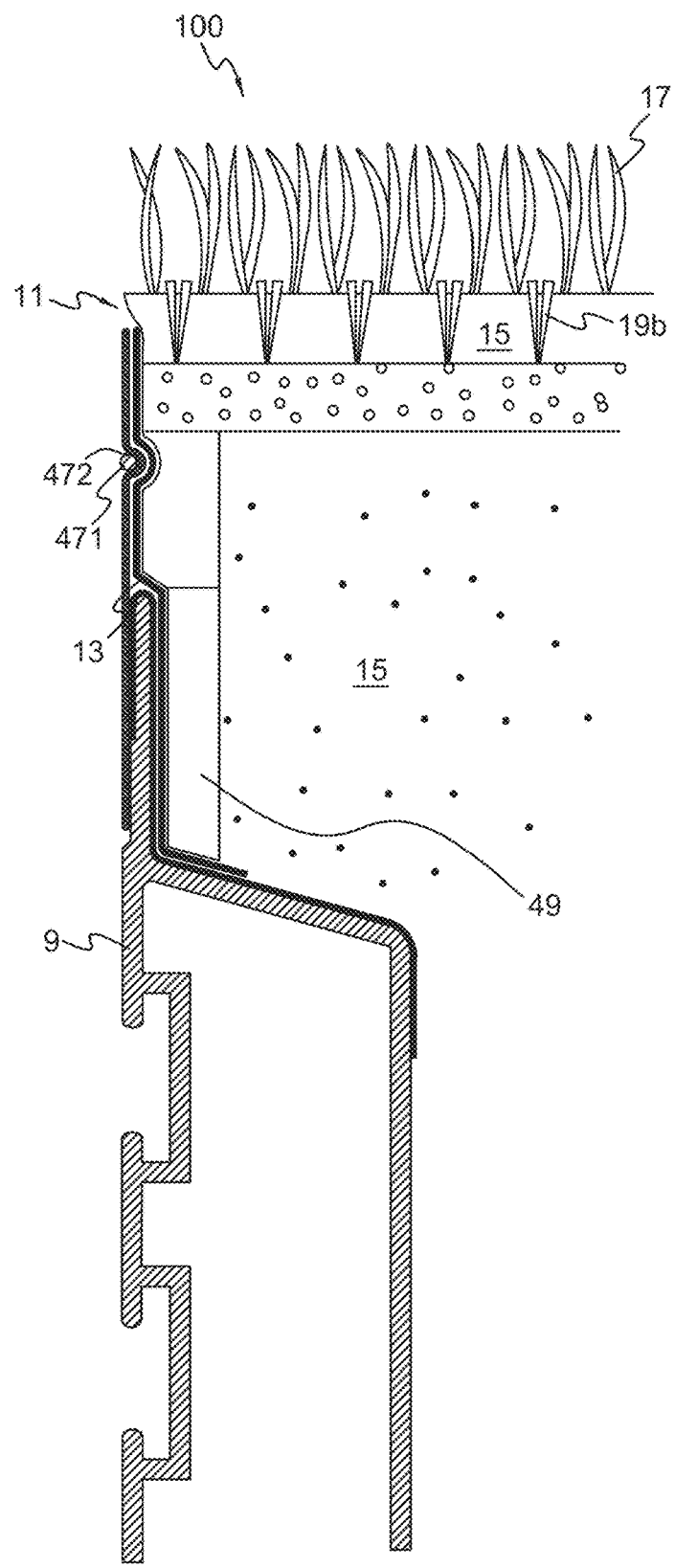
Fig. 65 to Fig. 68 illustrate a particular use of a root cutting string.
Figure 66:
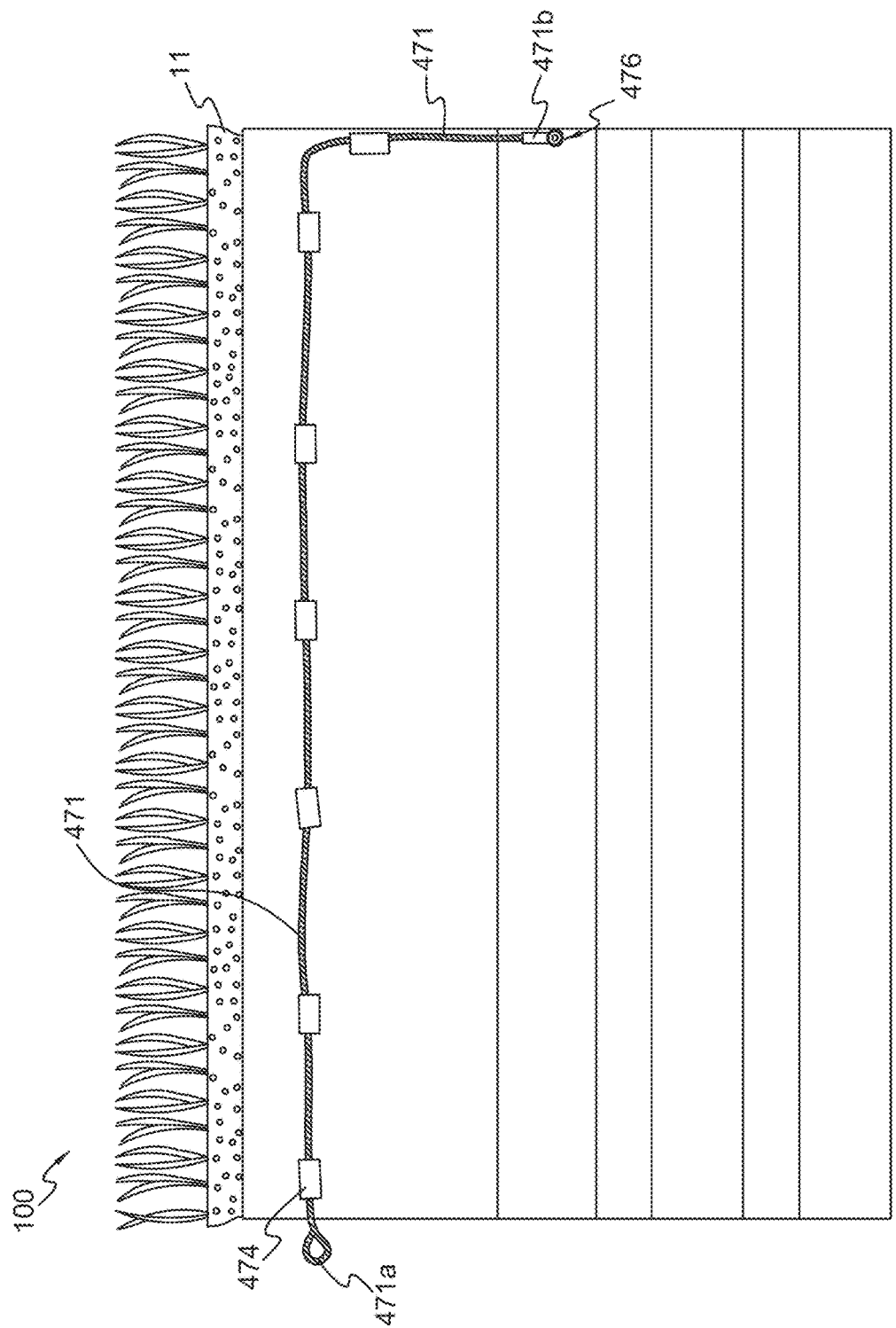

FIG. 65 to FIG. 68 illustrate a particular use of a root cutting string 471. The cross section of FIG. 65 shows how a root cutting string 471 is arranged to the side of a turf module 100. Advantageously, the side of the turf module 100 is provided with a cutting string recess 472, into which the cutting string 471 is arranged. FIG. 66 depicts the same turf module 100 with a principle view, and shows the cutting string 471 being retained in place by means of a plurality of tape pieces 474. As appears from FIG. 66, the cutting string 471 has one free end 471a (left hand side of FIG. 66), and a fixed end 471b. The fixed end 471b is fixed to a rigid wall portion of the turf module 100 by means of a cutting string fixing arrangement 476. Notably, the entire cutting string 471 is arranged at a level below the exposed root zone 11 (cf. FIG. 66). In some embodiments, the cutting string 471 can also be arranged above the rigid wall portion 9, as shown in FIG. 65.

Figure 67:
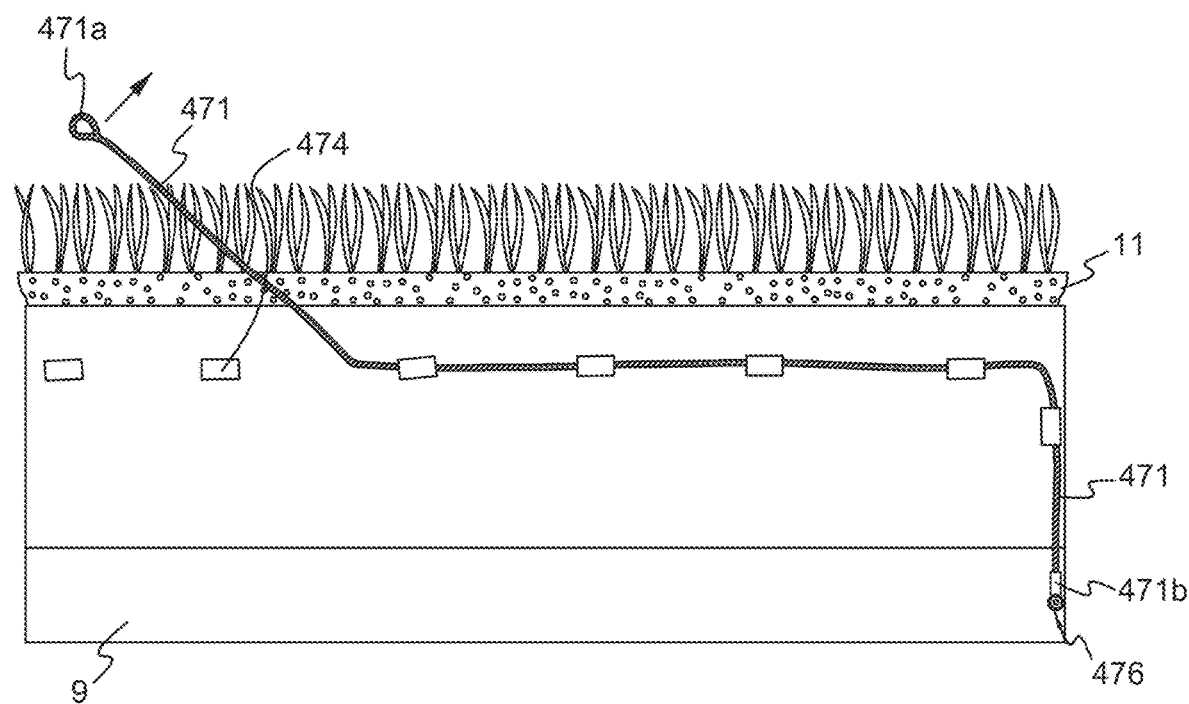
Figure 68:
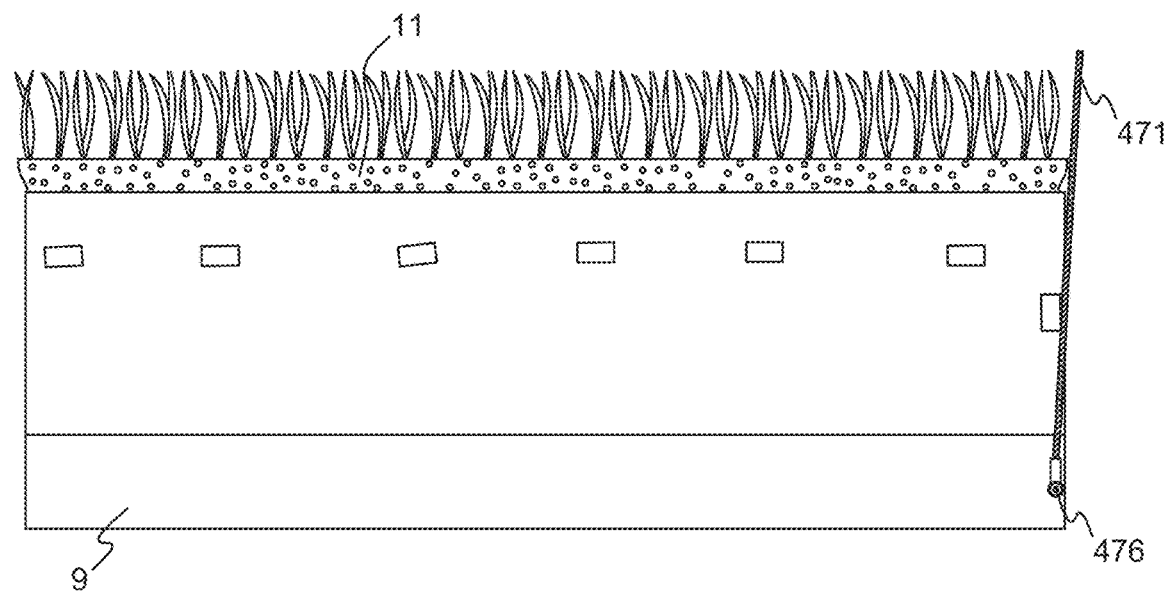

When uninstalling the turf field, i.e. when removing the installed modules 100 from one another, the operator can reach the free end 471a, and pull it up and sideways for cutting through turf roots that bridge over to the root zone of an adjacent turf module 100. This process is illustrated in FIG. 67 and FIG. 68.

Hence, there is provided a method of separating two adjacent turf modules (100) having adjacently arranged respective turf edges, comprising the following steps:

a) by pulling an end portion (471a) of a cutting string (471), moving the cutting string through an interface between the respective two turf edges, thereby cutting possible bridging turf roots.

There is also provided a turf field comprising a plurality of adjacently arranged turf modules (100), wherein at least some of the turf modules are provided with a cutting string (471) which is releasably attached to a side portion of the turf module and which is fixed to the turf module at one position of the cutting string.

Instead of fixing the cutting string to the turf module at the string end, one may also fixate it at another position on the string.

Part E—Turf Edge with Root Barrier

Above, the concept of a root barrier sheet was shortly introduced. In the prior art, international patent application publication WO9826847 discloses a solution where turf slabs are laid down on a tray with a base and peripheral skirt. Also suggested is a detector tape or a metal implant, in order to locate and facilitate the cutting. It also suggests a light netting or plastic arranged along the edge of the turf slabs.

Hence, the concept of a sheet for reduction of root bridging across the turf edge interfaces, is known for turf slabs.

In the following, a discussion of various inventive features relating to a turf edge will be discussed on a general basis, followed by a more detailed description of example embodiments.

There is provided

E1. A turf layer (1) arranged on a movable support base (3), wherein the turf layer comprises a soil (15) with a root zone (12), the turf layer (1) having a turf edge (5), characterized in that a vertically arranged root barrier sheet (13) extends along the turf edge (5) and at the elevation of the root zone (12).

A root barrier sheet is arranged at least partly along the vertical extension of the root zone. The root barrier sheet may also have a longer vertical extension than the vertical extension of the root zone.

Herein, the term sheet shall be construed as a relatively thin piece of flat material. Due to safety for players, such as a football player on the turf field, it cannot be in the form of a rigid plate, since it advantageously should be arranged relatively close to the upper surface of the field.

With the term vertically arranged, is meant substantially vertically, i.e. having the main extension in the vertical direction.

In some embodiments, the root barrier sheet may be attached to a rigid wall portion by means of protrusions arranged to the root barrier sheet structure, which can be inserted into receiving grooves in the rigid wall portion.

In some embodiments, the turf edge has an exposed root zone (11), wherein turf roots (39) of a first turf edge (5) extend from the exposed root zone (11) of the first turf edge (5) into the exposed root zone (11) of an adjacent turf edge (5), wherein the exposed root zone (11) is arranged above a root impermeable portion (14) of the root barrier sheet (13).

By having an exposed root zone, turf roots may grow to bridge over to the exposed root zone of an adjacent turf edge/adjacent turf layer. Such root bridging may enhance edge stability, and contribute to an even surface at the interface between two turf edges.

A water absorbent layer (49) can be arranged between the root barrier sheet (13) and the soil (15).

The water absorbent layer is a layer, which absorbs and retains water. This encourages root growth into this layer. Thus, having the water absorbent layer arranged along the root barrier sheet will enhance the root growth into the area of the root barrier sheet, and thereby increase the stability of the turf edge. Particularly suitable materials used in the water absorbent layer can be recycled fibers/cloth.

Advantageously, the water absorbent layer can be root permeable, so that the turf roots may grow through the water absorbent layer, and possibly grip onto the internal face of the root barrier sheet. Such an embodiment will provide a stable turf edge.

Another effect of the water absorbent layer is to maintain sufficient moisture also at the edge areas during drought periods.

In some embodiments, the root barrier sheet (13) and the water absorbent layer (49) can be one common structure.

The root barrier sheet and the water absorbent layer being one common sheet structure means that they are produced as one structure, wherein the water absorbent layer is integrated with the root barrier sheet. With such a common sheet structure, the root barrier sheet and the water absorbent layer can be mounted to the movable support base in one single operation. For instance, the common sheet structure may be pulled out from a drum onto which the common sheet structure is stored before being installed. Advantageously, the turf roots may then grow into and thus grip onto the water absorbent layer itself.

Moreover, a mesh layer (51) can be arranged along the turf edge (5), along and in parallel with the root barrier sheet (13).

The mesh layer is root permeable, meaning that roots may (and will) grow through the mesh layer. When roots have grown through the mesh layer, the mesh layer will, together with the roots, enhance stability for the turf edge. In some embodiments, the mesh layer may be a flat sheet-like layer.

The mesh layer (51) can comprise mesh layer strands that extends at least partially crosswise to the direction of the turf edge (5) and the vertical direction.

The term mesh layer strands shall herein be broadly construed. That is, such strands shall be construed as structures by means of which the mesh layer is constructed. Thus, the mesh layer according to this embodiment will have an extension in the vertical direction and in the direction parallel to the direction of the turf edge, and in addition an extension crosswise to these two directions. One may think of this direction as the thickness of the mesh layer.

The root barrier sheet (13) can in some embodiments have an internal face (37), facing the soil (15), and an oppositely facing external face (35), wherein the internal face (37) exhibits a fibrous or porous surface.

Such an internal face of the root barrier sheet will advantageously be held tightly by a plurality of roots gripping onto the root barrier sheet.

Moreover, advantageously the external face will have a smooth surface. With such a smooth surface of the root barrier sheet, less friction between adjoining external faces of the root barrier sheets of adjacent turf layers will exist, when one turf layer is moved along the other. That is, if one external face of one root barrier sheet slides along the abutting external face of another root barrier sheet, the turf edge will not become damaged by friction forces arising between the two root barrier sheets.

The movable support base (3) can have a rigid side portion (21) extending along the turf edge (5), wherein a compressible elongated body (23) is interposed between the upper face (25) of the rigid side portion (21) and the soil (15).

As will be explained in more detail below, such a compressible elongated body will give compressibility to the turf layer at the position of the rigid side portion.

Moreover, the movable support base (3) can comprise a rigid side portion (21) that extends along the turf edge (5), wherein the upper edge of the rigid side portion (21) exhibits an upwardly facing surface (25) which is provided with an attachment profile (27).

The compressible elongated body can advantageously rest onto such a surface, or even be retained in place by said attachment profile.

The root barrier sheet (13) can comprise a fringed upper portion (41).

The feature of having the upper portion of the root barrier sheet fringed may take numerous embodiments. For instance, a plurality of cutouts may be arranged at the upper edge of the root barrier sheet, extending some distance downwards. Such cutouts may advantageously have a tapering shape, wherein the width of the cutouts is largest at the upper edge of the root barrier. Instead of cutouts, one can also imagine a plurality of slits, i.e. an embodiment where none of the material of the root barrier sheet is removed, but wherein cuts are arranged in the upper edge of the root barrier sheet.

Advantageously, the turf roots may grow through the fringed upper portion, and the fringed upper portion may thus be defined as being a part of the exposed root zone.

The fringed upper portion may extend vertically above the upper face of the soil. Particularly in such embodiments, the fringed upper portion can be made in the same color as the turf leafs, i.e. green. The fringed upper portion may be an artificial turf.

A horizontally extending turf reinforcement layer (19) can be embedded in the root zone (12).

In some embodiments, the turf reinforcement layer can be a flexible mat, such as the mat of an artificial turf. In other embodiments, the turf reinforcement layer can be in the form of a more rigid grid layer. In such an embodiment, horizontally extending anchoring stems of the grid layer can extend through anchoring apertures in the root barrier sheet, and wherein root barrier retaining organs retains the root barrier sheet in contact with the turf layer. Preferably, the anchoring apertures are vertically extending slits in the root barrier sheet. With such apertures, the anchoring stems may take varying vertical positions with respect to the root barrier sheet.

Alternatively, one may use other means for anchoring the root barrier to the soil layer. For instance, elongated anchoring strings may be inserted in a substantially horizontal direction, into the soil/root zone, through the root barrier sheet. Such anchoring strings may comprise anchoring structures, such as barbs, or a corrugated configuration.

In some embodiments, a turf reinforcement layer (19) can be arranged in the root zone (12), the turf reinforcement layer (19) comprising a mat (19a) arranged below the upper surface of the soil (15) and synthetic fibers (19b) which extend upwards from the mat (19a).

The root barrier sheet (13) and a water adsorbent layer (49) can be made in one piece.

Furthermore, an edge wall (50) comprising the root barrier sheet (13), and a compressible elongated body (23) can be made in one single piece.

In some embodiments, support walls may extend between the edge wall and the compressible elongated body. Such support walls may advantageously exhibit an orientation transverse to the inner face of the edge wall. The support walls will contribute to the stability of the edge wall and hence the overall turf edge.

The movable support base (3) can comprise a rigid wall portion (9), and a vertical edge wall (50) can comprise the root barrier sheet (13). The vertical edge wall (50) can then be arranged laterally beyond the rigid wall portion (9).

According to another aspect of the invention, there is provided a method of providing a turf edge (5) of a turf layer (1) arranged on a movable support base (3), the method comprising
a) arranging a root barrier sheet (13) along a rigid wall portion (9) of the movable support base (3);
b) filling soil material, typically sand, onto the movable support base (3), the soil material (15) thereby being arranged adjacent the root barrier sheet (13);
c) providing grass on the soil material (15).

Step c may comprise sowing seeds in the upper face of the soil material, and let the plants grow. Alternatively, one may lay pre-grown slabs of turf onto the soil material. By laying pre-grown slabs of turf, one may obtain a turf edge with a developed root zone. A developed root zone will contribute to turf edge stability.

In such a method, step a) may include arranging the root barrier sheet (13) along a supporting construction wall (47), and the method can further comprise the following step:
d) after step b), removing the supporting construction wall (47), while the root barrier sheet (13) remains along the turf edge (5).

The supporting construction wall may for instance be a plate shaped member that may be attached onto and later removed from the movable support base. It may also be a fixed part of another structure. That is, it may for instance be a larger wall, against which the movable support base is arranged during step b). Then, after filling soil material onto the movable support base, the movable support base can be removed from the wall. Hence, the term "removing" shall be construed as being removable from the turf edge. Such removal can take place by moving the supporting construction wall away from the turf edge, or by moving the turf edge away from the wall (as in the case with a fixed wall).

Furthermore, in some embodiments, the supporting construction wall may remain along the turf edge until the grass and its roots have grown. In other embodiments, the construction wall is removed after having filed soil material onto the movable support base, before or immediately after sowing the seeds.

In this method, step a) can further include arranging a water absorbing layer (49) adjacent the root barrier sheet (13).

Advantageously, the method may further include arranging a mesh layer adjacent the water adsorbing layer, or adjacent the root barrier sheet. That is, some embodiments may include the root barrier sheet. Other embodiments may include the root barrier sheet and the water adsorbing layer. Further embodiments may include the root barrier sheet and the mesh. Still further embodiments may include all of these layers.

When constructing or building a turf layer on the movable support base, in an alternative embodiment one may install slabs of pre-grown turf onto the soil. Then one can let the turf roots grow further, and thereby enhance the stability of the turf edge.

According to yet another aspect of the invention, there is provided a removable turf edge support arrangement (70), which comprises
a main body (71);
a plurality of support fingers (73); and
a plurality of anchoring pins (75).

Advantageously, the support fingers and the anchoring pins extend in parallel direction, out from a common main body. Moreover, the support fingers and the anchoring pins may advantageously be arranged in two separate and parallel rows. Moreover, the main body that bridges the support fingers and the anchoring pins may advantageously comprise apertures through which light may reach the surface of a soil when the support arrangement is installed at a turf edge.

While the various aspects of the invention have been discussed in general terms above, some detailed and non-limiting examples of embodiments will be discussed in the following with reference to the drawings.

Figure 69:
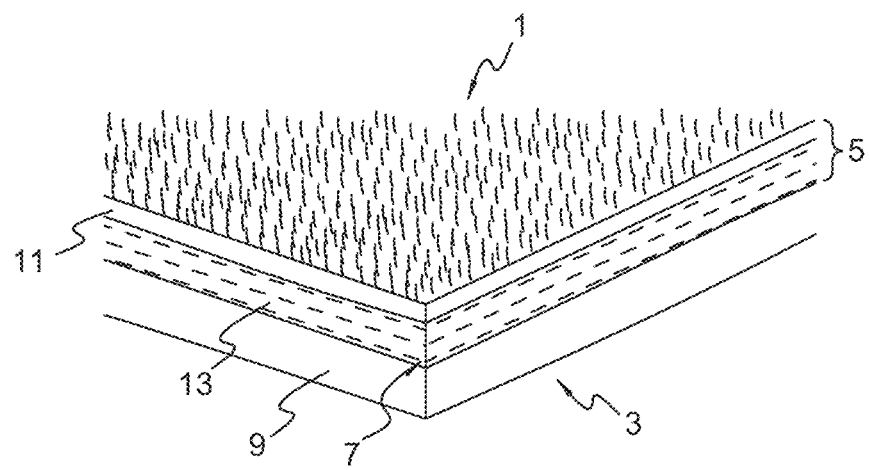
FIG. 69 depicts a schematic, perspective view of a part of a turf layer 1.

FIG. 69 depicts a schematic, perspective view of a part of a turf layer 1. The turf layer 1 is arranged on a movable support base 3. The movable support base 3 may by of various types. For instance, it may be made of a pallet which is movable with a pallet truck, a wheeled body that may be moved on its wheels on a flat surface, a body without wheels, but which may be lifted and moved with a remotely operated vehicle (e.g. a vehicle known under the commercial name "Kuka omniMove"). The movable support base 3 may also be a large, yet movable support base, which has a surface area of a significant portion of a flat sports field, such as a football field or other sports field in a sports stadium.

The shown turf layer 1 in FIG. 69 has two turf edges 5 which intersect at a turf edge corner 7.

At a lower portion of the shown turf layer 1 in FIG. 69, a rigid wall portion 9 of the movable support base 3 is shown. The rigid wall portion 9 is typically a part of the movable support base which typically can be made of a durable material, such as a metal or a durable plastic. Above the rigid wall portion 9, there is arranged soil on which a turf has been grown.

At an upper portion of the soil, there is an exposed root zone 11. In the shown embodiment in FIG. 69, the exposed root zone 11 is not covered by any material. Thus, when the turf layer 1 and the movable support base 3 is arranged in such a free-standing position, as shown in FIG. 69, one can see the soil itself, as well as the turf roots 39 (cf. FIG. 77 and FIG. 80).

Below the exposed root zone 11, there is arranged a root barrier sheet 13. The root barrier sheet 13 is impermeable to the turf roots. That is, the turf roots are not able to grow through the root barrier sheet 13.

In some embodiments though, one could imagine that the root barrier sheet 13 is partly permeable, so that only some roots are able to grow through it. Such embodiments will be discussed below, with reference to FIG. 74 to FIG. 78.

Since there is some vertical distance between the top surface of the soil and the top of the root barrier sheet 13, the root barrier sheet 13 will not be visible when one turf edge 5 is arranged in abutment against an adjacent turf edge 5 of another turf layer 1. The turf roots 39 in the position of one turf edge 5 may grow into the turf edge of an adjacent turf layer 1, in the position of the two facing exposed root zones 11 (cf. also FIG. 77).

Figure 70:
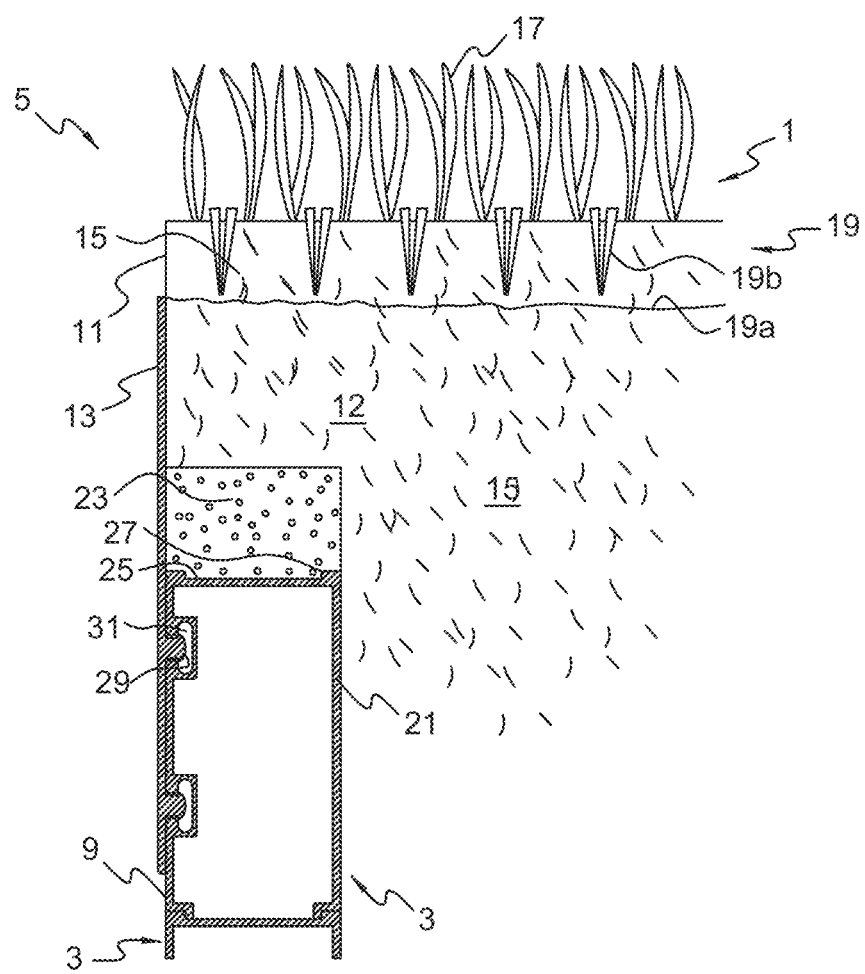
FIG. 70 shows a side cross section view through a turf edge 5 of a turf layer 1.

Reference is now made to FIG. 70, showing a side cross section view through a turf edge 5 of a turf layer 1. Only a part of the movable support base 3 is shown. The movable support base 3 supports a layer of soil 15. A large part of the soil 15 can comprise sand. However, the composition of the soil 15 will be chosen by the skilled person according to growing environment, turf type etc.

Above the upper surface of the soil 15, the green portion, i.e. the turf leafs 17, are shown. Below the turf leafs 17 there is a root zone 12. The root zone 12 extends from the upper face of the soil 15, some distance downwards into the soil 15.

In the embodiment shown in FIG. 70, a turf reinforcement layer 19 is integrated in the upper portion of the soil 15. The turf reinforcement layer 19 comprises a permeable mat 19a which is horizontally arranged some distance below the upper surface of the soil 15, however in the root zone 12. Upwardly extending from the mat 19a there is a plurality of synthetic fibers 19b. The synthetic fibers 19b can typically be a turf leaf imitation. Hence, the reinforcement layer 19 can advantageously be made of an artificial turf mat, such as the commercially available from the company "Motz turf farms". Other types or turf reinforcement layers from other manufacturers can of course also be used.

In the shown embodiment of FIG. 70, the mat 19a is arranged at the level of the upper edge of the root barrier sheet 13. Thus, for this embodiment there will be no exposed root zone below the level of the mat 19a.

It should be clear to the skilled person, that the turf layer 1 according to the invention can also be without such a turf reinforcement layer 19.

Still referring to FIG. 70. At the position of the rigid wall portion 9 (cf. also FIG. 69), the movable support base 3 has a profile 21 which extends a horizontal distance into the soil 15. The profile 21 contributes to the rigidity of the movable support base 3. As a result, however, there is a less vertical portion of soil 15 at the position above the profile 21, compared to the other areas of the turf layer 1. Consequently, if someone, say a football player, should trample with a large force onto the turf layer 1 at this portion (i.e. at the area of two adjacent and abutting turf edges 5), the soil 15 will be less compressible. That is, a small vertical section of soil 15 is less compressible than a large vertical section of soil 15. To compensate for this difference of compressibility, there is arranged a compressible body 23 which is supported on an upper surface 25 of the profile 21. The compressible body 23 is of a significantly more compressible material than the soil 15. Thus, its dimension can be adapted so that the compliance of the turf surface is the same at the position of the profile 21 (and the turf edge 5) and elsewhere. The compressible body 23 can for instance be made of a rubber foam, or another suitable compressible material. Advantageously, the compressible body 23 can have an elongated shape, following the upper surface 25 of the profile 21.

In one embodiment, the upper surface 25 of the profile 21 can be provided with a retaining groove 27. The retaining groove 27 will contribute in retaining the compressible body 23 in place. This may be particularly advantageous when filling soil material onto the movable support base 3. Advantageously, the compressible body 23 can be provided with an oppositely facing profile, fitting snugly into the retaining grove 27 of the upper surface 25.

Also shown in FIG. 70 is an embodiment of a root barrier sheet 13 which is provided with attachment means. The attachment means is in form of two elongated protrusions 29 that extend into two elongated receiving grooves 31 in the rigid wall portion 9. In this embodiment, the receiving grooves 31 are integrated in the profile 21. Advantageously, the protrusions 29 can be snapped into and pulled out of the receiving grooves 31 manually. As will be explained later, other types of root barrier sheets 13 may also be used.

Figure 71:
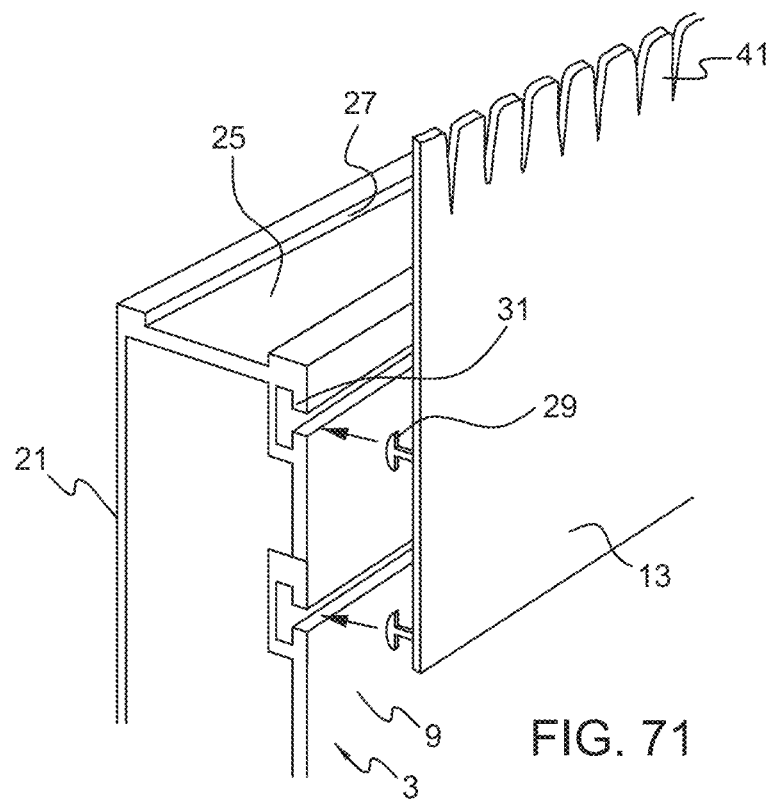
FIG. 71 is a perspective view of a profile 21.

FIG. 71 is a perspective view of a profile 21, such as the profile shown in FIG. 70, provided with an upper surface 25 with a retaining profile 27. It is also provided with receiving grooves 31 for attachment of a root barrier sheet 13 by insertion of protrusions 29 into the grooves. In the situation shown in FIG. 71, the protrusions 29 are about to be inserted into the receiving grooves 31.

The root barrier sheet 13 shown in this embodiment (FIG. 71) is provided with a fringed upper portion 41. The technical result of having the upper portion of the root barrier sheet 13 fringed will be discussed further below.

Figure 72:
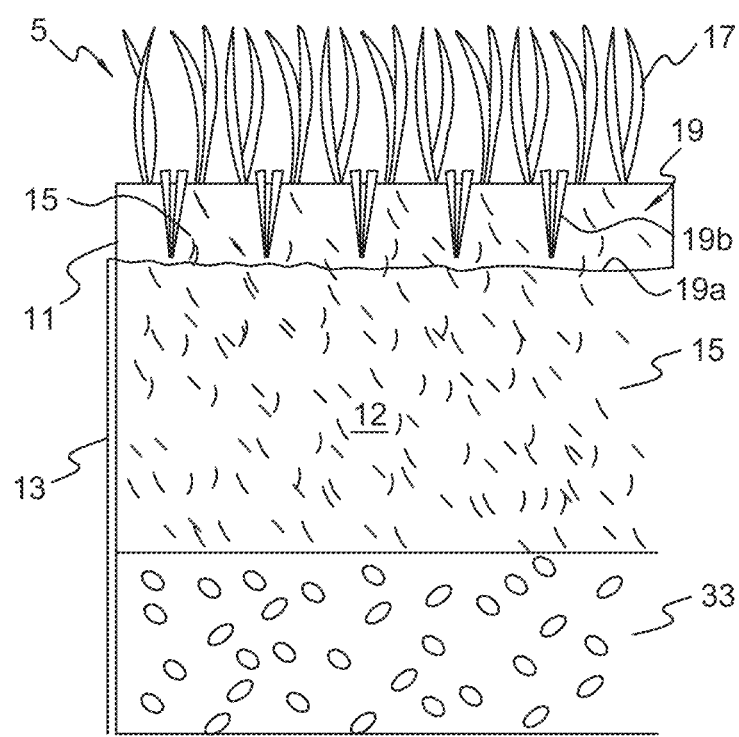
FIG. 72 is another cross section through a turf edge 5 corresponding to the cross section view of FIG. 70.

FIG. 72 is another cross section through a turf edge 5, corresponding to the cross section view of FIG. 70. In this embodiment, a layer of gravel 33 is arranged below the soil 15. In FIG. 72, the rigid wall portion 9 is not shown. Notably, the upper edge of the root barrier sheet 13 is at the same level as the mat 19a. It could however also be arranged some distance below or above the level of the mat 19a.

Figure 73:
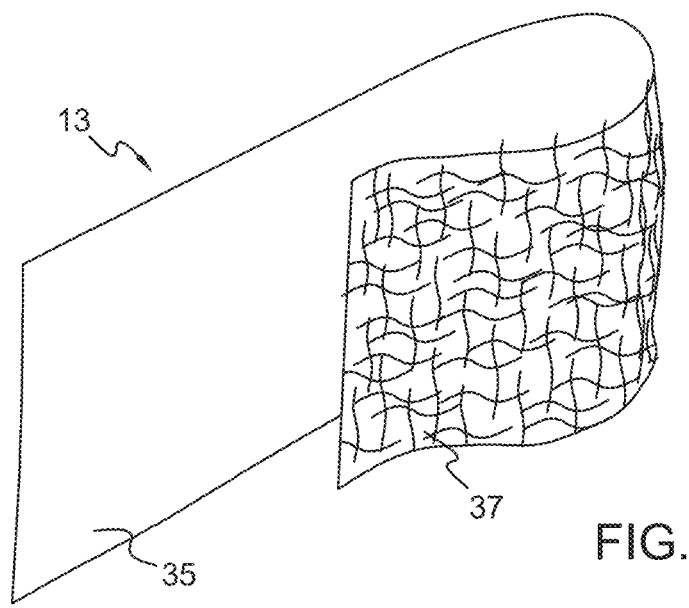
FIG. 73 illustrates a root barrier sheet 13.

In the embodiment shown in FIG. 72, the root barrier 13 is not fixed to the rigid wall portion 9. Instead, it is held in place by turf roots 39 (not shown) which have grown partly into the root barrier 13. FIG. 73 illustrates a root barrier sheet 13, which is advantageous for such an embodiment. This root barrier sheet 13 has an external face 35, which has a smooth surface. Moreover, it has an internal face 37, which has a fibrous and/or porous surface.

An advantage with the smooth surface of the external face 35, is that friction between two adjacent root barrier sheets 13 is reduced when moving one turf layer 1 with respect to another, adjacent turf layer 1. Such mutual movement may take place for instance when installing several turf layers 1 to form a turf field, such as a sports field in a sports stadium. Also, when disassembling a turf field, such mutual, sliding movement between adjacent turf edges 5 may take place. By having a smooth surface with low friction, the risk of damaging the turf edge 5, including the root barrier sheet 13, is reduced.

Figure 80:
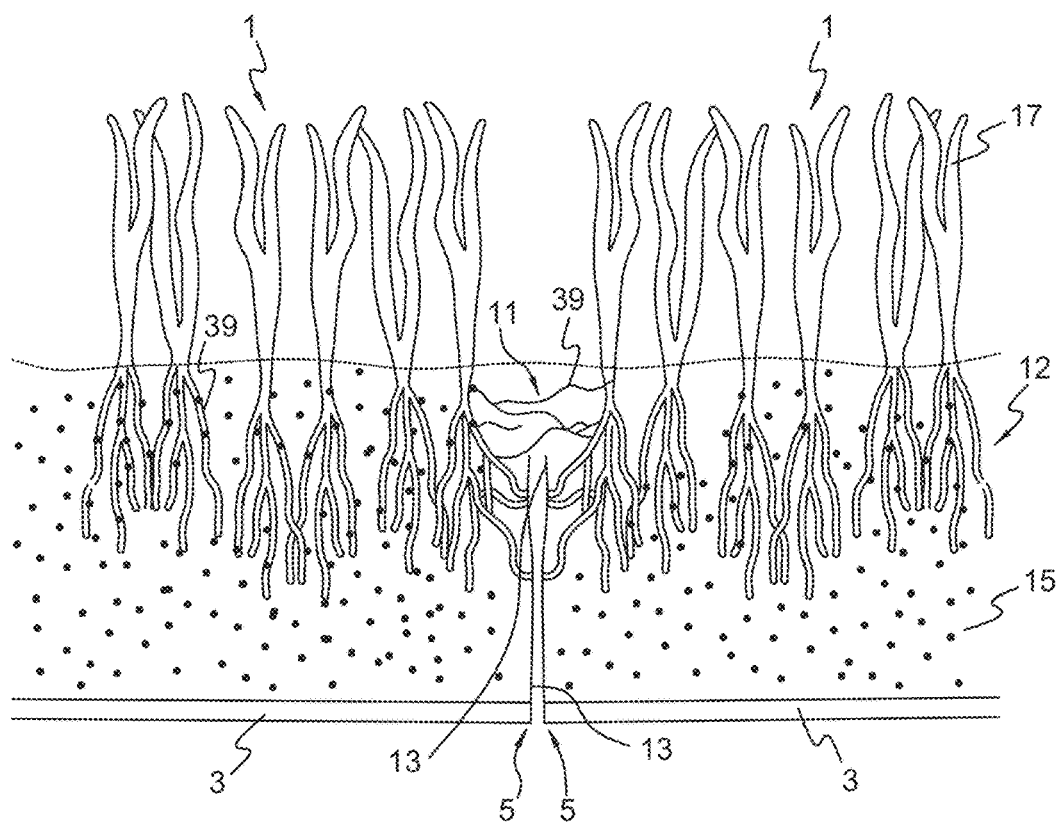
FIG. 80 illustrates two adjacent turf edges 5.

Moreover, by providing the root barrier sheet 13 with a porous and/or fibrous surface of the internal face 37, the turf roots 39 will contribute in retaining the root barrier sheet 13 in place along the turf edge 5 (cf. e.g. FIG. 80). Such a root barrier sheet 13 may be with or without the smooth surface of the external face 35.

Although discussed in connection with the embodiment shown in FIG. 72, the features of the root barrier sheet 13 in FIG. 73 may be used also for any other configuration of the turf edge 5. For instance, the advantageous features of the external face 35 and the internal face 37 may also be used with a root barrier sheet 13 of the type shown in FIG. 70. Then, a portion of the internal face 37, which will be positioned adjacent the soil 15, could be provided with the fibrous/porous surface.

Figures 74, 75:
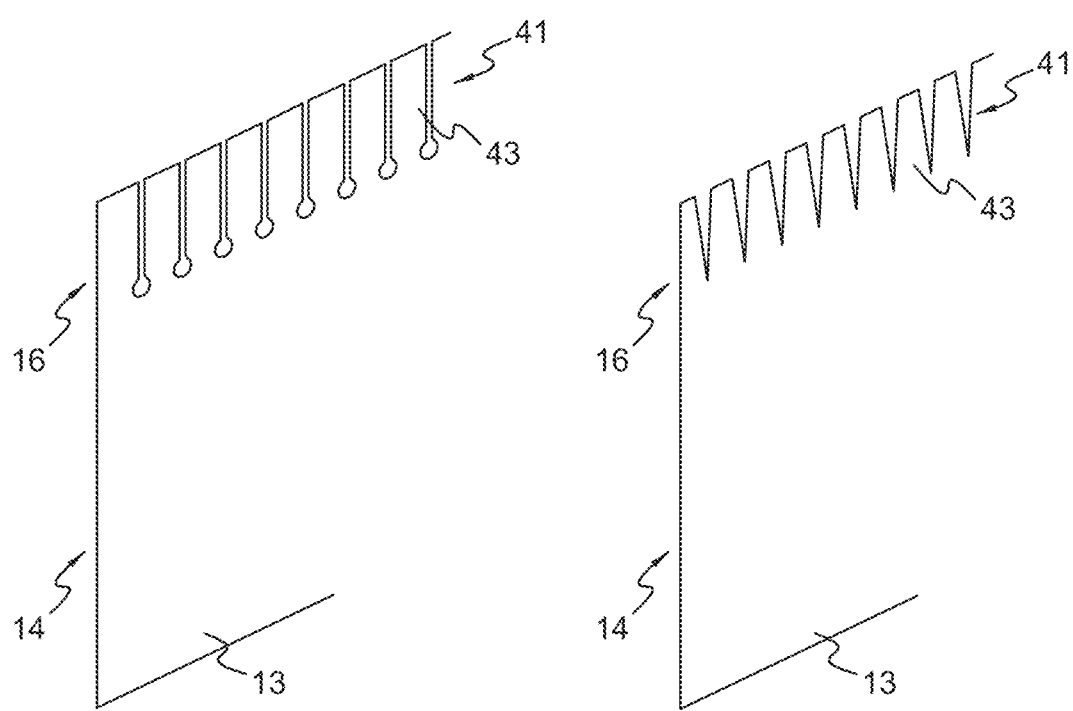
FIGS. 74, 75, and 76 depict alternative configurations of the fringed upper portion 41 of the root barrier sheet 13.
Figure 76:
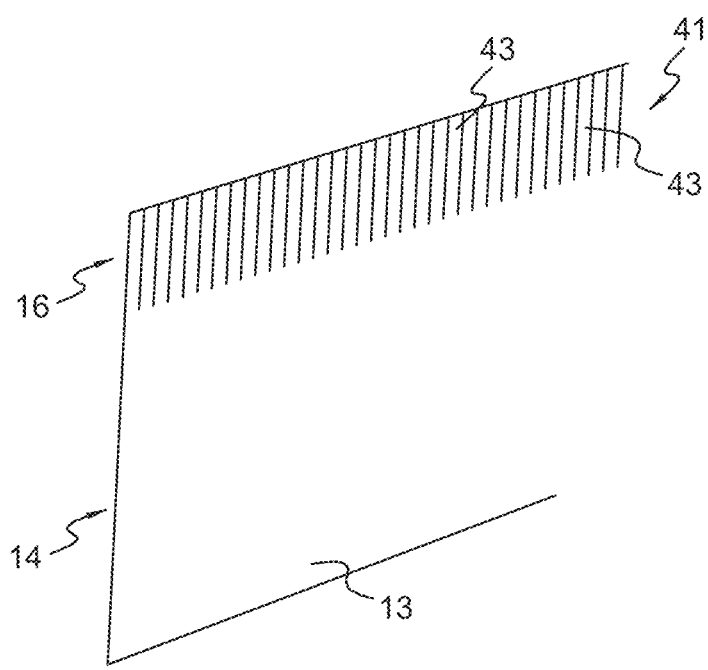

FIG. 74, FIG. 75, and FIG. 76 depict alternative configurations of the fringed upper portion 41 of the root barrier sheet 13. In the embodiments shown in FIG. 74 and FIG. 75, some gaps exist between upwardly extending flaps 43 of the fringed upper portion 41.

In the embodiment shown in FIG. 76, however, there are no such gaps. In this embodiment, the flaps 43 are abutting each other, covering the entire fringed upper portion 41.

While the entire root barrier sheet 13 shown in FIG. 73 is root impermeable, the root barrier sheets 13 shown in FIG. 74 to FIG. 77 comprises a root impermeable portion 14 and a root permeable portion 16.

Figure 77:
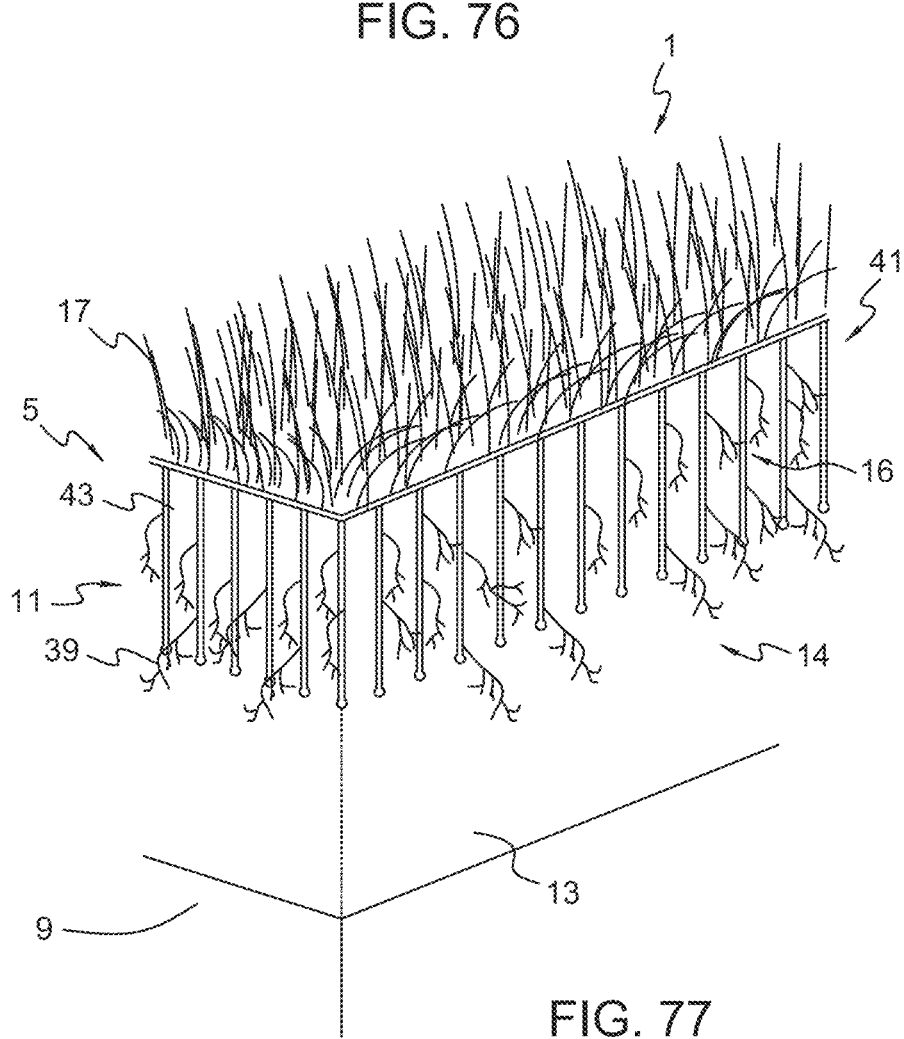
FIG. 77 illustrates a root barrier sheet 13 in use, having a fringed upper portion 41.

FIG. 77 illustrates such a root barrier sheet 13 in use, having a fringed upper portion 41. Although the fringed upper portion 41 covers substantially the entire area with the flaps 43, turf roots 39 are able to grow through the slits present between the flaps 43. Moreover, when two turf edges 5 having this type of root barrier sheets 13 abut against each other, some roots 39 will find their way into the soil of the adjacent turf edge 5. This contributes to retaining a smooth upper surface of the turf layer when being used. Also, such root bridging through the adjacent exposed root zone 11, contributes in stabilizing the turf edges 5 when in use, for instance during a football game.

Figure 78:
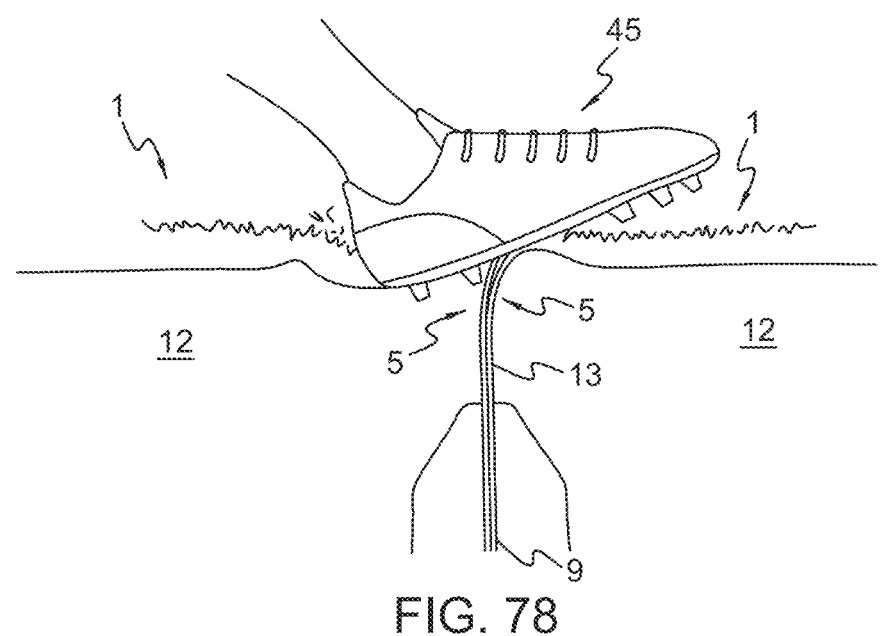
FIG. 78 illustrates a foot 45 a football player trampling with significant force at the position of two adjacent turf edges 5.
Figure 79:
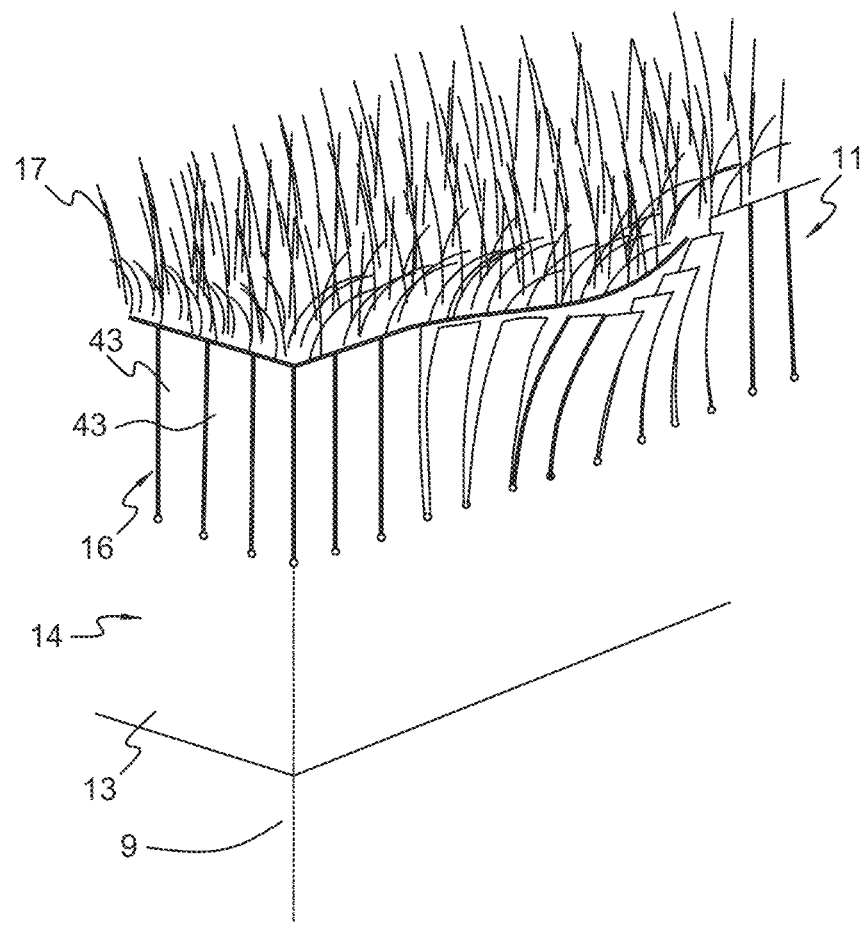
FIG. 79 illustrates damage to turf edges 5.

An example of such use is depicted in FIG. 78. Here, the foot 45 a football player tramples with significant force at the position of two adjacent turf edges 5. This results in some damage to the turf edges 5. Such damage is illustrated in FIG. 79.

Here, one turf edge 5 is shown, where some flaps 43 of the root barrier sheet 13 have been deflected away from their correct position. However, notably only the flaps 43 at the area where the foot 45 trampled are deflected. If the upper portion of the root barrier sheet 13 had been continuous and extending along the upper face of the soil 15, i.e. without the fringed upper portion 41, the deflection of the upper portion of the root barrier sheet 13 would have resulted in a strain in the root barrier sheet 13. Due to the strain, a pulling force in the root barrier sheet 13 would have propagated along the turf edge 5, possibly pulling off the engagement between the root barrier sheet 13 with turf roots 39 along a significant distance. With the shown embodiment however, including the fringed upper portion 41 of the root barrier sheet 13, only a small section of the turf edge 5 is damaged.

As will be understood by the skilled person, the turf roots 39, as the one shown in FIG. 77, which grow into the exposed root zone 11 of an adjacent turf edge 5, will contribute to the stability of the upper portion of the turf edge 5. This will reduce the damage caused by the trampling (FIG. 78).

For some embodiments, providing the root barrier sheet 13 with the fringed upper portion 41 makes it more advantageous to let the root barrier sheet 13 extend all the way up to the upper surface of the soil 15 (cf. FIG. 77). Some prevention of roots 39 bridging over to the facing turf edge 5 is provided, but still only a small damage to the turf edge is inflicted upon an incident as illustrated in FIG. 78. Advantageously, the fringed upper portion 41 may have the same color as the turf leafs 17. The fringed portion 41 may even resemble a natural turf.

As the turf roots 39 will grow through root permeable portion 16 of the root barrier sheets 13 disclosed in FIG. 74 to FIG. 77, the turf edges 5 using such root barrier sheets 13 do also exhibit an exposed root zone 11. By appropriate selection of such fringed upper portion 41 of the root barrier sheet 13, the user will be able to adjust the degree of root bridging over to the adjacent turf edge 5.

FIG. 80 illustrates two adjacent turf edges 5, which each is provided with a root barrier sheet 13. In this illustration, the turf roots 39 are schematically shown.

Some turf roots 39 have grown into engagement with the root barrier sheets 13. Thus, when the turf layers 1 are removed from one another, the roots 39 will contribute in retaining the root barrier sheets 13 in place. Thus, the turf edge will not be broken. Above the upper edge of the root barrier sheets 13, some roots have bridged over to the root zone 12 of the adjacent turf edge 5. This bridging has taken place through the exposed root zone 11.

Notably, in the embodiment shown in FIG. 80, the turf reinforcement layer 19 (cf. FIG. 70 and FIG. 72) has not been used. Moreover, the root barrier sheet 13 is without the fringed upper portion 41. The exposed root zone 11 is above the upper edge of the root barrier sheet 13.

For embodiments including the fringed upper portion 41 of the root barrier sheet 13, the fringed upper portion 41 may not extend all the way up to the upper surface of the soil 15. In such embodiments, the exposed root zone 11 would include partly a section having the fringed upper portion 41, and partly a root zone without any root barrier sheet 13 covering it.

Figure 81:
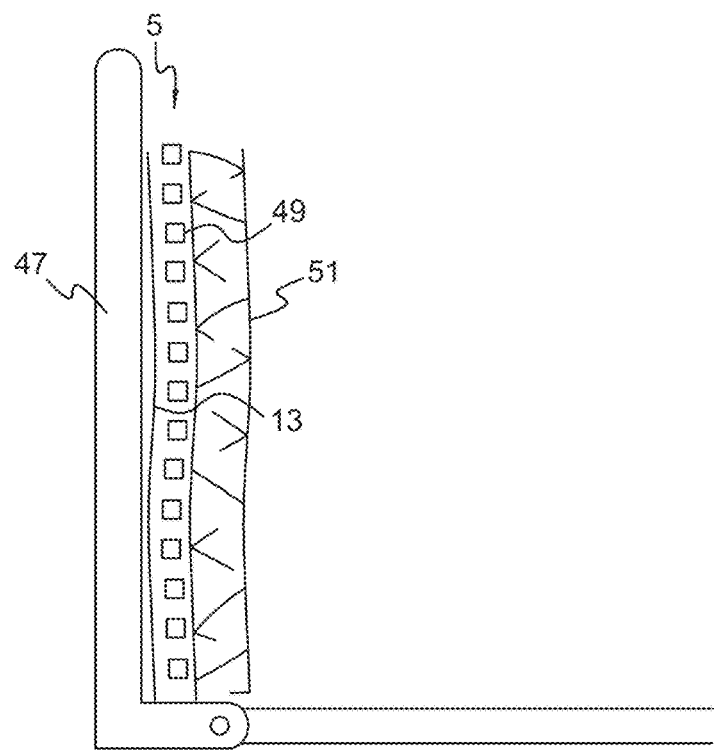
FIG. 81 schematically depicts a part of a movable support base 3 before being filled with soil 15 and before growing a turf layer 1.

FIG. 81 schematically depicts a part of a movable support base 3 before being filled with soil 15 and before growing the turf layer 1. At the position of the future turf edge 5, the root barrier sheet 13 is arranged in a vertical position. It is arranged adjacent a supporting construction wall 47. In some embodiments, the construction wall 47 can be removably attached to the moving support base 3, such as with a hinge. In other embodiments, the construction wall 47 may be another component, such as a fixed wall against which the moving support base 3 is positioned, when filling soil onto the moving support base 3.

In this embodiment, in addition to the root barrier sheet 13, a water absorbent layer 49 is arranged adjacent and in parallel with the root barrier sheet 13. The water absorbent layer 49 is arranged to adsorb and hold water. Hence, it will attract root growth towards the water adsorbent layer 49, as the roots 39 will seek this source of water. The water absorbent layer 49 can be made of a variety of different materials, for instance cloth. For instance, it can be made of recycled textiles.

In particular advantageous embodiments, the root barrier sheet 13 and the water absorbent layer 49 can be made as one product. For instance, the internal face 37 of the root barrier sheet 13 shown in FIG. 73, may advantageously comprise a water absorbent layer which is water retentive, and which additionally enables the roots 39 to engage and retain the root barrier sheet 13 in place. With such a combination, by attracting the roots 39 with the water retentive internal face 37, the water absorbent layer 49 performs two functions simultaneously.

In addition to the two said functions, the water retentive behavior of the water absorbent layer 49 also contributes against excessive dry conditions during drought periods. This applies particularly if the turf edge 5 is in a storing position without being arranged in abutment with an adjacent turf edge 5.

In embodiments where the water absorbent layer 49 is not integrated as a part of the root barrier sheet 13, it should preferably be permeable to the roots 39. In this way, the roots may still engage with the internal face 37 of the root barrier sheet 13.

Also schematically shown in the embodiment depicted in FIG. 81, there is a mesh 51. The mesh 51 is also arranged in parallel with and along the root barrier sheet 13. In the shown embodiment, the mesh 51 has also a certain extension in the horizontal direction, i.e. representing the "thickness" of the mesh 51. In other embodiments, it could however be more like a net, without any significant "thickness" beyond the thickness of the strands in the mesh.

Figure 82:
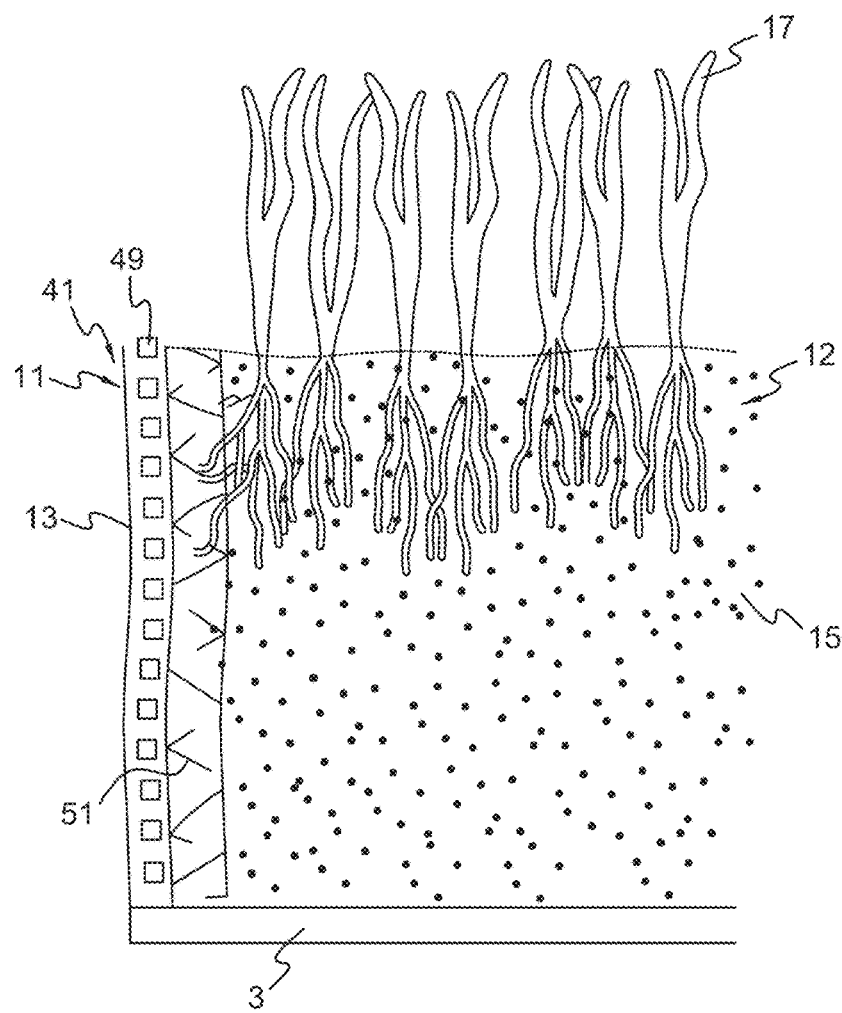
FIG. 82 depicts the embodiment shown in FIG. 81 when filled with soil and when the construction wall 47 has been removed (or the movable support base 3 has been removed from the construction wall 47.

FIG. 82 depicts the embodiment shown in FIG. 81 when filled with soil and when the construction wall 47 has been removed (or the movable support base 3 has been removed from the construction wall 47). The turf layer 1 has grown, and the turf roots 39 have grown through the mesh 51 and into the water absorbing layer 49, and engage the internal face 37 of the root barrier sheet 13.

In the embodiment shown in FIG. 82, the root barrier sheet 13, the water absorbing layer 49 and the mesh 51 are all shown extending up to the level of the upper face of the soil 15. The exposed root zone 11 is at the level of the fringed upper portion 41. Contrary to what is shown in FIG. 82, at least the mesh 51 should extend only to a position at a distance below the upper face of the soil 15, so that it is not visible at the upper surface of the soil 15. Then it will neither be able to harm a player, such as a football player.

Figure 83:
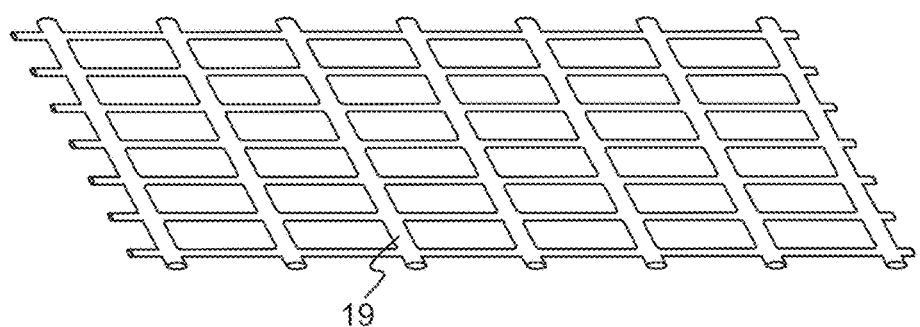
FIG. 83 illustrates a turf reinforcement layer 19 in the form of a horizontally extending grid layer embedded in the soil 15.

FIG. 83 illustrates a turf reinforcement layer 19 in the form of a horizontally extending grid layer embedded in the soil 15. The turf reinforcement layer 19, here in the form of the grid layer, can advantageously be arranged in the root zone, so that it contributes to the stability of the turf edge 5 by being retained in place by the roots 39, as well as by the soil 15 itself. It may be arranged in the level of an exposed root zone 11 (cf. FIG. 70). Or it may be arranged in the root zone 12 but below the exposed root zone 11, such as at the level of the root barrier sheet 13 shown in FIG. 70.

Figure 84:
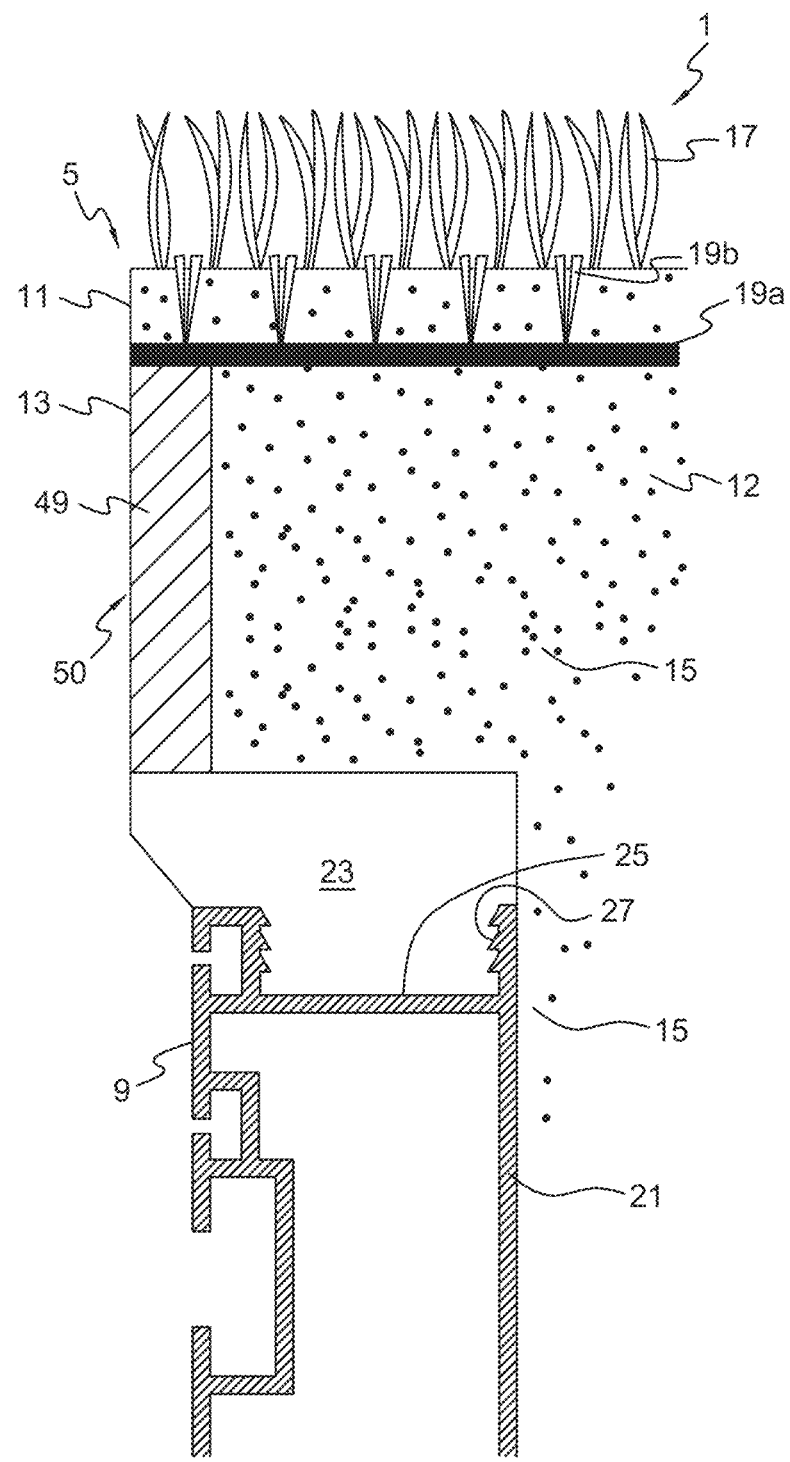
FIG. 84 schematically depicts a turf edge 5, wherein the root barrier sheet 13 and the water adsorbent layer 49 are integrated into one common product.
Figure 85:
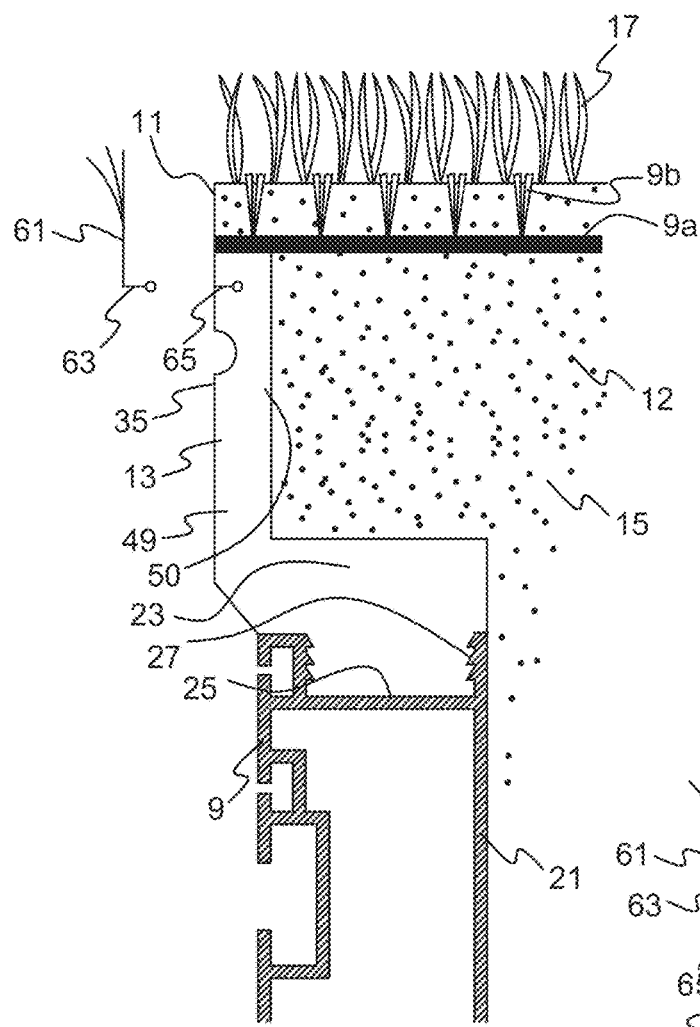
FIGS. 85, 86, 87, and 88 illustrate an alternative embodiment in which a compressible body 23, root barrier sheet 13, and water adsorbing layer 49 are produced as one single part.
Figure 86:
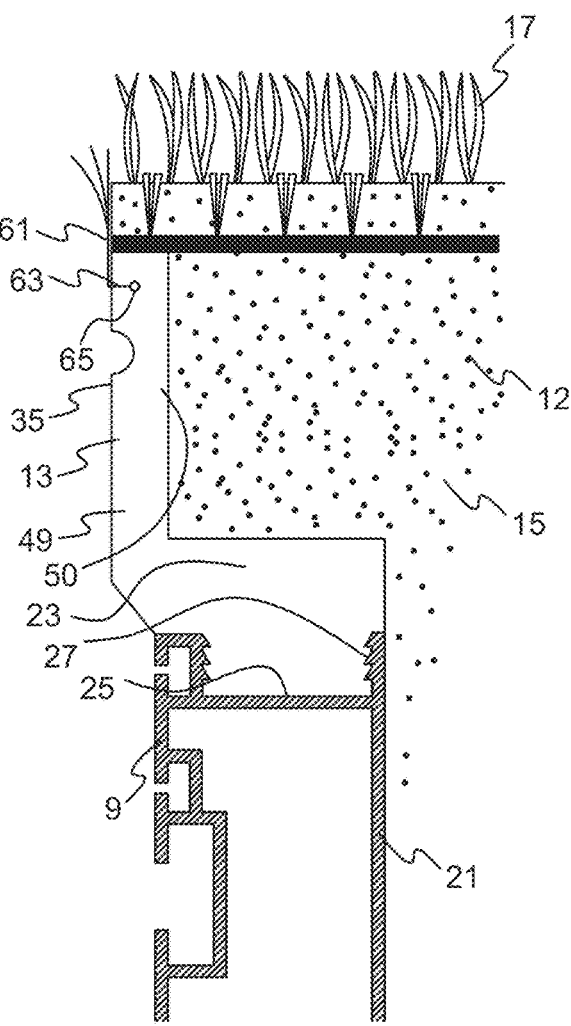

FIG. 84 schematically depicts a turf edge 5, wherein the root barrier sheet 13 and the water adsorbent layer 49 are integrated into one common product. Moreover, in this embodiment, the mat 19a is arranged on top of the water adsorbent layer 49.

In the embodiment shown in FIG. 77, the compressible body 23 and the root barrier sheet 13 extend laterally beyond the lateral extension of the rigid wall portion 9. In other terms, the soft parts extend laterally beyond the rigid parts. As a consequence, when assembling one turf edge 5 adjacent another turf edge 5, the soft parts can be slightly compressed. Such slight compression may compensate for small deviations from the perfect or template shape of the turf edge 5. Notably, the root barrier sheet 13 and the exposed root zone 11 together form a vertical face. Hence, such a slight compression will result in an even force distribution between the two adjacent turf edges 5.

This embodiment, as shown in FIG. 84, is particularly advantageous when using the compressible body 23, since the compressible body can be compressed both in the lateral (horizontal) and vertical directions. Also, by using the compressible body 23, one may support the root barrier sheet 13 with a compressible component, thereby avoiding extending a rigid portion of the rigid wall portion 9 laterally out for support of the root barrier sheet 13.

With respect to the various embodiments discussed herein, the root barrier sheet 13 and the water adsorbing layer 49 together constitute an edge wall 50. In other embodiments, the edge wall 50 may be without the water adsorbing layer 49. Or, it may in addition comprise a mesh 51 (cf. FIG. 81). In other embodiments, the edge wall may include the root barrier sheet 13 and the mesh 51.

FIG. 85, FIG. 86, FIG. 87, and FIG. 88 illustrate an alternative embodiment. In this embodiment, the compressible body 23, the root barrier sheet 13, and the water adsorbing layer 49 is produced as one single part. As with the embodiment shown in FIG. 84, the root barrier sheet 13 is positioned laterally outside or beyond the position of the rigid wall portion 9.

The combined product, including the compressible body 23, the root barrier sheet 13 and the water adsorbing layer 49, can advantageously be made of a rubber foam. It may be made of one, single, isotropic material. However, depending on the material used, to prevent roots 39 from penetrating through the root barrier sheet 13, a root impermeable layer can be fixed to the external face 35 of the product (i.e. the external face of the root barrier sheet 13). One can also imagine that the compressible body 23, the water adsorbing layer 49, and the root barrier sheet 13 are of different materials, which have been joined together, such as with an adhesive or vulcanization.

The embodiment shown in FIG. 85 to FIG. 88 also includes an artificial turf strip 61, which can be releasably attached to an upper section of the edge wall 50. In this embodiment, the artificial turf strip 61 comprises an attachment strip 63 which is inserted into a receiving attachment groove 65 in the root barrier sheet 13 and the water adsorbing layer 49.

When attached, the artificial turf strip 61 may have the same function as the fringed upper portion 41 of the root barrier sheet discussed above. It will contribute in retaining soil 15 in place at the level of the exposed root zone 11.

Also, it may to some degree limit the amount of turf roots 39 that grows across the interface between two adjacent turf edges 5, into the root zone of the adjacent turf edge 5.

Figure 87:
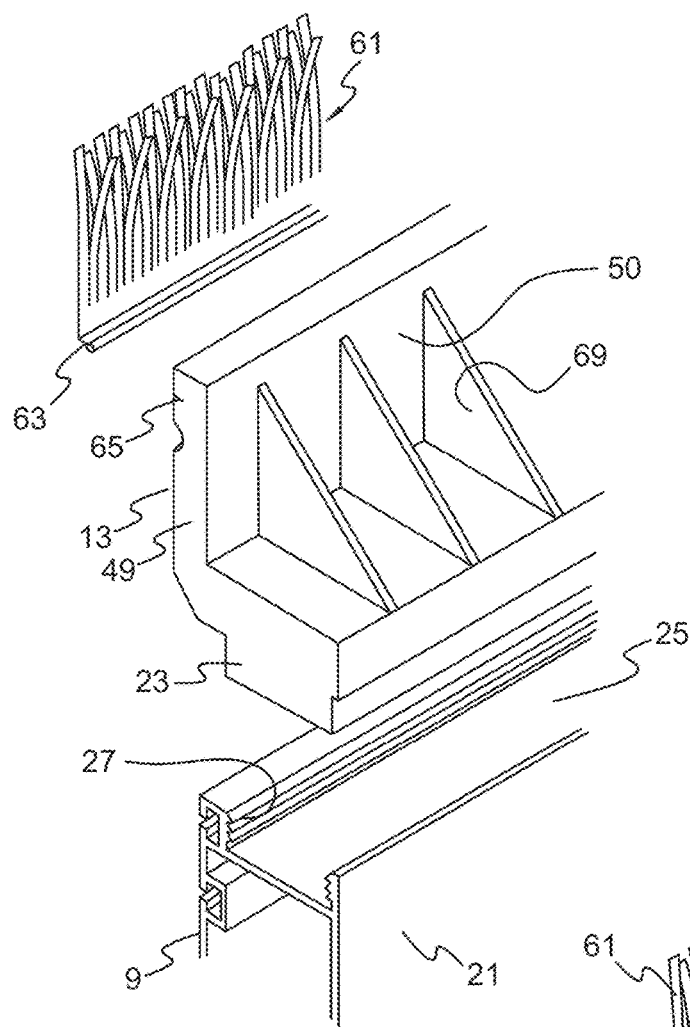

FIG. 87 is a perspective view of the artificial turf strip 61, the one common part of the compressible body 23, the root barrier sheet 13 and the water adsorbing layer 49, as well as the rigid wall part 9. In this illustration, the components have not yet been assembled.

It will be clear to the skilled person that the artificial turf strip 61 and the attachment groove 65 may and may not be present in the embodiment discussed with reference to FIG. 85 to FIG. 88.

Figure 88:
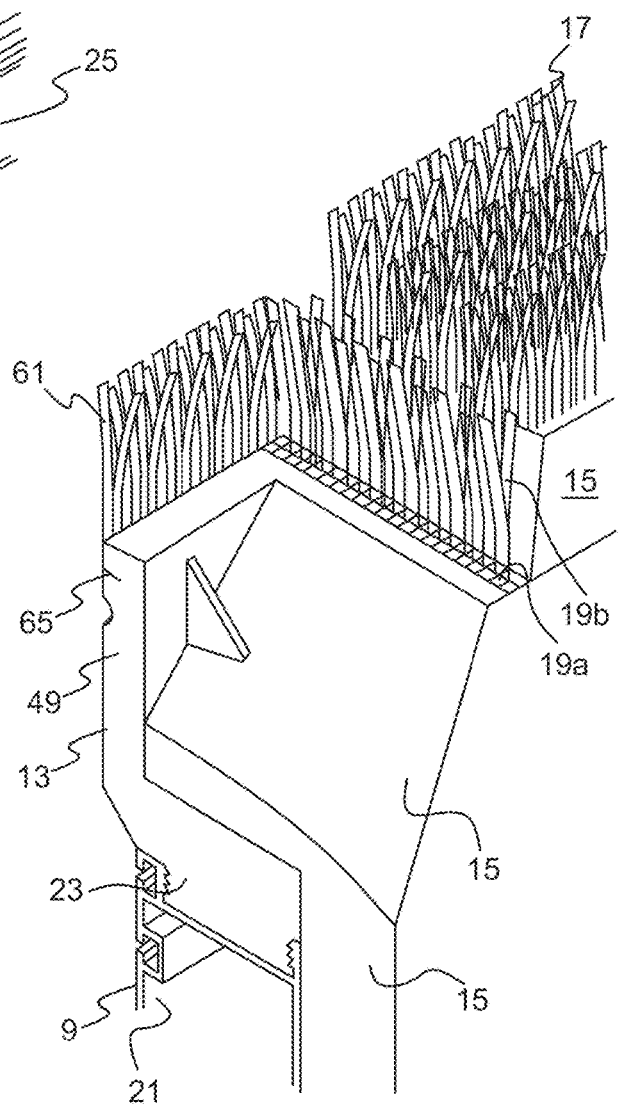

FIG. 88 depicts the same parts as in FIG. 87, however in an assembled state. Moreover, soil 15 has been filled onto the movable support base 3 (cf. FIG. 69 and FIG. 70), and the turf reinforcement layer 19, comprising the mat 19a and the synthetic fibers 19b is incorporated into the soil 15. Protruding up from the upper face of the soil 15 are a plurality of turf leafs 17, which extend vertically above the synthetic fibers 19b.

As seen best in FIG. 87, between the compressible body 23 and the edge wall 50, there are arranged a plurality of support ribs or support walls 69. The support walls 69 contribute in preventing deflection of the edge wall 50. Also, when the turf edge 5 is not abutting an adjacent turf edge 5 or another vertical surface, the support walls 69 will contribute in retaining the integrity of the turf edge 5, as they exhibit friction surfaces against the soil 15.

Advantageously, the support walls 69 can be made of the same material as at least one of the compressible body 23 and the edge wall 50. As with the edge wall 50 and the compressible body 23, the support walls 69 also need to be compressible, so that they not hinder compression of the edge wall 50.

Figures 89, 90:
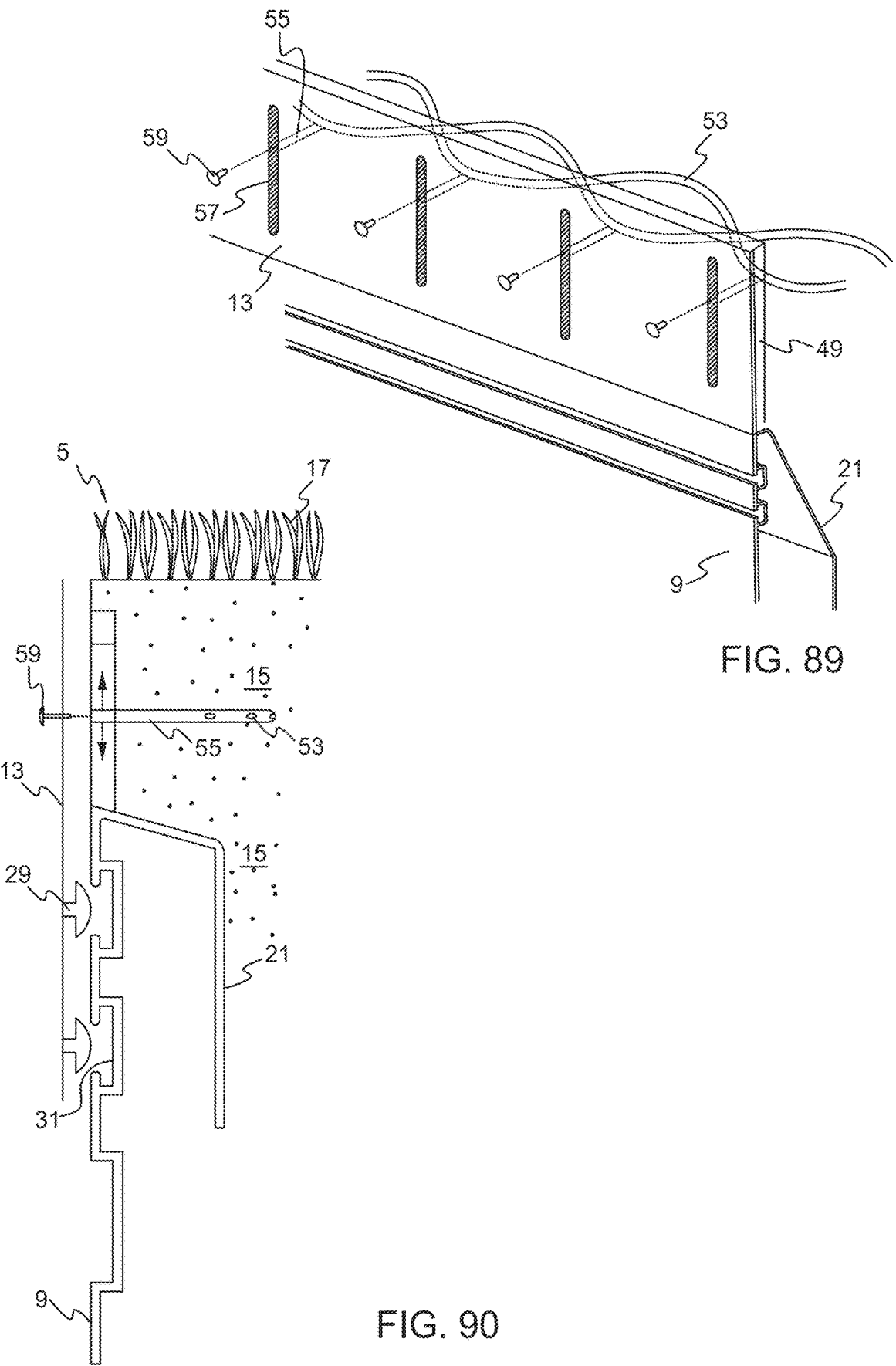
FIG. 89 and FIG. 90 are schematic views of a root barrier retaining means 55; and FIG. 91

FIG. 89 and FIG. 90 are schematic views of a root barrier retaining means 55. In FIG. 89 the root barrier sheet 13 is provided with a plurality of vertically extending attachment means slits 57. A grid layer 53 is schematically shown adjacent the root barrier sheet 13. To the grid layer 53 there are attached a number of root barrier retaining means in the form of retaining pins 55. The retaining pins 55 extend through the vertical slits 57. At their ends opposite of the grid layer 53, retaining heads 59 are attached. The retaining heads 59 will prevent the root barrier sheet 13 from separating from the turf edge 5, when attached to the retaining pins 55.

The embodiments of the grid layers 53 in FIG. 83 and FIG. 89 are different. The grid layer 53 shown in FIG. 83 will extend further horizontally into the turf layer 1, than the grid layer 53 in FIG. 89 will. Both will, however, contribute in maintaining a stable turf edge 5, and to keep the root barrier sheet 13 in place.

Due to the vertical slits 57, a vertical downward movement of the grid layer will not pull down the root barrier sheet 13. Moreover, the exact vertical position of the horizontal grid layer 53 is not important for attachment of the root barrier retaining means 55, 59.

In the embodiment shown in FIG. 89 and FIG. 90, a water absorbent layer 49 is arranged adjacent the root barrier sheet 13. Hence, the water absorbent layer 49 is also provided with vertical slits 57.

Figure 91:
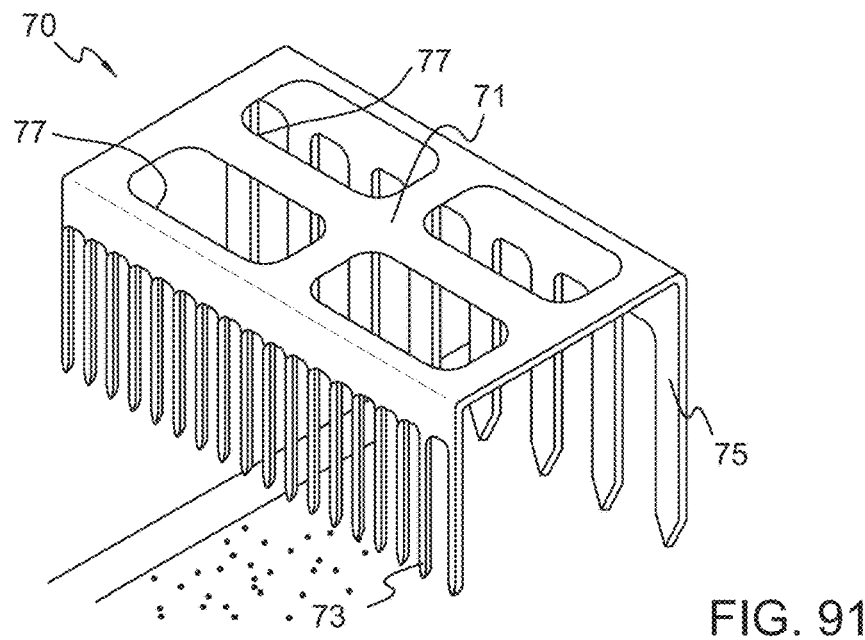
Figure 92:
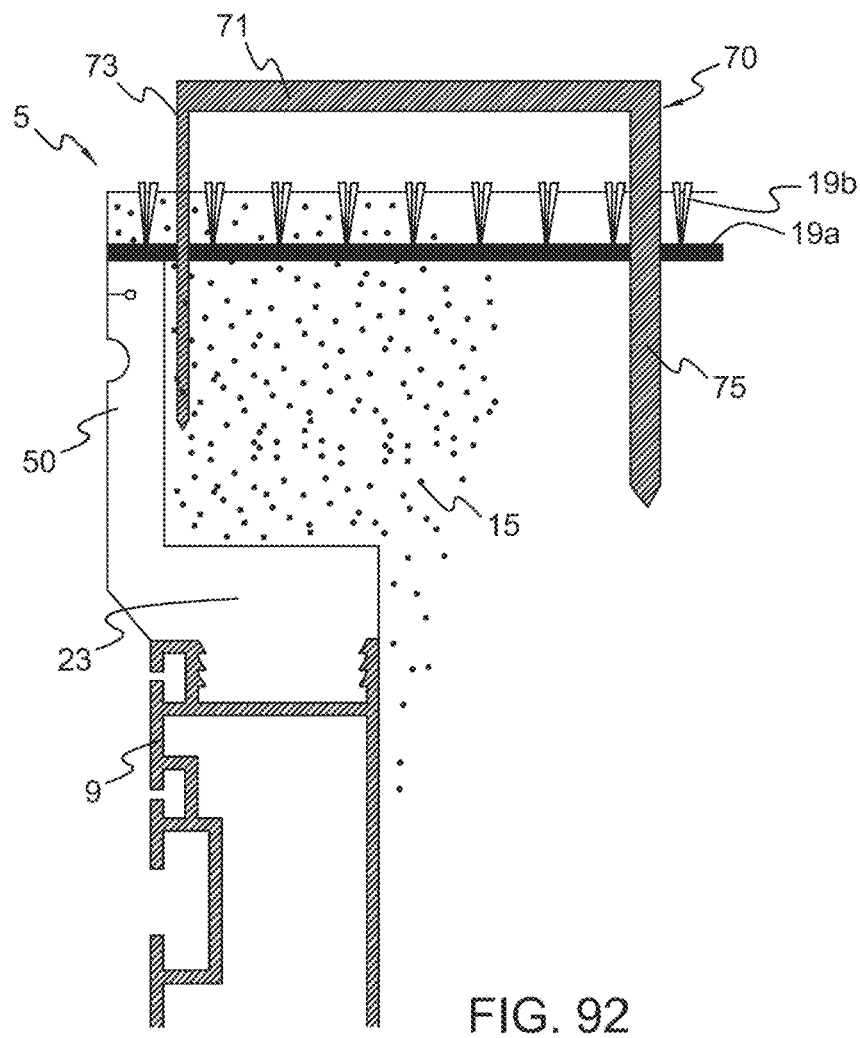
FIG. 92 depicts a removable edge support arrangement 70.

FIG. 91 and FIG. 92 depicts a removable edge support arrangement 70. The edge support arrangement 70 has a main body 71. Attached to the main body 71 there is a row of support fingers 73. As appears from the cross section view of FIG. 92, the support fingers 73 are adapted to be inserted into the soil 15, from the upper surface of the soil 15. At a distance from the row of support fingers 73, there is a row of anchoring pins 75. The anchoring pins 75 are also adapted to be inserted some distance into the soil 15.

When in use, the removable edge support arrangement 70 is placed with its support fingers 73 in the area of the turf edge 5. The anchoring pins 75 are inserted into the soil 15 at a distance from the turf edge 5. This is shown in FIG. 92.

In some embodiments, depending on the characteristics of the edge wall 50 and of the support fingers 73, the support fingers 73 may be inserted into the edge wall 50 itself. For instance, if the edge wall 50 comprises a water adsorbent layer 49 made of a rubber foam, thin support fingers 73 may be inserted into it.

The removable edge support arrangement 70 will typically be used when a movable support base 3 (cf. FIG. 69 and FIG. 70) has been filled with soil 15, and the turf has been sown. As illustrated in FIG. 92, seeds are on top of the soil surface, but have not yet made turf roots. Hence, in this situation, since there are no turf roots, the turf edge 5 may be not sufficiently stable. By installing the edge support arrangement 70, the integrity of the turf edge 5 is retained while the turf roots are growing. When the roots have grown, the edge support arrangement 70 can be removed.

To ensure that light reaches the seeds and the sprouts, the main body 71 comprises apertures 77, which permit light to reach the area between the support fingers 73 and the anchoring pins 75.

Also disclosed herewith is a composite elongated turf edge element comprising an elongated root barrier sheet (13) joined to an elongated water absorbing layer (49), wherein the root barrier sheet (13) and the water absorbing layer (49) are fixed together by means of an attachment means, such as an adhesive or a weld.

With such a composite elongated turf edge element, the construction of a turf module 100 is facilitated.

The invention claimed is:

1. A method of providing a turf sports field, the method comprising:
    a) via a remotely operated or autonomously operated lifting and transport vehicle configured to be moved into and out of position under turf modules to be moved, which lifting and transport vehicle is provided with a lifting arrangement, moving turf modules from a non-installed position towards an installed position;
    b) via a positioning system, which is configured to detect and deliver turf module position information, detecting the position of the turf module that is being moved;
    c) installing turf modules adjacent to previously installed turf modules, with a tolerance gap between adjacently positioned turf edges of different turf modules, wherein the positions, into which the turf modules are installed, are based on turf module position information from the positioning system; and
    wherein during step c), the tolerance gap is void when a turf module is installed adjacent a previously installed turf module.

2. The method according to claim 1, wherein step c) comprises:
    based on information from the positioning system, installing turf modules in a position governed by the position of previously installed turf modules.

3. The method according to claim 1, wherein the turf module has a movable support base below the turf surface, wherein the lifting and transport vehicle is arranged below the movable support base of the turf module, which the lifting and transport vehicle moves, and wherein the lifting and transport vehicle is completely horizontally surrounded by the peripheral turf edges of the turf module, when moving the turf module.

4. The method according to claim 1, comprising, before step a), preparing turf edges of a turf module with a turf edge resetting assembly, thereby resetting the turf edge towards a template shape.

5. The method according to claim 2, wherein step c) comprises, based on information from the positioning system, installing turf modules in a predetermined target position.

* * * * *